(12) United States Patent
Minemura

(10) Patent No.: US 8,121,226 B2
(45) Date of Patent: *Feb. 21, 2012

(54) METHOD OF EVALUATING A READOUT SIGNAL, AND OPTICAL DISC APPARATUS

(75) Inventor: Hiroyuki Minemura, Kokubunji (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 622 days.

This patent is subject to a terminal disclaimer.

(21) Appl. No.: 12/285,892

(22) Filed: Oct. 16, 2008

(65) Prior Publication Data

US 2009/0052595 A1     Feb. 26, 2009

Related U.S. Application Data

(63) Continuation of application No. 11/044,070, filed on Jan. 28, 2005, now Pat. No. 7,440,522.

(30) Foreign Application Priority Data

May 7, 2004    (JP) .................................. 2004-138530
Dec. 27, 2004  (JP) .................................. 2004-377369

(51) Int. Cl.
H04L 27/06    (2006.01)

(52) U.S. Cl. ......................... 375/341; 375/340; 375/262

(58) Field of Classification Search .................. 375/340, 375/341, 262, 263

See application file for complete search history.

(56) References Cited

U.S. PATENT DOCUMENTS

| 5,995,561 | A | 11/1999 | Yamasaki |
| 6,445,754 | B1 | 9/2002 | Itoi |
| 7,082,566 | B2 | 7/2006 | Kashihara |
| 7,440,522 | B2 * | 10/2008 | Minemura .................... 375/341 |
| 2004/0250197 | A1 | 12/2004 | Takehara |
| 2005/0008084 | A1 | 1/2005 | Zhidkov |
| 2005/0193318 | A1 | 9/2005 | Okumura |

FOREIGN PATENT DOCUMENTS

| JP | 2001-186027 | 7/2001 |
| JP | 2003-141823 | 5/2003 |
| JP | 2003-151219 | 5/2003 |

OTHER PUBLICATIONS

International Symposium on Optical Memory 2003 Nov. 3-7, 2003, Nara-Ken New Public Hall (Shin-Kokaido Nara, Japan.
Proposal of Signal Qualification Method for PRML Processing System, Takeshi Nakajima et al, pp. 93-95.
Signal Qualification Method for PRML Read-Write Channel Harumitsu Muyashita et al pp. 116-117.
Signal-to-Noise Ratio in PRML Detection S. Ohkubo, M. Ogawa, M. Nakano, H. Honma and T. Iwanaga, pp. 164-165.

* cited by examiner

*Primary Examiner* — Emmanuel Bayard
(74) *Attorney, Agent, or Firm* — Antonelli, Terry, Stout & Kraus, LLP.

(57) ABSTRACT

A method and optical disc apparatus for evaluating a quality of a read signal adapted to the PRML method by evaluating a binary code decoded from the read signal obtained by a head, in which an error bit sequence having one bit edge shift from the binary code is generated, a Euclidian distance is calculated on both a correct bit sequence and the error bit sequence with respect to a predetermined target signal level, assuming that the binary code is the correct bit sequence, a Euclidian distance difference between the Euclidian distance on the correct bit sequence and the Euclidian distance on the error bit sequence is calculated, an average Euclidian distance from the target signal level is calculated, a normalized sequence error is calculated, the binary code is evaluated using the normalized sequence error.

13 Claims, 63 Drawing Sheets

FIG. 2

Code : RLL(1,7)
Class : PR(1,2,2,1)
Normalization : Amplitude ±1

| Pattern | | | Pattern-T | Pattern-F | Euclid Distance | |
|---|---|---|---|---|---|---|
| Error Bits | Pat. Bits | No. | | | Direct | Norm. |
| 1Bit | 7Bit | 1 | 0001110 | 0000110 | 10 | 1.11 |
| | | 2 | 0001111 | 0000111 | | |
| | | 3 | 0111000 | 0110000 | | |
| | | 4 | 0111001 | 0110001 | | |
| | | 5 | 1001110 | 1000110 | | |
| | | 6 | 1001111 | 1000111 | | |
| | | 7 | 1111000 | 1110000 | | |
| | | 8 | 1111001 | 1110001 | | |
| 2Bit | 10Bit | 1 | 0001100000 | 0000110000 | 12 | 1.33 |
| | | 2 | 0001100001 | 0000110001 | | |
| | | 3 | 0001100011 | 0000110011 | | |
| | | 4 | 0111001100 | 0110011100 | | |
| | | 5 | 0111001110 | 0110011110 | | |
| | | 6 | 0111001111 | 0110011111 | | |
| | | 7 | 1001100000 | 1000110000 | | |
| | | 8 | 1001100001 | 1000110001 | | |
| | | 9 | 1001100011 | 1000110011 | | |
| | | 10 | 1111001100 | 1110011100 | | |
| | | 11 | 1111001110 | 1110011110 | | |
| | | 12 | 1111001111 | 1110011111 | | |

FIG. 3

Code : RLL(1,7)
Class : PR(1,2,1)
Normalization : Amplitude ± 1

| Pattern | | | Pattern-T | Pattern-F | Euclid Distance | |
|---|---|---|---|---|---|---|
| Error Bits | Pat. Bits | No. | | | Direct | Norm. |
| 1Bit | 5Bit | 1 | 00111 | 00011 | 6 | 1.50 |
| | | 2 | 11100 | 11000 | | |
| 2Bit | 7Bit | 1 | 0011000 | 0001100 | 10 | 2.5 |
| | | 2 | 1110011 | 1100111 | | |
| 3Bit | 9Bit | 1 | 000110011 | 001100111 | 14 | 3.5 |
| | | 2 | 110011000 | 111001100 | | |

FIG. 4

Code : RLL(1,7)
Class : PR(1,2,2,2,1)
Normalization : Amplitude ± 1

| Pattern | | | Pattern-T | Pattern-F | Euclid Distance | |
|---|---|---|---|---|---|---|
| Error Bits | Pat. Bits | No. | | | Direct | Norm. |
| 1Bit | 9Bit | 1 | 000011100 | 000001100 | 14 | 1.11 |
| | | 2 | 000011110 | 000001110 | | |
| | | 3 | 000011111 | 000001111 | | |
| | | 4 | 001110000 | 001100000 | | |
| | | 5 | 001110001 | 001100001 | | |
| | | ... | | | | |
| | | 18 | 111110011 | 111100011 | | |
| 2Bit | 13Bit | 1 | 0000110000000 | 0000011000000 | 12 | 0.75 |
| | | 2 | 0000110000001 | 0000011000001 | | |
| | | 3 | 0000110000011 | 0000011000011 | | |
| | | 4 | 0000110000110 | 0000011000110 | | |
| | | 5 | 0000110000111 | 0000011000111 | | |
| | | ... | | | | |
| | | 48 | 1111100111111 | 1111001111111 | | |
| 3Bit | 17Bit | 1 | 00001100111000000 | 00000110011000000 | 12 | 0.75 |
| | | 2 | 00001100111000001 | 00000110011000001 | | |
| | | 3 | 00001100111000011 | 00000110011000011 | | |
| | | 4 | 00001100111000110 | 00000110011000110 | | |
| | | 5 | 00001100111000111 | 00000110011000111 | | |
| | | ... | | | | |
| | | 126 | 11111001100111111 | 11110011000111111 | | |

FIG. 5

Code : RLL(1,7)
Class : PR(1,1,1,1)
Normalization : Amplitude ±1

| Pattern | | | Pattern-T | Pattern-F | Euclid Distance | |
|---|---|---|---|---|---|---|
| Error Bits | Pat. Bits | No. | | | Direct | Norm. |
| 1Bit | 7Bit | 1 | 0001110 | 0000110 | 4 | 1.0 |
| | | 2 | 0001111 | 0000111 | | |
| | | 3 | 0111000 | 0110000 | | |
| | | 4 | 0111001 | 0110001 | | |
| | | 5 | 1001110 | 1000110 | | |
| | | 6 | 1001111 | 1000111 | | |
| | | 7 | 1111000 | 1110000 | | |
| | | 8 | 1111001 | 1110001 | | |
| 2Bit | 10Bit | 1 | 0001100000 | 0000110000 | 4 | 1.0 |
| | | 2 | 0001100001 | 0000110001 | | |
| | | 3 | 0001100011 | 0000110011 | | |
| | | 4 | 0111001100 | 0110011100 | | |
| | | 5 | 0111001110 | 0110011110 | | |
| | | 6 | 0111001111 | 0110011111 | | |
| | | 7 | 1001100000 | 1000110000 | | |
| | | 8 | 1001100001 | 1000110001 | | |
| | | 9 | 1001100011 | 1000110011 | | |
| | | 10 | 1111001100 | 1110011100 | | |
| | | 11 | 1111001110 | 1110011110 | | |
| | | 12 | 1111001111 | 1110011111 | | |

FIG. 6

Code : RLL(1,7)
Class : PR(1,2,2,1)
Normalization : Amplitude ± 1

| Pattern | | | Pattern-T | Pattern-F | Shift-Direction (T to F) | Euclid Distance | |
|---|---|---|---|---|---|---|---|
| Error Bits | Pat. Bits | No. | | | | Direct | Norm. |
| 1Bit | 7Bit | 1 | 0001110 | 0000110 | Right | 10 | 1.11 |
| | | 2 | 0001111 | 0000111 | Right | | |
| | | 3 | 0111000 | 0110000 | Left | | |
| | | 4 | 0111001 | 0110001 | Left | | |
| | | 5 | 1001110 | 1000110 | Right | | |
| | | 6 | 1001111 | 1000111 | Right | | |
| | | 7 | 1111000 | 1110000 | Left | | |
| | | 8 | 1111001 | 1110001 | Left | | |

FIG. 7

Code : RLL(1,7)
Class : PR(1,2,2,1)
Normalization : No

| No. | Bit Array | | | | Decoder | |
|---|---|---|---|---|---|---|
| | | | | | Valid | Target Level |
| 0 | 0 | 0 | 0 | 0 | YES | 0 |
| 1 | 0 | 0 | 0 | 1 | YES | 1 |
| 2 | 0 | 0 | 1 | 0 | NO | - |
| 3 | 0 | 0 | 1 | 1 | YES | 3 |
| 4 | 0 | 1 | 0 | 0 | NO | - |
| 5 | 0 | 1 | 0 | 1 | NO | - |
| 6 | 0 | 1 | 1 | 0 | YES | 4 |
| 7 | 0 | 1 | 1 | 1 | YES | 5 |
| 8 | 1 | 0 | 0 | 0 | YES | 1 |
| 9 | 1 | 0 | 0 | 1 | YES | 2 |
| 10 | 1 | 0 | 1 | 0 | NO | - |
| 11 | 1 | 0 | 1 | 1 | NO | - |
| 12 | 1 | 1 | 0 | 0 | YES | 3 |
| 13 | 1 | 1 | 0 | 1 | NO | - |
| 14 | 1 | 1 | 1 | 0 | YES | 5 |
| 15 | 1 | 1 | 1 | 1 | YES | 6 |

FIG. 8

Code : RLL(1,7)
Class : PR(1,2,2,1)
Normalization : ±1
Mark : bit "1" & Low Level

| No. | Bit Array | | | | Decoder | | Evaluation | |
|---|---|---|---|---|---|---|---|---|
| | | | | | Valid | Target Level | Valid | Target Level |
| 0 | 0 | 0 | 0 | 0 | YES | 1.00 | YES | 1.00 |
| 1 | 0 | 0 | 0 | 1 | YES | 0.67 | YES | 0.67 |
| 2 | 0 | 0 | 1 | 0 | NO | - | YES | 0.33 |
| 3 | 0 | 0 | 1 | 1 | YES | 0.00 | YES | 0.00 |
| 4 | 0 | 1 | 0 | 0 | NO | - | YES | 0.33 |
| 5 | 0 | 1 | 0 | 1 | NO | - | YES | 0.67 |
| 6 | 0 | 1 | 1 | 0 | YES | -0.33 | YES | -0.33 |
| 7 | 0 | 1 | 1 | 1 | YES | -0.67 | YES | -0.67 |
| 8 | 1 | 0 | 0 | 0 | YES | 0.67 | YES | 0.67 |
| 9 | 1 | 0 | 0 | 1 | YES | 0.33 | YES | 0.33 |
| 10 | 1 | 0 | 1 | 0 | NO | - | YES | 0.00 |
| 11 | 1 | 0 | 1 | 1 | NO | - | YES | -0.33 |
| 12 | 1 | 1 | 0 | 0 | YES | 0.00 | YES | 0.00 |
| 13 | 1 | 1 | 0 | 1 | NO | - | YES | -0.33 |
| 14 | 1 | 1 | 1 | 0 | YES | -0.67 | YES | -0.67 |
| 15 | 1 | 1 | 1 | 1 | YES | -1.00 | YES | -1.00 |

FIG. 9

Code : RLL(1,7)
Class : PR(1,2,2,1)
Normalization : Amplitude ± 1

| Pattern | | Pattern-T | Pattern-F | Shift-Direction (T to F) | Euclid Distance | |
|---|---|---|---|---|---|---|
| Pat. Bits | No. | | | | Direct | Norm. |
| 7Bit | 1 | XX01XXX | XX00XXX | Right | 10 | 1.11 |
| | 2 | XXX01XX | XXX11XX | Left | | |
| | 3 | XX10XXX | XX11XXX | Right | | |
| | 4 | XXX10XX | XXX00XX | Left | | |

FIG. 10

Code : RLL(1,7)
Class : PR(a,b,c,d)
Normalization : ±1
Mark : bit "1" & Low Level

| No. | Bit Array | | | | Decoder | | Evaluation | | |
|---|---|---|---|---|---|---|---|---|---|
| | | | | | Valid | Target Level | Valid | Virtual | Target Level |
| 0 | 0 | 0 | 0 | 0 | YES | v0 | YES | NO | v0 |
| 1 | 0 | 0 | 0 | 1 | YES | v1 | YES | NO | v1 |
| 2 | 0 | 0 | 1 | 0 | NO | - | YES | YES | v2=v3-v1+v0 |
| 3 | 0 | 0 | 1 | 1 | YES | v3 | YES | NO | v3 |
| 4 | 0 | 1 | 0 | 0 | NO | - | YES | YES | v4=v6-v2+v0 |
| 5 | 0 | 1 | 0 | 1 | NO | - | YES | YES | v5=v7-v2+v0 |
| 6 | 0 | 1 | 1 | 0 | YES | v6 | YES | NO | v6 |
| 7 | 0 | 1 | 1 | 1 | YES | v7 | YES | NO | v7 |
| 8 | 1 | 0 | 0 | 0 | YES | v8 | YES | NO | v8 |
| 9 | 1 | 0 | 0 | 1 | YES | v9 | YES | NO | v9 |
| 10 | 1 | 0 | 1 | 0 | NO | - | YES | YES | v10=v8-v13+v15 |
| 11 | 1 | 0 | 1 | 1 | NO | - | YES | YES | v11=v9-v13+v15 |
| 12 | 1 | 1 | 0 | 0 | YES | v12 | YES | NO | v12 |
| 13 | 1 | 1 | 0 | 1 | NO | - | YES | YES | v13=v12-v14+v15 |
| 14 | 1 | 1 | 1 | 0 | YES | v14 | YES | NO | v14 |
| 15 | 1 | 1 | 1 | 1 | YES | v15 | YES | NO | v15 |

FIG. 11

|  | MLSE | S-SEAT | V-SEAT |
|---|---|---|---|
| Name | <u>M</u>aximum–<u>L</u>ikelihood <u>S</u>equence <u>E</u>rror | <u>S</u>igned–<u>S</u>equenced <u>E</u>rror for <u>A</u>daptive <u>T</u>arget | <u>V</u>irtual-state-based-<u>S</u>equenced <u>E</u>rror for <u>A</u>daptive <u>T</u>arget |
| Target Level | Fixed Only | Fixed/Variable | Fixed/Variable |
| Shift-Direction Detection | NO | YES | YES |
| Min RLL Pat. Shift Detection | NO | NO | YES |
| Definition | $MD = \lvert ED(p1) - ED(p2) \rvert - d_{min}^2$ $MLSE = \dfrac{MD_{rms}}{2d_{min}^2}$ $MD_{rms} = \sqrt{\dfrac{\sum MD^2}{N}}$ | $d_{min} = Average(ED_{min})$ $D = Sign(ShiftDirection) \times (ED(P_{false}) - ED(P_{true}) - d_{min})$ $\sigma = \dfrac{D_{rms}}{2d_{min}}$ $D_{rms} = \sqrt{\dfrac{\sum D^2}{N}}$ | Same as S-SEAT and Virtual State for RLL Error Patterns are Evaluated in terms of Bit Convolution. | where
(1) ED(P): Euclid Distanse of Bit Pattern P
(2) EDmin: Minimum Euclid Distanse
(3) Shift Direction:
 Right Edge Shift = "+"
 Left Edge Shift = "−"
 defined by evaluation bit patterns

FIG. 12

Code : RLL(1,7)
Class : PR(1,2,1)/PR(a,b,c)
Normalization : Amplitude ± 1

| Pattern | | | Pattern-T | Pattern-F | Shift-Direction (T to F) | Euclid Distance | |
|---|---|---|---|---|---|---|---|
| Error Bits | Pat. Bits | No. | | | | Direct | Norm. |
| 1Bit | 5Bit | 1 | 00111 | 00011 | Right | 6 | 1.50 |
| | | 2 | 11100 | 11000 | Left | | |

FIG. 13

Code : RLL(1,7)
Class : PR(a,b,c)
Normalization : ±1
Mark : bit "1" & Low Level

| No. | Bit Array | | | Decoder | |
|---|---|---|---|---|---|
| | | | | Valid | Target Level |
| 0 | 0 | 0 | 0 | YES | v0 |
| 1 | 0 | 0 | 1 | YES | v1 |
| 2 | 0 | 1 | 0 | NO | - |
| 3 | 0 | 1 | 1 | YES | v3 |
| 4 | 1 | 0 | 0 | YES | v4 |
| 5 | 1 | 0 | 1 | NO | - |
| 6 | 1 | 1 | 0 | YES | v6 |
| 7 | 1 | 1 | 1 | YES | v7 |

FIG. 14

Code : RLL(1,7)
Class : PR(1,2,1)/PR(a,b,c)
Normalization : Amplitude ±1

| Pattern | | Pattern-T | Pattern-F | Shift-Direction (T to F) | Euclid Distance | |
|---|---|---|---|---|---|---|
| Pat. Bits | No. | | | | Direct | Norm. |
| 5Bit | 1 | X01XX | X00XX | Right | 6 | 1.50 |
| | 2 | XX01X | XX11X | Left | | |
| | 3 | X10XX | X11XX | Right | | |
| | 4 | XX10X | XX00X | Left | | |

FIG. 15

Code : RLL(1,7)
Class : PR(1,2,1)
Normalization : ±1
Mark : bit "1" & Low Level

| No. | Bit Array | | | Decoder | | Evaluation | |
|---|---|---|---|---|---|---|---|
| | | | | Valid | Target Level | Valid | Target Level |
| 0 | 0 | 0 | 0 | YES | 1.00 | YES | 1.00 |
| 1 | 0 | 0 | 1 | YES | 0.50 | YES | 0.50 |
| 2 | 0 | 1 | 0 | NO | - | YES | 0.00 |
| 3 | 0 | 1 | 1 | YES | -0.50 | YES | -0.50 |
| 4 | 1 | 0 | 0 | YES | 0.50 | YES | 0.50 |
| 5 | 1 | 0 | 1 | NO | - | YES | 0.00 |
| 6 | 1 | 1 | 0 | YES | -0.50 | YES | -0.50 |
| 7 | 1 | 1 | 1 | YES | -1.00 | YES | -1.00 |

FIG. 16

Code : RLL(1,7)
Class : PR(a,b,c)
Normalization : ±1
Mark : bit "1" & Low Level

| No. | Bit Array | | | Decoder | | Evaluation | | |
|---|---|---|---|---|---|---|---|---|
| | | | | Valid | Target Level | Valid | Virtual | Target Level |
| 0 | 0 | 0 | 0 | YES | v0 | YES | NO | v0 |
| 1 | 0 | 0 | 1 | YES | v1 | YES | NO | v1 |
| 2 | 0 | 1 | 0 | NO | - | YES | YES | v2=v3-v1+v0 |
| 3 | 0 | 1 | 1 | YES | v3 | YES | NO | v3 |
| 4 | 1 | 0 | 0 | YES | v4 | YES | NO | v4 |
| 5 | 1 | 0 | 1 | NO | - | YES | YES | v5=v4-v6+v7 |
| 6 | 1 | 1 | 0 | YES | v6 | YES | NO | v6 |
| 7 | 1 | 1 | 1 | YES | v7 | YES | NO | v7 |

FIG. 17

Code : RLL(1,7)
Class : PR(1,2,2,2,1)/PR(a,b,c,d,e)
Normalization : Amplitude ± 1

| Pattern | | | Pattern-T | Pattern-F | Shift-Direction (T to F) | Euclid Distance | |
|---|---|---|---|---|---|---|---|
| Error Bits | Pat. Bits | No. | | | | Direct | Norm. |
| 1Bit | 9Bit | 1 | 000011100 | 000001100 | Right | 14 | 1.11 |
| | | 2 | 000011110 | 000001110 | Right | | |
| | | 3 | 000011111 | 000001111 | Right | | |
| | | 4 | 001110000 | 001100000 | Left | | |
| | | 5 | 001110001 | 001100001 | Left | | |
| | | 6 | 001110011 | 001100011 | Left | | |
| | | 7 | 011110000 | 011100000 | Left | | |
| | | 8 | 011110001 | 011100001 | Left | | |
| | | 9 | 011110011 | 011100011 | Left | | |
| | | 10 | 100011100 | 100001100 | Right | | |
| | | 11 | 100011110 | 100001110 | Right | | |
| | | 12 | 100011111 | 100001111 | Right | | |
| | | 13 | 110011100 | 110001100 | Right | | |
| | | 14 | 110011110 | 110001110 | Right | | |
| | | 15 | 110011111 | 110001111 | Right | | |
| | | 16 | 111110000 | 111100000 | Left | | |
| | | 17 | 111110001 | 111100001 | Left | | |
| | | 18 | 111110011 | 111100011 | Left | | |

FIG. 18

Code : RLL(1,7)
Class : PR(a,b,c,d,e)
Normalization : ±1
Mark : bit "1" &
       Low Level

| No. | Bit Array | | | | | Decoder | |
|-----|---|---|---|---|---|---|---|
|     |   |   |   |   |   | Valid | Target Level |
| 0   | 0 | 0 | 0 | 0 | 0 | YES | v0 |
| 1   | 0 | 0 | 0 | 0 | 1 | YES | v1 |
| 2   | 0 | 0 | 0 | 1 | 0 | NO  | -  |
| 3   | 0 | 0 | 0 | 1 | 1 | YES | v3 |
| 4   | 0 | 0 | 1 | 0 | 0 | NO  | -  |
| 5   | 0 | 0 | 1 | 0 | 1 | NO  | -  |
| 6   | 0 | 0 | 1 | 1 | 0 | YES | v6 |
| 7   | 0 | 0 | 1 | 1 | 1 | YES | v7 |
| 8   | 0 | 1 | 0 | 0 | 0 | NO  | -  |
| 9   | 0 | 1 | 0 | 0 | 1 | NO  | -  |
| 10  | 0 | 1 | 0 | 1 | 0 | NO  | -  |
| 11  | 0 | 1 | 0 | 1 | 1 | NO  | -  |
| 12  | 0 | 1 | 1 | 0 | 0 | YES | v12 |
| 13  | 0 | 1 | 1 | 0 | 1 | NO  | v13 |
| 14  | 0 | 1 | 1 | 1 | 0 | YES | v14 |
| 15  | 0 | 1 | 1 | 1 | 1 | YES | v15 |
| 16  | 1 | 0 | 0 | 0 | 0 | YES | v16 |
| 17  | 1 | 0 | 0 | 0 | 1 | YES | v17 |
| 18  | 1 | 0 | 0 | 1 | 0 | NO  | v18 |
| 19  | 1 | 0 | 0 | 1 | 1 | YES | v19 |
| 20  | 1 | 0 | 1 | 0 | 0 | NO  | -  |
| 21  | 1 | 0 | 1 | 0 | 1 | NO  | -  |
| 22  | 1 | 0 | 1 | 1 | 0 | NO  | -  |
| 23  | 1 | 0 | 1 | 1 | 1 | NO  | -  |
| 24  | 1 | 1 | 0 | 0 | 0 | YES | v24 |
| 25  | 1 | 1 | 0 | 0 | 1 | YES | v25 |
| 26  | 1 | 1 | 0 | 1 | 0 | NO  | -  |
| 27  | 1 | 1 | 0 | 1 | 1 | NO  | -  |
| 28  | 1 | 1 | 1 | 0 | 0 | YES |    |
| 29  | 1 | 1 | 1 | 0 | 1 | NO  | v29 |
| 30  | 1 | 1 | 1 | 1 | 0 | YES | v30 |
| 31  | 1 | 1 | 1 | 1 | 1 | YES | v31 |

FIG. 19

Code : RLL(1,7)
Class : PR(1,2,2,2,1)/PR(a,b,c,d,e)
Normalization : Amplitude ± 1

| Pattern | | Pattern-T | Pattern-F | Shift-Direction (T to F) | Euclid Distance | |
|---|---|---|---|---|---|---|
| Pat. Bits | No. | | | | Direct | Norm. |
| 9Bit | 1 | XXX01XXXX | XXX00XXXX | Right | 14 | 1.11 |
| | 2 | XXXX01XXX | XXXX11XXX | Left | | |
| | 3 | XXX10XXXX | XXX11XXXX | Right | | |
| | 4 | XXXX10XXX | XXXX00XXX | Left | | |

FIG. 20

Code : RLL(1,7)
Class : PR(1,2,2,2,1)
Normalization : ±1
Mark : bit "1" & Low Level

| No. | Bit Array | | | | | Decoder | | Evaluation | |
|---|---|---|---|---|---|---|---|---|---|
| | | | | | | Valid | Target Level | Valid | Target Level |
| 0 | 0 | 0 | 0 | 0 | 0 | YES | 1.00 | YES | 1.00 |
| 1 | 0 | 0 | 0 | 0 | 1 | YES | 0.75 | YES | 0.75 |
| 2 | 0 | 0 | 0 | 1 | 0 | NO | - | YES | 0.50 |
| 3 | 0 | 0 | 0 | 1 | 1 | YES | 0.25 | YES | 0.25 |
| 4 | 0 | 0 | 1 | 0 | 0 | NO | - | YES | 0.50 |
| 5 | 0 | 0 | 1 | 0 | 1 | NO | - | YES | 0.25 |
| 6 | 0 | 0 | 1 | 1 | 0 | YES | 0.00 | YES | 0.00 |
| 7 | 0 | 0 | 1 | 1 | 1 | YES | -0.25 | YES | -0.25 |
| 8 | 0 | 1 | 0 | 0 | 0 | NO | - | YES | 0.50 |
| 9 | 0 | 1 | 0 | 0 | 1 | NO | - | YES | 0.25 |
| 10 | 0 | 1 | 0 | 1 | 0 | NO | - | YES | 0.00 |
| 11 | 0 | 1 | 0 | 1 | 1 | NO | - | YES | -0.25 |
| 12 | 0 | 1 | 1 | 0 | 0 | YES | 0.00 | YES | 0.00 |
| 13 | 0 | 1 | 1 | 0 | 1 | NO | -0.25 | YES | -0.25 |
| 14 | 0 | 1 | 1 | 1 | 0 | YES | -0.50 | YES | -0.50 |
| 15 | 0 | 1 | 1 | 1 | 1 | YES | -0.75 | YES | -0.75 |
| 16 | 1 | 0 | 0 | 0 | 0 | YES | 0.75 | YES | 0.75 |
| 17 | 1 | 0 | 0 | 0 | 1 | YES | 0.50 | YES | 0.50 |
| 18 | 1 | 0 | 0 | 1 | 0 | NO | 0.25 | YES | 0.25 |
| 19 | 1 | 0 | 0 | 1 | 1 | YES | 0.00 | YES | 0.00 |
| 20 | 1 | 0 | 1 | 0 | 0 | NO | - | YES | 0.25 |
| 21 | 1 | 0 | 1 | 0 | 1 | NO | - | YES | 0.00 |
| 22 | 1 | 0 | 1 | 1 | 0 | NO | - | YES | -0.25 |
| 23 | 1 | 0 | 1 | 1 | 1 | NO | - | YES | -0.50 |
| 24 | 1 | 1 | 0 | 0 | 0 | YES | 0.25 | YES | 0.25 |
| 25 | 1 | 1 | 0 | 0 | 1 | YES | 0.00 | YES | 0.00 |
| 26 | 1 | 1 | 0 | 1 | 0 | NO | - | YES | -0.25 |
| 27 | 1 | 1 | 0 | 1 | 1 | NO | - | YES | -0.50 |
| 28 | 1 | 1 | 1 | 0 | 0 | YES | -0.25 | YES | -0.25 |
| 29 | 1 | 1 | 1 | 0 | 1 | NO | -0.50 | YES | -0.50 |
| 30 | 1 | 1 | 1 | 1 | 0 | YES | -0.75 | YES | -0.75 |
| 31 | 1 | 1 | 1 | 1 | 1 | YES | -1.00 | YES | -1.00 |

FIG. 21

| Code : RLL(1,7) Class : PR(a,b,c,d,e) Normalization : ±1 Mark : bit "1" & Low Level |
|---|

| No. | Bit Array | | | | | Decoder | | Evaluation | | |
|---|---|---|---|---|---|---|---|---|---|---|
| | | | | | | Valid | Target Level | Valid | Virtual | Target Level |
| 0 | 0 | 0 | 0 | 0 | 0 | YES | v0 | YES | NO | v0 |
| 1 | 0 | 0 | 0 | 0 | 1 | YES | v1 | YES | NO | v1 |
| 2 | 0 | 0 | 0 | 1 | 0 | NO | - | YES | YES | v2=v3-v1+v0 |
| 3 | 0 | 0 | 0 | 1 | 1 | YES | v3 | YES | NO | v3 |
| 4 | 0 | 0 | 1 | 0 | 0 | NO | - | YES | YES | v4=v6-v2+v0 |
| 5 | 0 | 0 | 1 | 0 | 1 | NO | - | YES | YES | v5=v6-v1+v0 |
| 6 | 0 | 0 | 1 | 1 | 0 | YES | v6 | YES | NO | v6 |
| 7 | 0 | 0 | 1 | 1 | 1 | YES | v7 | YES | NO | v7 |
| 8 | 0 | 1 | 0 | 0 | 0 | NO | - | YES | YES | v8=v24-v16+v0 |
| 9 | 0 | 1 | 0 | 0 | 1 | NO | - | YES | YES | v9=v25-v16+v0 |
| 10 | 0 | 1 | 0 | 1 | 0 | NO | - | YES | YES | v10=v14-v4+v0 |
| 11 | 0 | 1 | 0 | 1 | 1 | NO | - | YES | YES | v11=v15-v4+v0 |
| 12 | 0 | 1 | 1 | 0 | 0 | YES | v12 | YES | NO | v12 |
| 13 | 0 | 1 | 1 | 0 | 1 | NO | v13 | YES | YES | v13=v15-v2+v0 |
| 14 | 0 | 1 | 1 | 1 | 0 | YES | v14 | YES | NO | v14 |
| 15 | 0 | 1 | 1 | 1 | 1 | YES | v15 | YES | NO | v15 |
| 16 | 1 | 0 | 0 | 0 | 0 | YES | v16 | YES | NO | v16 |
| 17 | 1 | 0 | 0 | 0 | 1 | YES | v17 | YES | NO | v17 |
| 18 | 1 | 0 | 0 | 1 | 0 | NO | v18 | YES | YES | v18=v16-v29+v31 |
| 19 | 1 | 0 | 0 | 1 | 1 | YES | v19 | YES | NO | v19 |
| 20 | 1 | 0 | 1 | 0 | 0 | NO | - | YES | YES | v20=v16-v27+v0 |
| 21 | 1 | 0 | 1 | 0 | 1 | NO | - | YES | YES | v21=v17-v27+v31 |
| 22 | 1 | 0 | 1 | 1 | 0 | NO | - | YES | YES | v22=v6-v15+v31 |
| 23 | 1 | 0 | 1 | 1 | 1 | NO | - | YES | YES | v23=v7-v15+v31 |
| 24 | 1 | 1 | 0 | 0 | 0 | YES | v24 | YES | NO | v24 |
| 25 | 1 | 1 | 0 | 0 | 1 | YES | v25 | YES | NO | v25 |
| 26 | 1 | 1 | 0 | 1 | 0 | NO | - | YES | YES | v26=v25-v30+v31 |
| 27 | 1 | 1 | 0 | 1 | 1 | NO | - | YES | YES | v27=v25-v29+v31 |
| 28 | 1 | 1 | 1 | 0 | 0 | YES | | YES | NO | v28 |
| 29 | 1 | 1 | 1 | 0 | 1 | NO | v29 | YES | YES | v29=v28-v30+v31 |
| 30 | 1 | 1 | 1 | 1 | 0 | YES | v30 | YES | NO | v30 |
| 31 | 1 | 1 | 1 | 1 | 1 | YES | v31 | YES | NO | v31 |

FIG. 22

```
Code : RLL(1,7)
Class : PR(1,2,3,3,2,1)/PR(a,b,c,d,e,f,g)
Normalization : Amplitude ± 1
```

| Pattern | | | Pattern-T | Pattern-F | Shift-Direction (T to F) | Euclid Distance | |
|---|---|---|---|---|---|---|---|
| Error Bits | Pat. Bits | No. | | | | Direct | Norm. |
| 1Bit | 7Bit | 1 | 00111000000 | 00111100000 | Right | 28 | 0.78 |
| | | 2 | 00111000001 | 00111100001 | Right | | |
| | | 3 | 00111000011 | 00111100011 | Right | | |
| | | 4 | 11000011100 | 11000111100 | Left | | |
| | | 5 | 11000011110 | 11000111110 | Left | | |
| | | 6 | 11000011111 | 11000111111 | Left | | |
| | | 7 | 01111000000 | 01111100000 | Right | | |
| | | 8 | 01111000001 | 01111100001 | Right | | |
| | | 9 | 01111000011 | 01111100011 | Right | | |
| | | 10 | 10000011100 | 10000111100 | Left | | |
| | | 11 | 10000011110 | 10000111110 | Left | | |
| | | 12 | 10000011111 | 10000111111 | Left | | |
| | | 13 | 00000011100 | 00000111100 | Left | | |
| | | 14 | 00000011110 | 00000111110 | Left | | |
| | | 15 | 00000011111 | 00000111111 | Left | | |
| | | 16 | 11111000000 | 11111100000 | Right | | |
| | | 17 | 11111000001 | 11111100001 | Right | | |
| | | 18 | 11111000011 | 11111100011 | Right | | |

FIG. 23

Code : RLL(1,7)
Class : PR(a,b,c,d,e,f)
Normalization : Amplitude ± 1

| No. | Bit Array | | | | | | Decoder | | No. | Bit Array | | | | | | Decoder | |
|---|---|---|---|---|---|---|---|---|---|---|---|---|---|---|---|---|---|
| | | | | | | | Valid | Target Level | | | | | | | | Valid | Target Level |
| 0 | 0 | 0 | 0 | 0 | 0 | 0 | YES | v0 | 32 | 1 | 0 | 0 | 0 | 0 | 0 | YES | v32 |
| 1 | 0 | 0 | 0 | 0 | 0 | 1 | YES | v1 | 33 | 1 | 0 | 0 | 0 | 0 | 1 | YES | v33 |
| 2 | 0 | 0 | 0 | 0 | 1 | 0 | NO | - | 34 | 1 | 0 | 0 | 0 | 1 | 0 | NO | - |
| 3 | 0 | 0 | 0 | 0 | 1 | 1 | YES | v3 | 35 | 1 | 0 | 0 | 0 | 1 | 1 | YES | v34 |
| 4 | 0 | 0 | 0 | 1 | 0 | 0 | NO | - | 36 | 1 | 0 | 0 | 1 | 0 | 0 | NO | - |
| 5 | 0 | 0 | 0 | 1 | 0 | 1 | NO | - | 37 | 1 | 0 | 0 | 1 | 0 | 1 | NO | - |
| 6 | 0 | 0 | 0 | 1 | 1 | 0 | YES | v6 | 38 | 1 | 0 | 0 | 1 | 1 | 0 | YES | v38 |
| 7 | 0 | 0 | 0 | 1 | 1 | 1 | YES | v7 | 39 | 1 | 0 | 0 | 1 | 1 | 1 | YES | v39 |
| 8 | 0 | 0 | 1 | 0 | 0 | 0 | NO | - | 40 | 1 | 0 | 1 | 0 | 0 | 0 | NO | - |
| 9 | 0 | 0 | 1 | 0 | 0 | 1 | NO | - | 41 | 1 | 0 | 1 | 0 | 0 | 1 | NO | - |
| 10 | 0 | 0 | 1 | 0 | 1 | 0 | NO | - | 42 | 1 | 0 | 1 | 0 | 1 | 0 | NO | - |
| 11 | 0 | 0 | 1 | 0 | 1 | 1 | NO | - | 43 | 1 | 0 | 1 | 0 | 1 | 1 | NO | - |
| 12 | 0 | 0 | 1 | 1 | 0 | 0 | YES | v12 | 44 | 1 | 0 | 1 | 1 | 0 | 0 | NO | - |
| 13 | 0 | 0 | 1 | 1 | 0 | 1 | NO | - | 45 | 1 | 0 | 1 | 1 | 0 | 1 | NO | - |
| 14 | 0 | 0 | 1 | 1 | 1 | 0 | YES | v14 | 46 | 1 | 0 | 1 | 1 | 1 | 0 | NO | - |
| 15 | 0 | 0 | 1 | 1 | 1 | 1 | YES | v15 | 47 | 1 | 0 | 1 | 1 | 1 | 1 | NO | - |
| 16 | 0 | 1 | 0 | 0 | 0 | 0 | NO | - | 48 | 1 | 1 | 0 | 0 | 0 | 0 | YES | v48 |
| 17 | 0 | 1 | 0 | 0 | 0 | 1 | NO | - | 49 | 1 | 1 | 0 | 0 | 0 | 1 | YES | v49 |
| 18 | 0 | 1 | 0 | 0 | 1 | 0 | NO | - | 50 | 1 | 1 | 0 | 0 | 1 | 0 | NO | - |
| 19 | 0 | 1 | 0 | 0 | 1 | 1 | NO | - | 51 | 1 | 1 | 0 | 0 | 1 | 1 | YES | v51 |
| 20 | 0 | 1 | 0 | 1 | 0 | 0 | NO | - | 52 | 1 | 1 | 0 | 1 | 0 | 0 | NO | - |
| 21 | 0 | 1 | 0 | 1 | 0 | 1 | NO | - | 53 | 1 | 1 | 0 | 1 | 0 | 1 | NO | - |
| 22 | 0 | 1 | 0 | 1 | 1 | 0 | NO | - | 54 | 1 | 1 | 0 | 1 | 1 | 0 | NO | - |
| 23 | 0 | 1 | 0 | 1 | 1 | 1 | NO | - | 55 | 1 | 1 | 0 | 1 | 1 | 1 | NO | - |
| 24 | 0 | 1 | 1 | 0 | 0 | 0 | YES | v24 | 56 | 1 | 1 | 1 | 0 | 0 | 0 | YES | v56 |
| 25 | 0 | 1 | 1 | 0 | 0 | 1 | YES | v25 | 57 | 1 | 1 | 1 | 0 | 0 | 1 | YES | v57 |
| 26 | 0 | 1 | 1 | 0 | 1 | 0 | NO | - | 58 | 1 | 1 | 1 | 0 | 1 | 0 | NO | - |
| 27 | 0 | 1 | 1 | 0 | 1 | 1 | NO | - | 59 | 1 | 1 | 1 | 0 | 1 | 1 | NO | - |
| 28 | 0 | 1 | 1 | 1 | 0 | 0 | YES | v28 | 60 | 1 | 1 | 1 | 1 | 0 | 0 | YES | v60 |
| 29 | 0 | 1 | 1 | 1 | 0 | 1 | NO | - | 61 | 1 | 1 | 1 | 1 | 0 | 1 | NO | - |
| 30 | 0 | 1 | 1 | 1 | 1 | 0 | YES | v30 | 62 | 1 | 1 | 1 | 1 | 1 | 0 | YES | v62 |
| 31 | 0 | 1 | 1 | 1 | 1 | 1 | YES | v31 | 63 | 1 | 1 | 1 | 1 | 1 | 1 | YES | v63 |

FIG. 24

Code : RLL(1,7)
Class : PR(1,2,3,3,2,1)
Normalization : Amplitude ± 1

| Pattern | | Pattern-T | Pattern-F | Shift-Direction (T to F) | Euclid Distance | |
|---|---|---|---|---|---|---|
| Pat. Bits | No. | | | | Direct | Norm. |
| 11Bit | 1 | XXXX01XXXXX | XXXX00XXXXX | Right | 28 | 0.78 |
| | 2 | XXXXX01XXXX | XXXXX11XXXX | Left | | |
| | 3 | XXXX10XXXXX | XXXX11XXXXX | Right | | |
| | 4 | XXXXX10XXXX | XXXXX00XXXX | Left | | |

FIG. 25-1

| Code : RLL(1,7) Class : PR(1,2,2,2,1) Normalization : ±1 Mark : bit "1" & Low Level | | | | | | | | |
|---|---|---|---|---|---|---|---|---|

| No. | Bit Array | | | | | | Decoder | | Evaluation | |
|---|---|---|---|---|---|---|---|---|---|---|
|  |  |  |  |  |  |  | Valid | Target Level | Valid | Target Level |
| 0 | 0 | 0 | 0 | 0 | 0 | 0 | YES | 1.00 | YES | 1.00 |
| 1 | 0 | 0 | 0 | 0 | 0 | 1 | YES | 0.83 | YES | 0.83 |
| 2 | 0 | 0 | 0 | 0 | 1 | 0 | NO | - | YES | 0.67 |
| 3 | 0 | 0 | 0 | 0 | 1 | 1 | YES | 0.50 | YES | 0.50 |
| 4 | 0 | 0 | 0 | 1 | 0 | 0 | NO | - | YES | 0.50 |
| 5 | 0 | 0 | 0 | 1 | 0 | 1 | NO | - | YES | 0.33 |
| 6 | 0 | 0 | 0 | 1 | 1 | 0 | YES | 0.17 | YES | 0.17 |
| 7 | 0 | 0 | 0 | 1 | 1 | 1 | YES | 0.00 | YES | 0.00 |
| 8 | 0 | 0 | 1 | 0 | 0 | 0 | NO | - | YES | 0.50 |
| 9 | 0 | 0 | 1 | 0 | 0 | 1 | NO | - | YES | 0.33 |
| 10 | 0 | 0 | 1 | 0 | 1 | 0 | NO | - | YES | 0.17 |
| 11 | 0 | 0 | 1 | 0 | 1 | 1 | NO | - | YES | 0.00 |
| 12 | 0 | 0 | 1 | 1 | 0 | 0 | YES | 0.00 | YES | 0.00 |
| 13 | 0 | 0 | 1 | 1 | 0 | 1 | NO | - | YES | -0.17 |
| 14 | 0 | 0 | 1 | 1 | 1 | 0 | YES | -0.33 | YES | -0.33 |
| 15 | 0 | 0 | 1 | 1 | 1 | 1 | YES | -0.50 | YES | -0.50 |
| 16 | 0 | 1 | 0 | 0 | 0 | 0 | NO | - | YES | 0.67 |
| 17 | 0 | 1 | 0 | 0 | 0 | 1 | NO | - | YES | 0.50 |
| 18 | 0 | 1 | 0 | 0 | 1 | 0 | NO | - | YES | 0.33 |
| 19 | 0 | 1 | 0 | 0 | 1 | 1 | NO | - | YES | 0.17 |
| 20 | 0 | 1 | 0 | 1 | 0 | 0 | NO | - | YES | 0.17 |
| 21 | 0 | 1 | 0 | 1 | 0 | 1 | NO | - | YES | 0.00 |
| 22 | 0 | 1 | 0 | 1 | 1 | 0 | NO | - | YES | -0.17 |
| 23 | 0 | 1 | 0 | 1 | 1 | 1 | NO | - | YES | -0.33 |
| 24 | 0 | 1 | 1 | 0 | 0 | 0 | YES | 0.17 | YES | 0.17 |
| 25 | 0 | 1 | 1 | 0 | 0 | 1 | YES | 0.00 | YES | 0.00 |
| 26 | 0 | 1 | 1 | 0 | 1 | 0 | NO | - | YES | -0.17 |
| 27 | 0 | 1 | 1 | 0 | 1 | 1 | NO | - | YES | -0.33 |
| 28 | 0 | 1 | 1 | 1 | 0 | 0 | YES | -0.33 | YES | -0.33 |
| 29 | 0 | 1 | 1 | 1 | 0 | 1 | NO | - | YES | -0.50 |
| 30 | 0 | 1 | 1 | 1 | 1 | 0 | YES | -0.67 | YES | -0.67 |
| 31 | 0 | 1 | 1 | 1 | 1 | 1 | YES | -0.83 | YES | -0.83 |

Code : RLL(1,7)
Class : PR(1,2,2,2,1)
Normalization : ±1
Mark : bit "1" & Low Level

| No. | Bit Array | | | | | | Decoder | | Evaluation | |
|---|---|---|---|---|---|---|---|---|---|---|
| | | | | | | | Valid | Target Level | Valid | Target Level |
| 32 | 1 | 0 | 0 | 0 | 0 | 0 | YES | 0.83 | YES | 0.83 |
| 33 | 1 | 0 | 0 | 0 | 0 | 1 | YES | 0.67 | YES | 0.67 |
| 34 | 1 | 0 | 0 | 0 | 1 | 0 | NO | - | YES | 0.50 |
| 35 | 1 | 0 | 0 | 0 | 1 | 1 | YES | 0.33 | YES | 0.33 |
| 36 | 1 | 0 | 0 | 1 | 0 | 0 | NO | - | YES | 0.33 |
| 37 | 1 | 0 | 0 | 1 | 0 | 1 | NO | - | YES | 0.17 |
| 38 | 1 | 0 | 0 | 1 | 1 | 0 | YES | 0.00 | YES | 0.00 |
| 39 | 1 | 0 | 0 | 1 | 1 | 1 | YES | -0.17 | YES | -0.17 |
| 40 | 1 | 0 | 1 | 0 | 0 | 0 | NO | - | YES | 0.33 |
| 41 | 1 | 0 | 1 | 0 | 0 | 1 | NO | - | YES | 0.17 |
| 42 | 1 | 0 | 1 | 0 | 1 | 0 | NO | - | YES | 0.00 |
| 43 | 1 | 0 | 1 | 0 | 1 | 1 | NO | - | YES | -0.17 |
| 44 | 1 | 0 | 1 | 1 | 0 | 0 | NO | - | YES | -0.17 |
| 45 | 1 | 0 | 1 | 1 | 0 | 1 | NO | - | YES | -0.33 |
| 46 | 1 | 0 | 1 | 1 | 1 | 0 | NO | - | YES | -0.50 |
| 47 | 1 | 0 | 1 | 1 | 1 | 1 | NO | - | YES | -0.67 |
| 48 | 1 | 1 | 0 | 0 | 0 | 0 | YES | 0.50 | YES | 0.50 |
| 49 | 1 | 1 | 0 | 0 | 0 | 1 | YES | 0.33 | YES | 0.33 |
| 50 | 1 | 1 | 0 | 0 | 1 | 0 | NO | - | YES | 0.17 |
| 51 | 1 | 1 | 0 | 0 | 1 | 1 | YES | 0.00 | YES | 0.00 |
| 52 | 1 | 1 | 0 | 1 | 0 | 0 | NO | - | YES | 0.00 |
| 53 | 1 | 1 | 0 | 1 | 0 | 1 | NO | - | YES | -0.17 |
| 54 | 1 | 1 | 0 | 1 | 1 | 0 | NO | - | YES | -0.33 |
| 55 | 1 | 1 | 0 | 1 | 1 | 1 | NO | - | YES | -0.50 |
| 56 | 1 | 1 | 1 | 0 | 0 | 0 | YES | 0.00 | YES | 0.00 |
| 57 | 1 | 1 | 1 | 0 | 0 | 1 | YES | -0.17 | YES | -0.17 |
| 58 | 1 | 1 | 1 | 0 | 1 | 0 | NO | - | YES | -0.33 |
| 59 | 1 | 1 | 1 | 0 | 1 | 1 | NO | - | YES | -0.50 |
| 60 | 1 | 1 | 1 | 1 | 0 | 0 | YES | -0.50 | YES | -0.50 |
| 61 | 1 | 1 | 1 | 1 | 0 | 1 | NO | - | YES | -0.67 |
| 62 | 1 | 1 | 1 | 1 | 1 | 0 | YES | -0.83 | YES | -0.83 |
| 63 | 1 | 1 | 1 | 1 | 1 | 1 | YES | -1.00 | YES | -1.00 |

FIG. 26-1

| Code : RLL(1,7)<br>Class : PR(a,b,c,d,e,f)<br>Normalization : ±1<br>Mark : bit "1" &<br>Low Level | No. | Bit Array | | | | | | Decoder | | Evaluation | | |
|---|---|---|---|---|---|---|---|---|---|---|---|---|
| | | | | | | | | Valid | Target Level | Valid | Virtual | Target Level |
| | 0 | 0 | 0 | 0 | 0 | 0 | 0 | YES | v0 | YES | NO | v0 |
| | 1 | 0 | 0 | 0 | 0 | 0 | 1 | YES | v1 | YES | NO | v1 |
| | 2 | 0 | 0 | 0 | 0 | 1 | 0 | NO | - | YES | YES | v2=v3-v1+v0 |
| | 3 | 0 | 0 | 0 | 0 | 1 | 1 | YES | v3 | YES | NO | v3 |
| | 4 | 0 | 0 | 0 | 1 | 0 | 0 | NO | - | YES | YES | v4=v6-v2+v0 |
| | 5 | 0 | 0 | 0 | 1 | 0 | 1 | NO | - | YES | YES | by(Equation 10) |
| | 6 | 0 | 0 | 0 | 1 | 1 | 0 | YES | v6 | YES | NO | v6 |
| | 7 | 0 | 0 | 0 | 1 | 1 | 1 | YES | v7 | YES | NO | v7 |
| | 8 | 0 | 0 | 1 | 0 | 0 | 0 | NO | - | YES | YES | v8=v24-v16+v0 |
| | 9 | 0 | 0 | 1 | 0 | 0 | 1 | NO | - | YES | YES | by(Equation 10) |
| | 10 | 0 | 0 | 1 | 0 | 1 | 0 | NO | - | YES | YES | by(Equation 10) |
| | 11 | 0 | 0 | 1 | 0 | 1 | 1 | NO | - | YES | YES | by(Equation 10) |
| | 12 | 0 | 0 | 1 | 1 | 0 | 0 | YES | v12 | YES | NO | v12 |
| | 13 | 0 | 0 | 1 | 1 | 0 | 1 | NO | - | YES | YES | by(Equation 10) |
| | 14 | 0 | 0 | 1 | 1 | 1 | 0 | YES | v14 | YES | NO | v14 |
| | 15 | 0 | 0 | 1 | 1 | 1 | 1 | YES | v15 | YES | NO | v15 |
| | 16 | 0 | 1 | 0 | 0 | 0 | 0 | NO | v16 | YES | YES | v16=v24-v8+v0 |
| | 17 | 0 | 1 | 0 | 0 | 0 | 1 | NO | v17 | YES | YES | by(Equation 10) |
| | 18 | 0 | 1 | 0 | 0 | 1 | 0 | NO | v18 | YES | YES | by(Equation 10) |
| | 19 | 0 | 1 | 0 | 0 | 1 | 1 | NO | v19 | YES | YES | by(Equation 10) |
| | 20 | 0 | 1 | 0 | 1 | 0 | 0 | NO | - | YES | YES | by(Equation 10) |
| | 21 | 0 | 1 | 0 | 1 | 0 | 1 | NO | - | YES | YES | by(Equation 10) |
| | 22 | 0 | 1 | 0 | 1 | 1 | 0 | NO | - | YES | YES | by(Equation 10) |
| | 23 | 0 | 1 | 0 | 1 | 1 | 1 | NO | - | YES | YES | by(Equation 10) |
| | 24 | 0 | 1 | 1 | 0 | 0 | 0 | YES | v24 | YES | NO | v24 |
| | 25 | 0 | 1 | 1 | 0 | 0 | 1 | YES | v25 | YES | NO | v25 |
| | 26 | 0 | 1 | 1 | 0 | 1 | 0 | NO | - | YES | YES | by(Equation 10) |
| | 27 | 0 | 1 | 1 | 0 | 1 | 1 | NO | - | YES | YES | by(Equation 10) |
| | 28 | 0 | 1 | 1 | 1 | 0 | 0 | YES | v28 | YES | NO | v28 |
| | 29 | 0 | 1 | 1 | 1 | 0 | 1 | NO | v29 | YES | YES | by(Equation 10) |
| | 30 | 0 | 1 | 1 | 1 | 1 | 0 | YES | v30 | YES | NO | v30 |
| | 31 | 0 | 1 | 1 | 1 | 1 | 1 | YES | v31 | YES | NO | v31 |

| Code : RLL(1,7)<br>Class : PR(a,b,c,d,e,f)<br>Normalization : ±1<br>Mark : bit "1" &<br>Low Level | No. | Bit Array | | | | | | Decoder | | Evaluation | | |
|---|---|---|---|---|---|---|---|---|---|---|---|---|
| | | | | | | | | Valid | Target Level | Valid | Virtual | Target Level |
| | 32 | 1 | 0 | 0 | 0 | 0 | 0 | YES | v32 | YES | NO | v32 |
| | 33 | 1 | 0 | 0 | 0 | 0 | 1 | YES | v33 | YES | NO | v33 |
| | 34 | 1 | 0 | 0 | 0 | 1 | 0 | NO | - | YES | YES | by(Equation 10) |
| | 35 | 1 | 0 | 0 | 0 | 1 | 1 | YES | v34 | YES | NO | v34 |
| | 36 | 1 | 0 | 0 | 1 | 0 | 0 | NO | - | YES | YES | by(Equation 10) |
| | 37 | 1 | 0 | 0 | 1 | 0 | 1 | NO | - | YES | YES | by(Equation 10) |
| | 38 | 1 | 0 | 0 | 1 | 1 | 0 | YES | v38 | YES | NO | v38 |
| | 39 | 1 | 0 | 0 | 1 | 1 | 1 | YES | v39 | YES | NO | v39 |
| | 40 | 1 | 0 | 1 | 0 | 0 | 0 | NO | - | YES | YES | by(Equation 10) |
| | 41 | 1 | 0 | 1 | 0 | 0 | 1 | NO | - | YES | YES | by(Equation 10) |
| | 42 | 1 | 0 | 1 | 0 | 1 | 0 | NO | - | YES | YES | by(Equation 10) |
| | 43 | 1 | 0 | 1 | 0 | 1 | 1 | NO | - | YES | YES | by(Equation 10) |
| | 44 | 1 | 0 | 1 | 1 | 0 | 0 | NO | - | YES | YES | by(Equation 10) |
| | 45 | 1 | 0 | 1 | 1 | 0 | 1 | NO | - | YES | YES | by(Equation 10) |
| | 46 | 1 | 0 | 1 | 1 | 1 | 0 | NO | - | YES | YES | by(Equation 10) |
| | 47 | 1 | 0 | 1 | 1 | 1 | 1 | NO | - | YES | YES | v48=v15-v32+v63 |
| | 48 | 1 | 1 | 0 | 0 | 0 | 0 | YES | v48 | YES | NO | v48 |
| | 49 | 1 | 1 | 0 | 0 | 0 | 1 | YES | v49 | YES | NO | v49 |
| | 50 | 1 | 1 | 0 | 0 | 1 | 0 | NO | - | YES | YES | by(Equation 10) |
| | 51 | 1 | 1 | 0 | 0 | 1 | 1 | YES | v51 | YES | NO | v51 |
| | 52 | 1 | 1 | 0 | 1 | 0 | 0 | NO | - | YES | YES | by(Equation 10) |
| | 53 | 1 | 1 | 0 | 1 | 0 | 1 | NO | - | YES | YES | by(Equation 10) |
| | 54 | 1 | 1 | 0 | 1 | 1 | 0 | NO | - | YES | YES | by(Equation 10) |
| | 55 | 1 | 1 | 0 | 1 | 1 | 1 | NO | - | YES | YES | v55=v39-v47+v63 |
| | 56 | 1 | 1 | 1 | 0 | 0 | 0 | YES | v56 | YES | NO | v56 |
| | 57 | 1 | 1 | 1 | 0 | 0 | 1 | YES | v57 | YES | NO | v57 |
| | 58 | 1 | 1 | 1 | 0 | 1 | 0 | NO | - | YES | YES | by(Equation 10) |
| | 59 | 1 | 1 | 1 | 0 | 1 | 1 | NO | - | YES | YES | v59=v51-v55+v63 |
| | 60 | 1 | 1 | 1 | 1 | 0 | 0 | YES | v60 | YES | NO | v60 |
| | 61 | 1 | 1 | 1 | 1 | 0 | 1 | NO | - | YES | YES | v61=v60-v62+v63 |
| | 62 | 1 | 1 | 1 | 1 | 1 | 0 | YES | v62 | YES | NO | v62 |
| | 63 | 1 | 1 | 1 | 1 | 1 | 1 | YES | v63 | YES | NO | v63 |

FIG. 27

Code : RLL(1,7)
Class : PR(1,2,2,1)/PR(a,b,c,d)
Normalization : Amplitude ± 1

| Pattern | | | Pattern-T | Pattern-F | Shift-Direction (T to F) | Euclid Distance | |
|---|---|---|---|---|---|---|---|
| Error Bits | Pat. Bits | No. | | | | Direct | Norm. |
| 1Bit | 7Bit | 1 | 0001110 | 0000110 | Right | 10 | 1.11 |
| | | 2 | 0001111 | 0000111 | Right | | |
| | | 3 | 0111000 | 0110000 | Left | | |
| | | 4 | 0111001 | 0110001 | Left | | |
| | | 5 | 1001110 | 1000110 | Right | | |
| | | 6 | 1001111 | 1000111 | Right | | |
| | | 7 | 1111000 | 1110000 | Left | | |
| | | 8 | 1111001 | 1110001 | Left | | |

FIG. 28

Code : RLL(1,7)  
Class : PR(a,b,c,d)  
Normalization : ±1  
Mark : bit "1" & Low Level

| No. | Bit Array | | | | Decoder | |
|---|---|---|---|---|---|---|
| | | | | | Valid | Target Level |
| 0 | 0 | 0 | 0 | 0 | YES | v0 |
| 1 | 0 | 0 | 0 | 1 | YES | v1 |
| 2 | 0 | 0 | 1 | 0 | NO | - |
| 3 | 0 | 0 | 1 | 1 | YES | v3 |
| 4 | 0 | 1 | 0 | 0 | NO | - |
| 5 | 0 | 1 | 0 | 1 | NO | - |
| 6 | 0 | 1 | 1 | 0 | YES | v6 |
| 7 | 0 | 1 | 1 | 1 | YES | v7 |
| 8 | 1 | 0 | 0 | 0 | YES | v8 |
| 9 | 1 | 0 | 0 | 1 | YES | v9 |
| 10 | 1 | 0 | 1 | 0 | NO | - |
| 11 | 1 | 0 | 1 | 1 | NO | - |
| 12 | 1 | 1 | 0 | 0 | YES | v12 |
| 13 | 1 | 1 | 0 | 1 | NO | - |
| 14 | 1 | 1 | 1 | 0 | YES | v14 |
| 15 | 1 | 1 | 1 | 1 | YES | v15 |

FIG. 29

Code : RLL(1,7)
Class : PR(1,2,2,1)
Normalization : Amplitude ± 1

| Pattern | | Pattern-T | Pattern-F | Shift-Direction (T to F) | Euclid Distance | |
|---|---|---|---|---|---|---|
| Pat. Bits | No. | | | | Direct | Norm. |
| 7Bit | 1 | XX01XXX | XX00XXX | Right | 10 | 1.11 |
| | 2 | XXX01XX | XXX11XX | Left | | |
| | 3 | XX10XXX | XX11XXX | Right | | |
| | 4 | XXX10XX | XXX00XX | Left | | |

FIG. 30

Code : RLL(1,7)
Class : PR(1,2,2,1)
Normalization : ±1
Mark : bit "1" & Low Level

| No. | Bit Array | | | | Decoder | | Evaluation | |
|---|---|---|---|---|---|---|---|---|
| | | | | | Valid | Target Level | Valid | Target Level |
| 0 | 0 | 0 | 0 | 0 | YES | 1.00 | YES | 1.00 |
| 1 | 0 | 0 | 0 | 1 | YES | 0.67 | YES | 0.67 |
| 2 | 0 | 0 | 1 | 0 | NO | - | YES | 0.33 |
| 3 | 0 | 0 | 1 | 1 | YES | 0.00 | YES | 0.00 |
| 4 | 0 | 1 | 0 | 0 | NO | - | YES | 0.33 |
| 5 | 0 | 1 | 0 | 1 | NO | - | YES | 0.67 |
| 6 | 0 | 1 | 1 | 0 | YES | -0.33 | YES | -0.33 |
| 7 | 0 | 1 | 1 | 1 | YES | -0.67 | YES | -0.67 |
| 8 | 1 | 0 | 0 | 0 | YES | 0.67 | YES | 0.67 |
| 9 | 1 | 0 | 0 | 1 | YES | 0.33 | YES | 0.33 |
| 10 | 1 | 0 | 1 | 0 | NO | - | YES | 0.00 |
| 11 | 1 | 0 | 1 | 1 | NO | - | YES | -0.33 |
| 12 | 1 | 1 | 0 | 0 | YES | 0.00 | YES | 0.00 |
| 13 | 1 | 1 | 0 | 1 | NO | - | YES | -0.33 |
| 14 | 1 | 1 | 1 | 0 | YES | -0.67 | YES | -0.67 |
| 15 | 1 | 1 | 1 | 1 | YES | -1.00 | YES | -1.00 |

FIG. 31

Code : RLL(1,7)
Class : PR(a,b,c,d)
Normalization : ±1
Mark : bit "1" & Low Level

| No. | Bit Array | | | | Decoder | | Evaluation | | |
|---|---|---|---|---|---|---|---|---|---|
| | | | | | Valid | Target Level | Valid | Virtual | Target Level |
| 0 | 0 | 0 | 0 | 0 | YES | v0 | YES | NO | v0 |
| 1 | 0 | 0 | 0 | 1 | YES | v1 | YES | NO | v1 |
| 2 | 0 | 0 | 1 | 0 | NO | - | YES | YES | v2=v3-v1+v0 |
| 3 | 0 | 0 | 1 | 1 | YES | v3 | YES | NO | v3 |
| 4 | 0 | 1 | 0 | 0 | NO | - | YES | YES | v4=v6-v2+v0 |
| 5 | 0 | 1 | 0 | 1 | NO | - | YES | YES | v5=v7-v2+v0 |
| 6 | 0 | 1 | 1 | 0 | YES | v6 | YES | NO | v6 |
| 7 | 0 | 1 | 1 | 1 | YES | v7 | YES | NO | v7 |
| 8 | 1 | 0 | 0 | 0 | YES | v8 | YES | NO | v8 |
| 9 | 1 | 0 | 0 | 1 | YES | v9 | YES | NO | v9 |
| 10 | 1 | 0 | 1 | 0 | NO | - | YES | YES | v10=v8-v13+v15 |
| 11 | 1 | 0 | 1 | 1 | NO | - | YES | YES | v11=v9-v13+v15 |
| 12 | 1 | 1 | 0 | 0 | YES | v12 | YES | NO | v12 |
| 13 | 1 | 1 | 0 | 1 | NO | - | YES | YES | v13=v12-v14+v15 |
| 14 | 1 | 1 | 1 | 0 | YES | v14 | YES | NO | v14 |
| 15 | 1 | 1 | 1 | 1 | YES | v15 | YES | NO | v15 |

FIG. 32

Code : RLL(2,10)
Class : PR(3,4,4,3)/PR(a,b,c,d)
Normalization : Amplitude ±1

| Pattern | | | Pattern-T | Pattern-F | Shift-Direction (T to F) | Euclid Distance | |
|---|---|---|---|---|---|---|---|
| Error Bits | Pat. Bits | No. | | | | Direct | Norm. |
| 1Bit | 7Bit | 1 | 0001111 | 0000111 | Right | 50 | 1.02 |
| | | 2 | 1111000 | 1110000 | Left | | |

FIG. 33

Code : RLL(2,10)
Class : PR(a,b,c,d)
Normalization : ±1
Mark : bit "1" & Low Level

| No. | Bit Array | | | | Decoder | |
|---|---|---|---|---|---|---|
| | | | | | Valid | Target Level |
| 0 | 0 | 0 | 0 | 0 | YES | v0 |
| 1 | 0 | 0 | 0 | 1 | YES | v1 |
| 2 | 0 | 0 | 1 | 0 | NO | - |
| 3 | 0 | 0 | 1 | 1 | YES | v3 |
| 4 | 0 | 1 | 0 | 0 | NO | - |
| 5 | 0 | 1 | 0 | 1 | NO | - |
| 6 | 0 | 1 | 1 | 0 | NO | - |
| 7 | 0 | 1 | 1 | 1 | YES | v7 |
| 8 | 1 | 0 | 0 | 0 | YES | v8 |
| 9 | 1 | 0 | 0 | 1 | NO | - |
| 10 | 1 | 0 | 1 | 0 | NO | - |
| 11 | 1 | 0 | 1 | 1 | NO | - |
| 12 | 1 | 1 | 0 | 0 | YES | v12 |
| 13 | 1 | 1 | 0 | 1 | NO | - |
| 14 | 1 | 1 | 1 | 0 | YES | v14 |
| 15 | 1 | 1 | 1 | 1 | YES | v15 |

FIG. 34

```
Code : RLL(2,10)
Class : PR(3,4,4,3)/PR(a,b,c,d)
Normalization : Amplitude ± 1
```

| Pattern | | Pattern-T | Pattern-F | Shift-Direction (T to F) | Euclid Distance | |
|---|---|---|---|---|---|---|
| Pat. Bits | No. | | | | Direct | Norm. |
| 7Bit | 1 | XX01XXX | XX00XXX | Right | 50 | 1.02 |
| | 2 | XXX01XX | XXX11XX | Left | | |
| | 3 | XX10XXX | XX11XXX | Right | | |
| | 4 | XXX10XX | XXX00XX | Left | | |

FIG. 35

Code : RLL(2,10)
Class : PR(3,4,4,3)
Normalization : ±1
Mark : bit "1" & Low Level

| No. | Bit Array | | | | Decoder | | Evaluation | |
|---|---|---|---|---|---|---|---|---|
| | | | | | Valid | Target Level | Valid | Target Level |
| 0 | 0 | 0 | 0 | 0 | YES | 1.00 | YES | 1.00 |
| 1 | 0 | 0 | 0 | 1 | YES | 0.57 | YES | 0.57 |
| 2 | 0 | 0 | 1 | 0 | NO | - | YES | 0.43 |
| 3 | 0 | 0 | 1 | 1 | YES | 0.00 | YES | 0.00 |
| 4 | 0 | 1 | 0 | 0 | NO | - | YES | 0.43 |
| 5 | 0 | 1 | 0 | 1 | NO | - | YES | 0.00 |
| 6 | 0 | 1 | 1 | 0 | NO | - | YES | -0.14 |
| 7 | 0 | 1 | 1 | 1 | YES | -0.57 | YES | -0.57 |
| 8 | 1 | 0 | 0 | 0 | YES | 0.57 | YES | 0.57 |
| 9 | 1 | 0 | 0 | 1 | NO | - | YES | 0.14 |
| 10 | 1 | 0 | 1 | 0 | NO | - | YES | 0.00 |
| 11 | 1 | 0 | 1 | 1 | NO | - | YES | -0.43 |
| 12 | 1 | 1 | 0 | 0 | YES | 0.00 | YES | 0.00 |
| 13 | 1 | 1 | 0 | 1 | NO | - | YES | -0.43 |
| 14 | 1 | 1 | 1 | 0 | YES | -0.57 | YES | -0.57 |
| 15 | 1 | 1 | 1 | 1 | YES | -1.00 | YES | -1.00 |

FIG. 36

Code : RLL(2,10)
Class : PR(a,b,c,d)
Normalization : ±1
Mark : bit "1" & Low Level

| No. | Bit Array | | | | Decoder | | Evaluation | | |
|---|---|---|---|---|---|---|---|---|---|
| | | | | | Valid | Target Level | Valid | Virtual | Target Level |
| 0 | 0 | 0 | 0 | 0 | YES | v0 | YES | NO | v0 |
| 1 | 0 | 0 | 0 | 1 | YES | v1 | YES | NO | v1 |
| 2 | 0 | 0 | 1 | 0 | NO | - | YES | YES | v2=v3-v1+v0 |
| 3 | 0 | 0 | 1 | 1 | YES | v3 | YES | NO | v3 |
| 4 | 0 | 1 | 0 | 0 | NO | - | YES | YES | v4=v6-v2+v0 |
| 5 | 0 | 1 | 0 | 1 | NO | - | YES | YES | v5=v7-v2+v0 |
| 6 | 0 | 1 | 1 | 0 | NO | - | YES | YES | v6=v7-v1+v0 |
| 7 | 0 | 1 | 1 | 1 | YES | v7 | YES | NO | v7 |
| 8 | 1 | 0 | 0 | 0 | YES | v8 | YES | NO | v8 |
| 9 | 1 | 0 | 0 | 1 | NO | - | YES | YES | v9=v8-v14+v15 |
| 10 | 1 | 0 | 1 | 0 | NO | - | YES | YES | v10=v8-v13+v15 |
| 11 | 1 | 0 | 1 | 1 | NO | - | YES | YES | v11=v9-v13+v15 |
| 12 | 1 | 1 | 0 | 0 | YES | v12 | YES | NO | v12 |
| 13 | 1 | 1 | 0 | 1 | NO | - | YES | YES | v13=v12-v14+v15 |
| 14 | 1 | 1 | 1 | 0 | YES | v14 | YES | NO | v14 |
| 15 | 1 | 1 | 1 | 1 | YES | v15 | YES | NO | v15 |

FIG. 37

Code : RLL(1,7)
Class : PR(a,b,c)
Normalization : ±1
Mark : bit "1" & Low Level

Integrated Class Bit Deffinition
$a = \{(v1-v0) - (v6-v7)\}/2$
$b = \{(v2-v0) - (v5-v7)\}/2$
$c = \{(v4-v0) - (v3-v7)\}/2$
where
$v2 = v3 - v1 + v0$,
$v5 = v4 - v6 + v7$,
$a+b+c = v7-v0\ (=2)$

| No. | Bit Array | | | Decoder | | Evaluation | | |
|---|---|---|---|---|---|---|---|---|
| | | | | Valid | Target Level | Valid | Virtual | Target Level |
| 0 | 0 | 0 | 0 | YES | v0 | YES | NO | v0 |
| 1 | 0 | 0 | 1 | YES | v1 | YES | NO | v0 + a |
| 2 | 0 | 1 | 0 | NO | - | YES | YES | v0 + b |
| 3 | 0 | 1 | 1 | YES | v3 | YES | NO | v0 + a + b |
| 4 | 1 | 0 | 0 | YES | v4 | YES | NO | v0+c |
| 5 | 1 | 0 | 1 | NO | - | YES | YES | v0+a+c |
| 6 | 1 | 1 | 0 | YES | v6 | YES | NO | v0+a+b |
| 7 | 1 | 1 | 1 | YES | v7 | YES | NO | v0+a+b+c |

FIG. 38

Code : RLL(1,7)
Class : PR(a,b,c,d)
Normalization : ±1
Mark : bit "1" & Low Level Integrated Class Bit Deffinition
$a = \{(v1 - v0) - (v14 - v15)\}/2$
$b = \{(v2 - v0) - (v13 - v15)\}/2$
$c = \{(v4 - v0) - (v11 - v15)\}/2$
$d = \{(v8 - v0) - (v7 - v15)\}/2$
where
$v2 = v3 - v1 + v0$,
$v4 = v6 - v2 + v0$,
$v11 = v9 - v13 + v15$
$v13 = v12 - v14 + v15$
$a+b+c+d = v15-v0 \ (=2)$

| No. | Bit Array | | | | Decoder | | Evaluation | | |
|---|---|---|---|---|---|---|---|---|---|
| | | | | | Valid | Target Level | Valid | Virtual | Target Level |
| 0 | 0 | 0 | 0 | 0 | YES | v0 | YES | NO | v0 |
| 1 | 0 | 0 | 0 | 1 | YES | v1 | YES | NO | v0+a |
| 2 | 0 | 0 | 1 | 0 | NO | - | YES | YES | v0+b |
| 3 | 0 | 0 | 1 | 1 | YES | v3 | YES | NO | v0+a+b |
| 4 | 0 | 1 | 0 | 0 | NO | - | YES | YES | v0+c |
| 5 | 0 | 1 | 0 | 1 | NO | - | YES | YES | v0+a+c |
| 6 | 0 | 1 | 1 | 0 | YES | v6 | YES | NO | v0+b+c |
| 7 | 0 | 1 | 1 | 1 | YES | v7 | YES | NO | v0+a+b+c |
| 8 | 1 | 0 | 0 | 0 | YES | v8 | YES | NO | v0+d |
| 9 | 1 | 0 | 0 | 1 | YES | v9 | YES | NO | v0+a+d |
| 10 | 1 | 0 | 1 | 0 | NO | - | YES | YES | v0+b+d |
| 11 | 1 | 0 | 1 | 1 | NO | - | YES | YES | v0+a+b+d |
| 12 | 1 | 1 | 0 | 0 | YES | v12 | YES | NO | v0+c+d |
| 13 | 1 | 1 | 0 | 1 | NO | - | YES | YES | v0+a+c+d |
| 14 | 1 | 1 | 1 | 0 | YES | v14 | YES | NO | v0+b+c+d |
| 15 | 1 | 1 | 1 | 1 | YES | v15 | YES | NO | v0+a+b+c+d |

FIG. 39

```
Code : RLL(2,10)
Class : PR(a,b,c,d)
Normalization : ±1
Mark : bit "1" & Low Level
```

```
Integrated Class Bit Deffinition
a = {(v1 - v0) - (v14 - v15)}/2
b = {(v2 - v0) - (v13 - v15)}/2
c = {(v4 - v0) - (v11 - v15)}/2
d = {(v8 - v0) - (v7  - v15)}/2
where
v2  = v3  - v1  + v0,
v6  = v7  - v1  + v0,
v9  = v8  - v14 + v15,
v13 = v12 - v14 + v15,
v4  = v6  - v2  + v0,
v11 = v9  - v13 + v15
a+b+c+d = v15-v0 (=2)
```

| No. | Bit Array | | | | Decoder | | Evaluation | | |
|---|---|---|---|---|---|---|---|---|---|
| | | | | | Valid | Target Level | Valid | Virtual | Target Level |
| 0  | 0 | 0 | 0 | 0 | YES | v0  | YES | NO  | v0 |
| 1  | 0 | 0 | 0 | 1 | YES | v1  | YES | NO  | v0+a |
| 2  | 0 | 0 | 1 | 0 | NO  | -   | YES | YES | v0+b |
| 3  | 0 | 0 | 1 | 1 | YES | v3  | YES | NO  | v0+a+b |
| 4  | 0 | 1 | 0 | 0 | NO  | -   | YES | YES | v0+c |
| 5  | 0 | 1 | 0 | 1 | NO  | -   | YES | YES | v0+a+c |
| 6  | 0 | 1 | 1 | 0 | NO  | v6  | YES | YES | v0+b+c |
| 7  | 0 | 1 | 1 | 1 | YES | v7  | YES | NO  | v0+a+b+c |
| 8  | 1 | 0 | 0 | 0 | YES | v8  | YES | NO  | v0+d |
| 9  | 1 | 0 | 0 | 1 | NO  | v9  | YES | YES | v0+a+d |
| 10 | 1 | 0 | 1 | 0 | NO  | -   | YES | YES | v0+b+d |
| 11 | 1 | 0 | 1 | 1 | NO  | -   | YES | YES | v0+a+b+d |
| 12 | 1 | 1 | 0 | 0 | YES | v12 | YES | NO  | v0+c+d |
| 13 | 1 | 1 | 0 | 1 | NO  | -   | YES | YES | v0+a+c+d |
| 14 | 1 | 1 | 1 | 0 | YES | v14 | YES | NO  | v0+b+c+d |
| 15 | 1 | 1 | 1 | 1 | YES | v15 | YES | NO  | v0+a+b+c+d |

| N | Class Definition | Bit Array | State No. | Level No. | Capacity (GB) |
|---|---|---|---|---|---|
| 2 | (1,1) | 4 | 2 | 3 | <<23 |
| 3 | (1,2,1) | 6 | 4 | 4 | <28 |
| 4 | (1,3,3,1) | 10 | 6 | 7 | <29 |
| 5 | $(1+D)^4$ | 16 | 10 | 10 | <29 |
| 6 | $(1+D)^5$ | 26 | 16 | 15 | <31 |
| 7 | $(1+D)^6$ | 42 | 26 | 22 | <31 |

| N | Class Definition | Bit Array | State No. | Level No. | Capacity (GB) |
|---|---|---|---|---|---|
| 2 | (1,1) | 4 | 3 | 3 | <<23 |
| 3 | (1,2,1) | 6 | 4 | 4 | <28 |
| 4 | (1,2,2,1) | 10 | 6 | 7 | <30 |
| 5 | (1,2,2,2,1) | 16 | 10 | 9 | <31 |
| 6 | (1,2,2,2,2,1) | 26 | 16 | 11 | <25 |
| 7 | (1,2,2,2,2,2,1) | 42 | 26 | 13 | <23 |

| N | Class Definition | Bit Array | State No. | Level No. | Capacity (GB) |
|---|---|---|---|---|---|
| 2 | (1,1) | 4 | 3 | 3 | <<23 |
| 3 | (1,1,2,1) | 6 | 4 | 4 | <28 |
| 4 | (1,1,3,1,3,1) | 10 | 6 | 7 | <31 |
| 5 | (1,1.6,1.8,1.6,1) | 16 | 10 | 10 | <32 |
| 6 | (1,1.9,2.5,···) | 26 | 16 | 15 | <30 |
| 7 | (1,2.3,3.6,···) | 42 | 26 | 22 | <27 |

FIG. 48
| | Method-1 | Method-2 | Method-3 |
|---|---|---|---|
| Feature | ·Conventional | ·Compensates Asymmetry | ·Compensates non-linier-shifts |
| Configuration PR(1,1) | 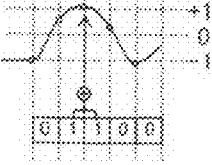 | 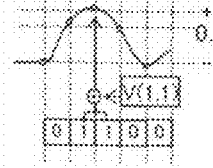 | 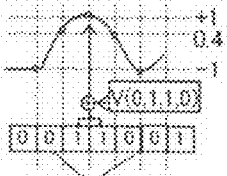 |
| Level No. | 3 | 3 | 3 |
| Pat. Comp. Bits | 0 | 0 | 2(=1+1) |
| No. of V | 0 | 4(=$2^2$) | 16(=$2^4$) |
| Asymmetry | × | ○ | ○ |
| Non-Linear-Shift | × | × | ○ |
| Experimental Result Tw=57nm DTR= 100Mbps | 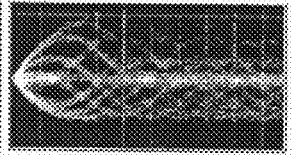 | 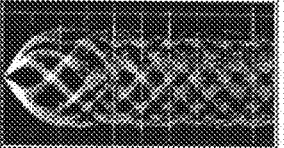 | 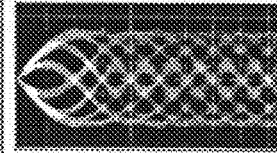 |
| | ber=50 × $10^{-4}$ | ber=15 × $10^{-4}$ | ber<0.05 × $10^{-4}$ |
| | 2T S/N ratio=3.6dB | 2T S/N ratio=8.1dB | 2T S/N ratio=9.5dB |

| Class Definition | Bit Arrays | State No. | Level No. | Comp. Bits | ML Bits |
|---|---|---|---|---|---|
| PR(1,2,2,1) | 10 | 6 | 7 | 0 | 4 |
| CPR(1,2,2,1)(*) | 10 | 6 | 10 | 4 | 4 |
| CPR(0,1,2,2,1,0)ML4 | 26 | 6 | 26 | 6 | 4 |
| CPR(0,1,2,2,1,0) | 26 | 16 | 26 | 6 | 6 |
| CPR(0,0,1,2,2,1,0,0) | 68 | 42 | 68 | 8 | 8 |
| CPR(0,0,0,1,2,2,1,0,0,0) | 178 | 110 | 178 | 10 | 10 |

(*)CPR:Compensated-PR

FIG. 51
| Conditions | Disk:DVD-RAM<br>PR Class:PR(3,4,4,3) ML<br>Equalizer: DVD-RAM Standard<br>Adaptive Equalizer:OFF |
|---|---|
| Eye Pattern | 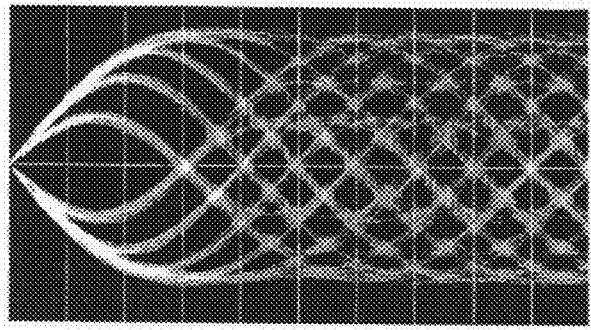<br>Jitter=8.5% |
| MLSE | 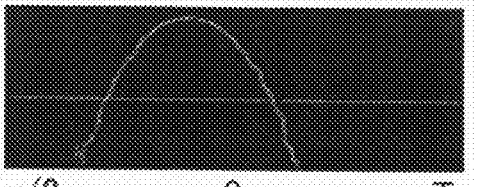<br>$\sigma$=11.0% |
| S-SEAT | 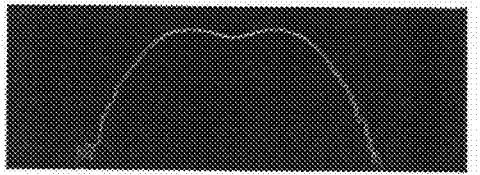<br>$\sigma$=11.0% |
| V-SEAT | 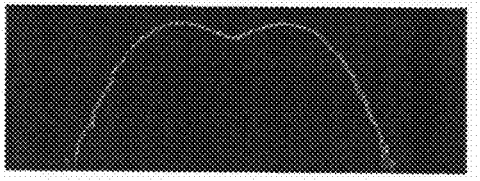<br>$\sigma$=12.5% |

FIG. 52

| Conditions | Disk:DVD-RAM<br>PR Class:PR(3,4,4,3)ML/PR(a,b,c,d)ML<br>Equalizer: DVD-RAM Standard | | | | | | | | | | |
|---|---|---|---|---|---|---|---|---|---|---|---|
| MLSE<br>PR(3,4,4,3)ML | $T_{SFP}(s,m)$ | | Mark | | | | $T_{ELP}(s,m)$ | | Mark | | | [%/Tw] |
| | | | 3 | 4 | 5 | ≧6 | | | 3 | 4 | 5 | ≧6 |
| | Space | 3 | ✕ | +3 | -6 | -3 | Space | 3 | ✕ | -3 | +6 | +3 |
| | | 4 | -2 | 0 | -6 | -5 | | 4 | +2 | 0 | +6 | +4 |
| | | 5 | +12 | +10 | +3 | +5 | | 5 | -12 | -9 | -3 | -5 |
| | | ≧6 | +12 | +9 | +3 | +4 | | ≧6 | -12 | -9 | -2 | -4 |
| S-SEAT<br>PR(a,b,c,d)ML | $T_{SFP}(s,m)$ | | Mark | | | | $T_{ELP}(s,m)$ | | Mark | | | [%/Tw] |
| | | | 3 | 4 | 5 | ≧6 | | | 3 | 4 | 5 | ≧6 |
| | Space | 3 | ✕ | 0 | -8 | -7 | Space | 3 | ✕ | 0 | +9 | +7 |
| | | 4 | -11 | -4 | -10 | -10 | | 4 | +11 | +5 | +11 | +9 |
| | | 5 | +6 | +6 | 0 | +1 | | 5 | -6 | -6 | 0 | -1 |
| | | ≧6 | +6 | +6 | -1 | 0 | | ≧6 | -6 | -5 | +1 | -1 |
| V-SEAT<br>PR(a,b,c,d)ML | $T_{SFP}(s,m)$ | | Mark | | | | $T_{ELP}(s,m)$ | | Mark | | | [%/Tw] |
| | | | 3 | 4 | 5 | ≧6 | | | 3 | 4 | 5 | ≧6 |
| | Space | 3 | -7 | 0 | -9 | -7 | Space | 3 | +7 | 0 | +9 | +7 |
| | | 4 | -11 | -4 | -10 | -10 | | 4 | 11 | +5 | +11 | +9 |
| | | 5 | +6 | +6 | 0 | +1 | | 5 | -6 | -6 | 0 | -1 |
| | | ≧6 | +6 | +6 | -1 | 0 | | ≧6 | -6 | -5 | +1 | -1 |

FIG. 57

| Conditions | Disk:Blu-ray Compatible Write-Once<br>PR Class:PR(1,2,2,1)ML/PR(a,b,c,d)ML<br>Equalizer: Blu-ray Conventional EQ | | | | | | | | | | |
|---|---|---|---|---|---|---|---|---|---|---|---|
| MLSE<br><br>PR(1,2,2,1)ML | | | | | | | | | | [%/Tw] | |
| | $T_{SFP}(s,m)$ | | Mark | | | $T_{ELP}(s,m)$ | | Mark | | | |
| | | | 2 | 3 | 4 | $\geq 5$ | | | 2 | 3 | 4 | $\geq 5$ |
| | Space | 2 | ✕ | +4 | +2 | +3 | Space | 2 | ✕ | -4 | -3 | -3 |
| | | 3 | -3 | +3 | +2 | +2 | | 3 | +3 | -3 | -3 | -3 |
| | | 4 | -2 | +3 | +2 | +2 | | 4 | +2 | -9 | -2 | -5 |
| | | $\geq 5$ | -3 | +3 | +2 | +2 | | $\geq 5$ | +2 | -3 | -2 | -3 |
| S-SEAT<br><br>PR(a,b,c,d)ML | | | | | | | | | | [%/Tw] | |
| | $T_{SFP}(s,m)$ | | Mark | | | $T_{ELP}(s,m)$ | | Mark | | | |
| | | | 2 | 3 | 4 | $\geq 5$ | | | 2 | 3 | 4 | $\geq 5$ |
| | Space | 2 | ✕ | -1 | -2 | -2 | Space | 2 | ✕ | +1 | +2 | +2 |
| | | 3 | -1 | 0 | -1 | -1 | | 3 | +1 | 0 | +1 | +1 |
| | | 4 | -2 | -1 | -1 | -1 | | 4 | +2 | +1 | +2 | +1 |
| | | $\geq 5$ | -2 | -1 | -2 | -2 | | $\geq 5$ | +2 | +1 | +1 | +1 |
| V-SEAT<br><br>PR(a,b,c,d)ML | | | | | | | | | | [%/Tw] | |
| | $T_{SFP}(s,m)$ | | Mark | | | $T_{ELP}(s,m)$ | | Mark | | | |
| | | | 2 | 3 | 4 | $\geq 5$ | | | 2 | 3 | 4 | $\geq 5$ |
| | Space | 2 | -2 | -1 | -2 | -2 | Space | 2 | +2 | +2 | +1 | +2 |
| | | 3 | -1 | 0 | -1 | -1 | | 3 | +1 | 0 | +1 | +1 |
| | | 4 | -2 | -1 | -1 | -1 | | 4 | +2 | +1 | +2 | +1 |
| | | $\geq 5$ | -2 | -1 | -2 | -2 | | $\geq 5$ | +2 | +1 | +1 | +1 |

Disk: Disk:Blu-ray Compatible Write-Once
PR Class:PR(a,b,c,d)ML/PR(a,b,c,d)ML(Absolute Value System)

FIG. 59

Code : RLL(1,7)
Class : PR(1,2,2,1)

| Time | Bit Arrays | Pattern Detector | Calculation |
|---|---|---|---|
| | Pattern Detect Bit Array | P2A="1110000" P2B="1111000" | |
| t=0 | 1 1 1 1 1 1 1 0 0 0 0 0 0 0 0 | not Match | — |
| t=1 | 1 1 1 1 1 1 1 0 0 0 0 0 0 0 0 | not Match | — |
| t=2 | 1 1 1 1 1 1 1 1 0 0 0 0 0 0 0 | not Match | — |
| t=3 | 1 1 1 1 1 1 1 1 0 0 0 0 0 0 0 | not Match | — |
| t=4 | 1 1 1 1 1 1 1 1 0 0 0 0 0 0 0 | Match P2B Pattern | Yes |
| t=5 | 1 1 1 1 1 1 1 0 0 0 0 0 0 0 0 | Match P2A Pattern | Yes |
| t=6 | 1 1 1 1 1 1 1 0 0 0 0 0 0 0 0 | not Match | — |
| t=7 | 1 1 1 1 1 1 1 0 0 0 0 0 0 0 0 | not Match | — |
| t=8 | 1 1 1 1 1 1 1 0 0 0 0 0 0 0 0 | not Match | — |
| t=9 | 1 1 1 1 1 1 1 0 0 0 0 0 0 0 0 | not Match | — |

FIG. 60
| Conditions | Disk:DVD-RAM<br>PR Class:PR(3,4,4,3) ML<br>Equalizer: DVD-RAM Standard<br>Adaptive Equalizer:ON (5Tap, LSE) |
|---|---|
| Eye Pattern | 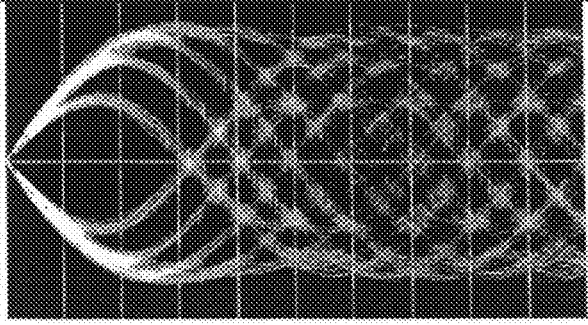<br>Jitter=13.2% |
| MLSE | 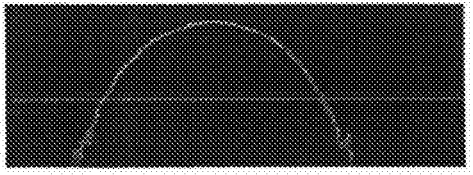<br>−Tw/2　　　0　　　Tw/2　　σ=9.3% |
| S-SEAT | 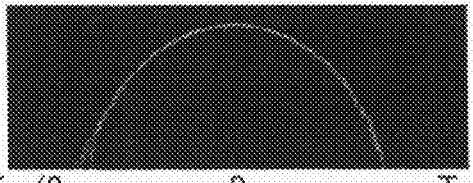<br>−Tw/2　　　0　　　Tw/2　　σ=9.3% |
| V-SEAT | 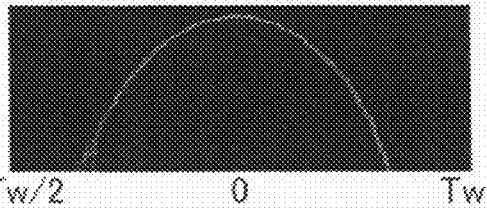<br>−Tw/2　　　0　　　Tw/2　　σ=8.7% |

FIG. 61
| Conditions | Disk:DVD-RAM<br>PR Class:PR(a,b,c,d) ML<br>Equalizer: DVD-RAM Standard<br>Adaptive Equalizer:OFF |
|---|---|
| Eye Pattern | 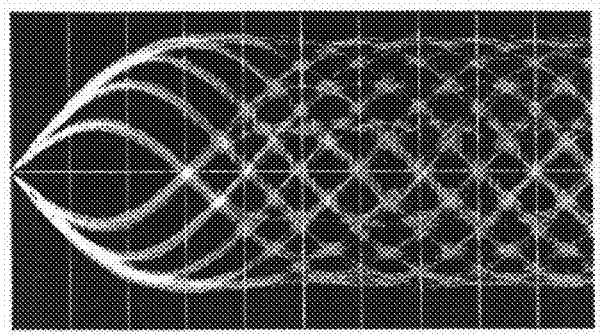 Jitter=8.5% |
| MLSE | 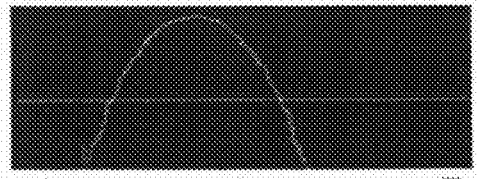 σ=11.0% |
| S-SEAT | 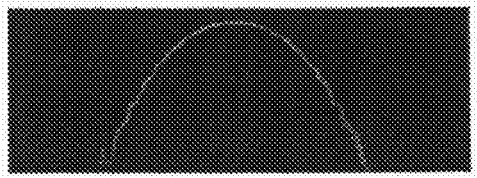 σ=7.3% |
| V-SEAT | 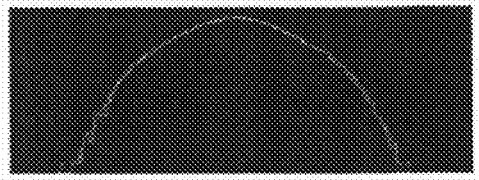 σ=9.3% |

FIG. 62
| Conditions | Disk:DVD-RAM<br>PR Class:PR(a,b,c,d) ML, Absolute Value System<br>Equalizer: DVD-RAM Standard<br>Adaptive Equalizer:OFF |
|---|---|
| Eye Pattern | 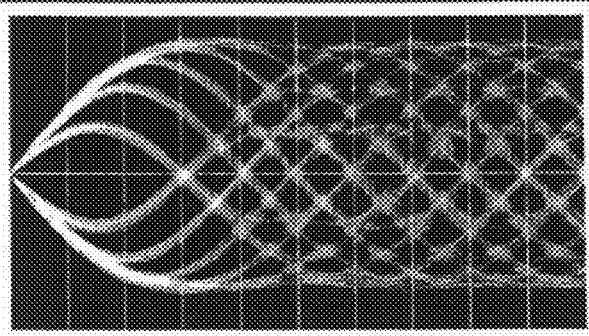<br>Jitter=8.5% |
| Unsigned-SEAT | 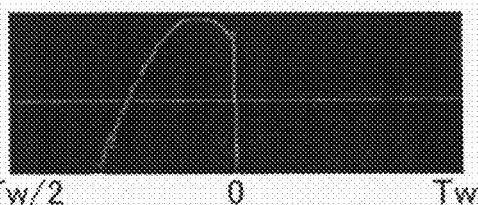<br>$\sigma$=9.3%<br>-Tw/2　　0　　Tw/2 |
| S-SEAT | 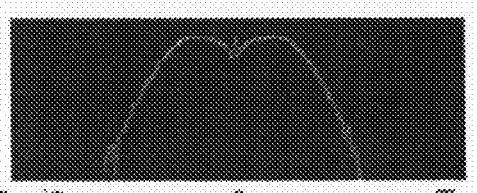<br>$\sigma$=9.3%<br>-Tw/2　　0　　Tw/2 |
| V-SEAT | 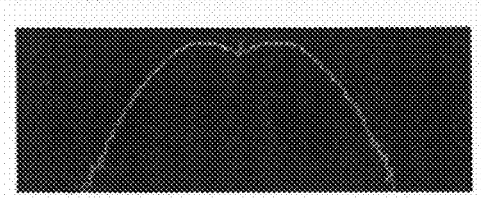<br>$\sigma$=10.3%<br>-Tw/2　　0　　Tw/2 |

FIG. 63
| Conditions | Disk:DVD-RAM<br>PR Class:PR(a,b,c,d) ML<br>Equalizer: DVD-RAM Standard<br>Adaptive Equalizer:OFF |
|---|---|
| Eye Pattern | 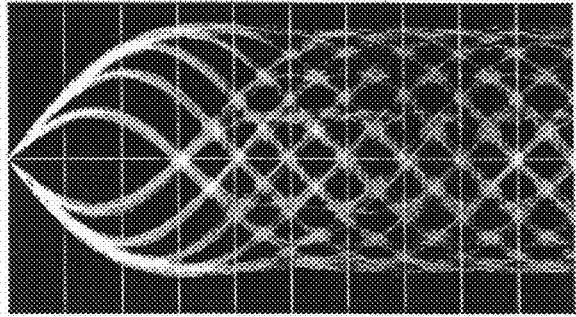<br>bit error rate = 3×10⁻⁷     Jitter=8.5% |
| V-SEAT<br>(ALL Value) | 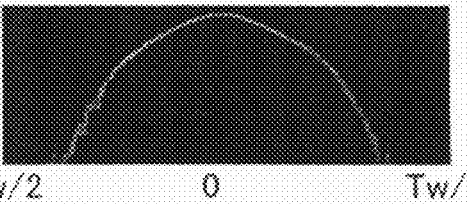<br>−Tw/2    0    Tw/2    $\sigma$=9.3% |
| V-SEAT<br>(Average Value) | 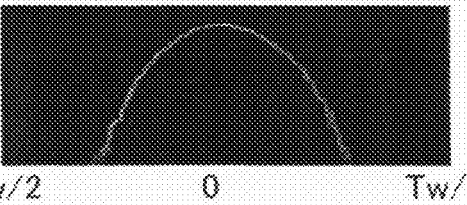<br>−Tw/2    0    Tw/2    $\sigma$=7.5% |
| V-SEAT<br>(Small Value) | 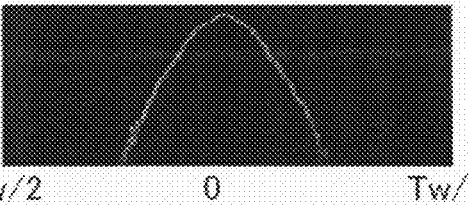<br>−Tw/2    0    Tw/2    $\sigma$=5.0% |
| V-SEAT<br>(Large Value) | 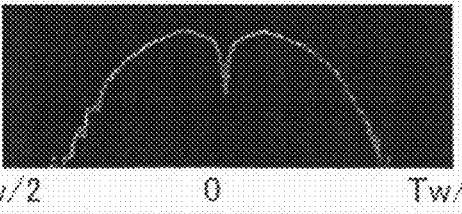<br>−Tw/2    0    Tw/2    $\sigma$=12.2% |

FIG. 64
| Conditions | Disk:DVD-RAM<br>PR Class:PR(a,b,c,d) ML, Absolute Value System<br>Equalizer: DVD-RAM Standard<br>Adaptive Equalizer:OFF |
|---|---|
| Eye Pattern | 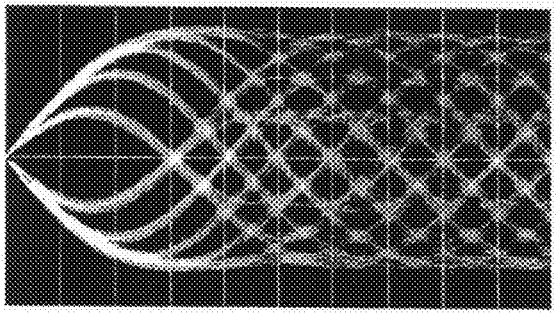<br>bit error rate = 4×10⁻⁷     Jitter=8.5% |
| V-SEAT<br>(ALL Value) | 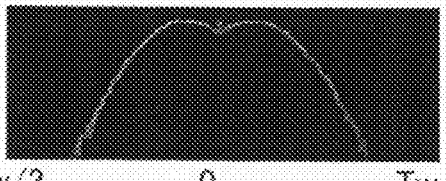<br>−Tw/2    0    Tw/2    σ=10.3% |
| V-SEAT<br>(Average Value) | 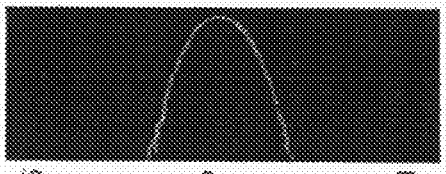<br>−Tw/2    0    Tw/2    σ=4.3% |
| V-SEAT<br>(Small Value) | 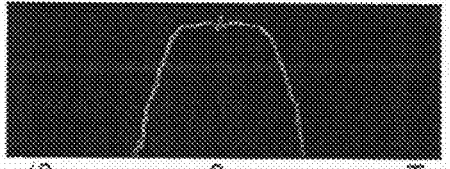<br>−Tw/2    0    Tw/2    σ=6.6% |
| V-SEAT<br>(Large Value) | 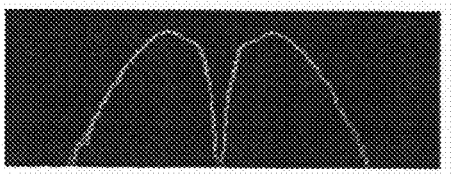<br>−Tw/2    0    Tw/2    σ=13.0% |

METHOD OF EVALUATING A READOUT SIGNAL, AND OPTICAL DISC APPARATUS

CROSS REFERENCE TO RELATED APPLICATION

This application is a continuation of U.S. application Ser. No. 11/044,070, filed Jan. 28, 2005, now U.S. Pat. No. 7,440,522 the contents of which are incorporated herein by reference.

U.S. patent application Ser. No. 10/643,975 and Ser. No. 10/774,587 are co-pending applications of this application. The contents of which are incorporated herein by cross-reference.

CLAIM OF PRIORITY

The present application claims priority from Japanese application JP 2004-138530 filed on May 7, 2004 and Japanese application JP 2004-377369 filed on Dec. 27, 2004, the contents of which are hereby incorporated by reference into this application.

BACKGROUND OF THE INVENTION

1. Field of the Invention

The present invention relates to an optical disc apparatus for recording information by forming on a recording medium a recording mark with a different physical property from that of other parts of the medium.

2. Description of Related Art

With increases in the speed and density of optical discs, the PRML (Partial Response Maximum Likelihood) read signal processing method is becoming more and more indispensable. As an example of the PRML method, an adaptive or compensated PRML method is known whereby a target signal level is adaptively varied in accordance with the read signal. Tech. Digest ISOM '03, pp. 34, indicates that, by compensating the asymmetry in the read signal and the thermal interference during recording by such a PRML method, the capacity of a Blu-ray Disc-compatible apparatus can be increased by approximately 35 GB.

In optical disc apparatuses utilizing a PRML device as well as in conventional apparatuses, it is important to cause the apparatus to appropriately study: (1) reproduction equalization conditions; (2) focus position and tilt conditions; and (3) write power and pulse conditions, for example. In this case, it is necessary to optimize various parameters using an evaluation index for read signal quality such that the aforementioned conditions can be optimized. Conventionally, when the direct-slice reading method is used, jitter has been used as a read signal quality evaluation index. In Tech. Digest ODS '03, pp. 93 and in Tech. Digest ISOM '03, pp. 116, as the evaluation index of the quality of read signal that is adapted to the PRML method, MLSE (Maximum Likelihood Sequence Error) is indicated corresponding to the PR(1,2,2,1)ML channel. Using a correct bit sequence as the result of decoding and an error bit sequence obtained by shifting the correct bit sequence by one bit, the Euclidean distance between the read signal and each sequence is calculated to evaluate the read signal from the view point of probability of error. It is also indicated that, since MLSE focuses on data edge, a recording strategy that utilizes adaptive write pulse conditions that are tabulated depending on the preceding and subsequent space and mark lengths can be optimized by measuring and evaluating the shift of the MLSE value from a target value for each of the elements in the table. Furthermore, in Tech. Digest ISOM '03, pp. 164, PRSNR (Partial Response Signal to Noise Ratio) is indicated for the PR(1,2,2,2,1)ML channel. This is a technique whereby, in the PR(1,2,2,2,1) channel, three patterns with small Euclidean distances and high error frequencies are extracted, and the value of each Euclidean distance is calculated, thereby calculating a read signal SNR from the viewpoint of probability of error and evaluating signal quality. The publication indicates that there is an excellent correlation between PRSNR and bit error rate.

Hereafter, in order to help better understand the invention, the evaluation of error detection in the PRML method is described.

FIG. 2 shows some of the bit error patterns in the case where the RLL(1,7) code is decoded using the PR(1,2,2,1) class. In this case, since the number of bits representing the class (to be hereafter referred to as class bit number N) is four, 7-bit (2N−1) patterns may be considered to take the influence of one-bit error into account. A pattern with a different center bit from that of a correct pattern is referred to as an error pattern. When conditions where the correct pattern and error pattern each satisfy the run-length limit are extracted, there are eight combinations of the patterns with respect to a one-bit error, as shown in FIG. 2. The value obtained by adding up the square of the difference between the target signal levels of the correct and error patterns at each time is referred to as the Euclidean distance between them, which would be $(1^2+2^2+2^2+1^2=14)$ or 14 in the case of the one-bit error. When normalized such that the amplitude of the target signal becomes 2, the Euclidean distance would be 1.11. If the temporal transition of target values of the two bit patterns are thought of as vectors of M dimensions (M=4 in the present case), the Euclidean distance could also be regarded as the distance between two points in a space including the aforementioned vectors as position vectors. For a 2-bit error, there would be 12 combinations, and the Euclidean distance would be 14. Similarly, if increasingly more complicated error patterns are considered, the relevant Euclidean distance would continue ad infinitum from 16, 18, 20, 22, and so on. Statistically, errors of all these patterns would be produced. However, a huge volume of processing would be required to evaluate signal quality if all these error patterns are to be included, and it would be impossible to implement all the required processes on an optical disc drive. Since the Euclidean distance is the distance between a correct pattern and an error pattern, it may be considered to be an index of the unlikelihood of presence of error. In fact, within a range in which error correction is possible, such as in a range of bit error rate of not more than about $10^{-4}$, errors in patterns with the minimum Euclidean distance are dominant. Thus, it is fair to say that sufficient evaluation of signal quality can be made by evaluating only the patterns with the minimum Euclidean distance. MLSE only focuses on the minimum Euclidean distance pattern, namely a 1T edge shift in the case of PR(1,2,2,1) and measures the distribution of the likelihood of presence of error on a location by location basis so that the standard deviation of the distribution can be evaluated by approximation with respect to a normal distribution.

Similarly, FIGS. 3 and 4 each show a summary of error patterns and Euclidean distance for PR(1,2,1) and PR(1,2,2,2,1), respectively, with respect to the RLL(1,7) code.

FIG. 3 shows a summary of the error patterns and associated Euclidean distances for PR(1,2,1). As shown, the pattern of the minimum Euclidean distance is similarly a 1T edge shift, and the Euclidean distance is 6. This can also be evaluated by MLSE, as in PR(1,2,2,1).

FIG. 4 shows a summary of the error patterns and Euclidean distance for PR(1,2,2,2,1). As shown, whereas the Euclidean distance for 1-bit error is 14, the Euclidean distance for 2-bit and 3-bit error patterns is 12. In this case, it can be considered that MLSE, which evaluates only 1T shift errors, is incapable of accurately evaluating signal quality. Thus, in Tech. Digest ISOM '03, pp. 164, the difficulty with which error can occur in these three patterns is quantified from the viewpoint of S/N, and signal quality is evaluated using one of the patterns that has the smallest S/N and that is likely to result in error. This is how the aforementioned PRSNR is utilized.

FIG. 5 shows some of the bit error patterns in the case where the RLL(1,7) code is decoded using the PR(1,1,1,1) class, which is generally used. In this case, since the class bit number N is 4, 7-bit patterns may be considered in order to take the influence of a 1-bit error into account, as in the case of the PR(1,2,2,1) class. As shown, there are 8 combinations of the patterns with respect to a 1-bit error, and the Euclidean distance is 4. There are 18 combinations of the case where a 2-bit error is produced with respect to 10-bit patterns, and the Euclidean distance is 4. Similarly, if increasingly more complicated patterns are considered, the corresponding Euclidean distance would increase ad infinitum, from 6, 10, . . . and so on. In this case, it is necessary to consider patterns with the minimum Euclidean distance for not only 1-bit errors but also 2-bit errors.

Non-Patent Document 1: Tech. Digest ISOM '03, pp. 34
Non-Patent Document 2: Tech. Digest ODS '03, pp. 93
Non-Patent Document 3: Tech. Digest ISOM '03, pp. 116
Non-Patent Document 4: Tech. Digest ISOM '03, pp. 164

SUMMARY OF THE INVENTION

As mentioned above, the adaptive PRML or compensated PRML methods, in which the target signal level is adaptively varied depending on read signal, are very effective in improving reproduction performance. On the other hand, both MLSE and PRSNR mentioned above are dependent on the PR class, such as PR(1,2,2,1) or PR(1,2,2,2,1), and are compatible with PRML channels with fixed target signal levels.

The technique whereby, using MLSE from the viewpoint of optimizing the recording strategy, the read signal is evaluated by breaking it apart into a table of mark lengths and space lengths is extremely useful. However, because MLSE is based on the probability of 1-bit shift error in the PRML decoder, the technique is incapable of evaluating a data pattern consisting of spaces and marks with a minimum run-length, as indicated in the aforementioned publication. If we now take the conventional direct-slice method as an example, a data pattern consisting of a repetition of minimum run-lengths is a pattern that has a minimum S/N and is liable to produce an error. From the viewpoint of recording control too, such a data pattern produces a maximum thermal interference from adjacent marks, so that the write pulse conditions must be such that such a thermal interference can be satisfactorily controlled. Thus, from the viewpoint of recording and reproduction, the data pattern consisting of a combination of minimum run-lengths is an important data pattern, and there has been a need for a signal evaluation index with which such a data pattern can be evaluated.

The following are the objects of the invention:

1. To provide a read signal evaluation index adapted to the PRML channel in which the target signal level is adaptively varied depending on the read signal, and an optical disc apparatus utilizing the evaluation index.

2. To provide a read signal evaluation index adapted to a data pattern consisting of a combination of minimum run-lengths, and an optical disc apparatus utilizing the evaluation index.

First, the means for achieving Object 1 will be described.

The reason why MLSE is incapable of handling a variable target level is that the generation of a target signal adapted to a correct bit sequence as the result of decoding and for an error bit sequence that is shifted by 1 bit from the correct bit sequence, and the calculation of the Euclidean distance from the read signal are based on a fixed target level. Therefore, if it is made possible to carry out the generation of the target signal and the calculation of the Euclidean distance with reference to a target level that is adaptively varied depending on the read signal, Object 1 can be achieved. The former can be realized by extracting a bit sequence from the correct and error bit sequences that constitutes a target level, and sequentially loading a corresponding target signal level from a target signal level table. If a target signal adapted to the variable target level can be produced, the latter, namely the calculation of the Euclidean distance, can be performed by adding up the square of the difference between the read signal and the target signal at each time. According to the definition of MLSE, the difference between these two Euclidean distances must be normalized by a reference Euclidean distance. The reference Euclidean distance which may be either calculated for the varying target level on the basis of an average value, or it may be obtained by calculating the Euclidean distance of the target signal produced from the correct and error bit sequences. The former is superior in terms of reducing the amount of calculation.

Hereafter, the direction of edge shift will be described. Since the Euclidean distance takes positive values at all times, it has no sign. However, the direction of edge shift that has changed from a correct pattern to an error pattern can be uniquely determined for each pattern.

FIG. 6 shows a summary of the direction of edge shift with respect to minimum Euclidean patterns of PR(1,2,2,1). For example, in the case where "0001110" turns to "0000110", it can be known that the front edge of a 3T mark is shifted to the right. Conversely, if the reproduction data has the error pattern "0000110" as shown, the shift direction is left. Similarly, the direction of edge shift can be determined for all of the patterns. Thus, by defining that, for example, the Euclidean distance is "+" in case the shift direction is right, and that the Euclidean distance is "−" in case the direction is left, the information about the direction of edge shift can be evaluated by expanding the definition of and thus improving MLSE. Bit "1" is herein defined to indicate a mark, in accordance with convention. The shift direction may be inversely defined if "0" indicates a mark, depending on the configuration of the decoder.

A new signal evaluation index that is introduced herein is referred to as S-SEAT (Signed-Sequenced Error for Adaptive Target), the definition of which will be described in the following.

When the Euclidean distance between two bit patterns "pat1" and "pat2" is $ED_B(\text{pat1}, \text{pat2})$, it is defined by the following equation:

$$ED_R(\text{pat1}, \text{pat2}) = \sum_{n=1}^{N} (V_{target}[\text{pat1}[n]] - V_{target}[\text{pat2}[n]])^2 \quad \text{(Eq. D-1)}$$

where $V_{target}[B]$ is a target signal level for bit sequence B, pat[n] is the bit sequence of bit pattern "pat" at time n, and N is a class bit number.

The reference Euclidean distance for normalizing the evaluation index is defined in terms of an average value of the Euclidean distance for a 1-bit error pattern, as follows:

$$d_{min} = \text{Average}(ED_{min}) \quad \text{(Eq. D-2)}$$

$$= \frac{\sum_{m=1}^{M} ED_B(Pat_T[m], Pat_F[m])}{M}$$

where M is the total number of combinations of 1-bit error patterns, and $Pat_T$ and $Pat_F$ each indicate a correct bit pattern and an error bit pattern, respectively.

The Euclidean distance ED(pat) between a read signal and a designated bit pattern "pat" is expressed by the following equation:

$$ED(pat) = \sum_{n=1}^{N} (V_{signal}[t+n] - V_{target}[pat[n]])^2 \quad \text{(Eq. D-3)}$$

where $V_{signal}[t]$ is the read signal level at time t, and the result of binarization at time t is the bit pattern "pat."

The value of S-SEAT is determined in terms of an edge shift value D corresponding to PRML and its standard deviation σ, as follows:

$$D = \text{Sign(Shift-Direction)} \times \quad \text{(Eq. D-4)}$$
$$\{(ED(Pat_F[m]) - ED(Pat_T[m])) - d_{min}\}$$

$$\text{Sign(Shift-Direction)} = -1 \quad \text{(Right-Edge-Shift)} \quad \text{(Eq. D-5)}$$
$$+1 \quad \text{(Left-Edge-Shift)}$$

$$\sigma = \frac{\sqrt{\frac{\sum_{p=1}^{P}(D[p])^2}{P}}}{2d_{min}} \quad \text{(Eq. D-6)}$$

where Sign(Shift–Direction) indicates the direction of edge shift in the case where the result of binarization $Pat_T$ became $Pat_F$ by producing a 1-bit error (edge shift), and P is the number of bit patterns within a designated calculation period. The definition of signs in Eq. D-5, where negative signs are allocated for edge shift to the right and positive sings for edge shift to the left, differs from what they would naturally be defined and might look unusual, and the following is the explanation. In Eq. D-4, the term $(ED(Pat_F[m])-ED(Pat_T[m]))$ represents the result of subtracting (Euclidean distance between read signal and error bit pattern) from (Euclidean distance between read signal and correct bit pattern), namely, the value of a difference Euclidean distance. This value is normally a positive value since a correct bit pattern has been decoded. If the read signal completely agrees with the target signal of the correct bit pattern, the Euclidean distance difference value would be the reference Euclidean distance $d_{min}$. On the other hand, if this value is zero, the read signal may be decoded to a correct bit pattern or an error bit pattern each with a 50% probability. In the conventional direct slice method, the amount of shift between the edge position of read signal and that of a clock signal is referred to as an edge shift amount. In the case where the edge shift amount in the direct slice method is one half the detection window width (period of the clock signal), the read signal is erroneously binarized with a 50% probability. Based on these comparisons, it can be seen that, by introducing a value $D_o$ obtained by subtracting the reference Euclidean distance $d_{min}$ from the Euclidean distance difference value, as shown by the following equation:

$$D_O = (ED(Pat_F[m]) - ED(Pat_T[m])) - d_{min} \quad \text{(Auxiliary Eq. 1)}$$

the value $D_o$ is equivalent to the edge shift amount in the direct slice method, and that it can be treated as the edge shift in the PRML method.

Up to this point, the concept is basically identical to that of the MLSE value as described above. As mentioned above, as the read signal approaches the target signal of an error bit pattern, the Do value takes on a negative value without depending on the direction of edge shift. Therefore, some measures must be devised if the edge shift direction is to be made coincident with the physical shift direction of a mark formed on a disc. The direction of edge shift can be uniquely determined from a comparison of correct and error bit patterns. Thus, in accordance with the invention, the direction of edge shift is determined from correct and error bit patterns, and the Do value is multiplied by +1 or −1 depending on the shift direction, as shown in Eq. D-5, to obtain a value that is used as an edge shift value D. In accordance with Eq. D-5, the D value would be positive if the edge shift direction is right and negative if it is left. In this way, the physical shift direction of a mark formed on the disc can be made to coincide with the sign of the edge shift value D adapted to the PRML method. Although the D value is defined such that it is positive when the shift direction is right, it may be defined in an opposite manner. In that case, the signs of Eq. D-5 may be inversed. In the direct slice method, an RMS value of the edge shift amount at each edge is referred to as a jitter value and is used as a typical evaluation index of signal quality. In the present invention too, the S-SEAT value is an RMS value of the edge shift amount D adapted to the PRML method. Namely, the S-SEAT value corresponds to a jitter value in the PRML method.

The evaluation index in accordance with the invention can be expanded depending on circumstances. In the following, a concrete expansion method will be described.

In the PRML channel in which the target signal level is adaptively varied depending on the read signal, in order to prevent an increase in circuit size, it is effective to calculate the Euclidean distance between read signal and target signal not in terms of a sum of the squares of the differences between read signal and target signal levels at each time but as a sum of absolute values. Such a PRML channel will be hereafter referred to as an absolute-value system. Since one of the objects of the invention is to provide an evaluation index for a read signal adapted to PRML, in the PRML channel in the absolute-value system, it is better to calculate the Euclidean distance as the sum of the absolute values of differences in levels. For this purpose, instead of Eq. D-1 and Eq. D-3, the Euclidean distance may be calculated in terms of the sum of the absolute values of differences between both at each time, as follows:

$$ED_B(pat1, pat2) = \sum_{n=1}^{N} |V_{target}[pat1[n]] - V_{target}[pat2[n]]| \quad \text{(Eq. D-7)}$$

$$ED(pat) = \sum_{n=1}^{N} |V_{signal}[t+n] - V_{target}[pat[n]]| \quad \text{(Eq. D-8)}$$

Alternatively, instead of Eq. D-2, an instantaneous value of the Euclidean distance in a relevant pattern represented by the following equation may be used as the reference Euclidean distance $d_{min}$:

$$d_{min}=ED_B(Pat_T[m],Pat_F[m]) \quad \text{(Eq. D-9)}$$

where $ED_B$ is calculated from Eq. D-1 or Eq. D-7.

When Eq. D-7 and Eq. D-8 are used, in the PRML channel in which the target signal level varies adaptively depending on the read signal, in cases where the Euclidean distance is dependent on the pattern or where the signal amplitude or asymmetric value vary with time due to sensitivity variations in the medium, for example, an advantage can be obtained that a more accurate evaluation value can be obtained at a particular time. However, it must be noted that there would be a disadvantage in cases where circuitry is fabricated on an LSI, for example, because this would result in a larger number of blocks that operate at high speeds which would consume more power. In the case of the PRML channel with a fixed target signal level, the reference Euclidean distance $d_{min}$ is also a fixed value, so that there is no need to calculate the $d_{min}$ value using Eq. D-2 or Eq. D-7 and instead pre-calculated constants may be used.

In the following, the calculation of an evaluation value for a single edge will be discussed. Methods of calculating MLSE in the case where PR(1,2,2,1)ML class is used for the RLL(1,7) code are described in the aforementioned Non-Patent Document 2 (Tech. Digest ODS '03, pp. 93) and Non-Patent Document 3 (Tech. Digest ISOM '03, pp. 116). From FIG. 1 and Table 2 in Non-Patent Document 3, it is seen that, also for an edge consisting of a combination of marks and spaces with lengths of 5T (T is the detection window width) or longer, the aforementioned evaluation value (designated as MD in the document) for edge shift is calculated from combinations of two patterns, one correct and the other erroneous (P2B/P2A and P7B/P7A in the document). Concrete blocks and patterns in the calculation system are described in FIG. 1 and Table 1 of Non-Patent Document 2. The 7-bit bit sequences shown as Path A and Path B in Table 1 of Non-Patent Document 2 correspond, from left to right, to P1A/P1B, P2A/P2B, . . . , in Non-Patent Document 3, of which P2A (bit sequence "1110000") and P2B (bit sequence "1111000") are now focused. This indicates the trailing edge of a mark of a subsequent pattern including a space with a length of 4T or longer and a mark with a length of 4T or longer. In the RLL(1,7) code, the maximum length of marks and spaces is 8T. Let us now consider the trailing edge of a subsequent pattern with a space length of 8T and a mark length of 8T with reference to the block diagram in FIG. 1 of Non-Patent Document 2.

FIG. 59 shows the results of determination made by a pattern detector at time t, and the operation for calculating evaluation values. As shown, the pattern detector detects P2B and P2A at time t=4 and t=5, respectively, so that the event of calculating the MD value occurs twice. Such a case occurs in cases of combinations of a mark and space with lengths of 5T or longer, as will be readily seen from FIG. 59 and Table 2 in Non-Patent Document 3. To put it more generally, such a case occurs in combinations of a mark and space with lengths of (N+1)T or longer, where N is the PRML class bit number (constraint length). It would be unnatural to calculate the shift amount for a single physical mark edge twice. One measure to avoid this is to store the fact that the calculation of the MD value has been made at t=4 so that no calculation is performed at t=5. In the PRML method with a fixed target signal level, as in PR(1,2,2,1)ML, the calculated value at t=4 would be equal to the calculated value at t=5, so that it would only be necessary to limit the calculation of the evaluation value from twice to once. In reality, however, patterns consisting of combinations of a mark and a space of 5T or longer in the RLL(1,7) code rarely occur, and therefore the influence of making the calculation twice is small. Thus, the MLSE value can be used for signal evaluation and hardly any problem would occur for all practical purposes.

Next, the adaptive PRML method in which the target signal level is adaptively varied depending on the read signal will be discussed. As described in Non-Patent Document 2, the definition of MLSE does not include the edge shift direction. On the other hand, in accordance with the present invention, the direction of edge shift D can be detected, as shown in Eq. D-5. When calculating edge shift D in FIG. 59, evaluation is made at t=4 for the case where the edge shift direction is left, while evaluation is made at t=5 for the case where the edge shift is right. If the values are DL and DR, respectively, DL and DR are generally roughly identical values. When the reference Euclidean distance is calculated using Eq. D-8, for example, the target signal level varies from one time to another, such that DL≠DR. In this case, in order to avoid carrying out the calculation twice, it is not sufficient merely to place a limitation such that once the calculation has been conducted at t=4, no calculation is conducted at t=5, as in the aforementioned method. However, the difference in magnitude between the absolute values of DL and DR can be considered small for all practical purposes. For example, in the case of the RLL(1,7) code, the frequency of the calculation taking place twice is small as long as the class bit number N is 4 or greater. Based upon these presumptions, if the circuit configuration is to be simplified, or the compatibility with MLSE in terms of definition is to be valued, DL and DR may be each added up in accordance with Eq. D-6 during the calculation of the S-SEAT value.

Meanwhile, when the RLL(2,10) code is used, as in DVDs or CDs, or when the class bit number is not more than 3, the influence of the double calculations becomes large. Further, when codes with a minimum run-length of 2T or longer, such as the RLL(1,7) code or the RLL(2,10) code, are used, the double calculations would occur for all of the edges in a V-SEAT in which a virtual state is introduced (the details of which will be described later).

Hereafter, a technique will be described whereby the double calculations is avoided in S-SEAT and V-SEAT, and a single shift amount is physically calculated for a single edge. There are three methods for implementing the technique, as follows:

(1) Instead of Eq. D-4 for shift amount D for a single edge of interest, in cases where both evaluation values DL and DR for left and right edge shifts can be calculated, an average shift amount represented by the following equation is used:

$$D = \frac{(DL+DR)}{2} \quad \text{(Eq. D-10)}$$

This is the most natural definition.

(2) Instead of Eq. D-4 for shift amount D for a single edge of interest, in cases where both evaluation values DL and DR for left and right edge shifts can be calculated, a shift amount with a smaller absolute value is used, as shown by the following equations:

$$D=DL \text{ if } |DL| \leq |DR|$$

$$D=DR \text{ if } |DL|>|DR| \quad \text{(Eq. D-11)}$$

Since measurements are always accompanied by errors, this method whereby a smaller absolute value is selected is effective in cases involving drive units, for example, where spike-like noise, such as the leaking-in of the clock, is relatively frequent.

(3) Instead of Eq. D-4 for shift amount D for a single edge of interest, in cases where both evaluation values DL and DR for left and right edge shifts can be calculated, a shift amount with a larger absolute value is used, as shown by the following equations:

$$D=DR \text{ if } |DL| \leq |DR|$$

$$D=DL \text{ if } |DL| > |DR| \qquad \text{(Eq. D-12)}$$

Although the details will be described later, in a PRML channel of the absolute-value system, the Do value shown in Auxiliary Eq. 1 can only be zero or a negative value. This is a feature of the absolute-value system PRML channel. This feature may in some cases cause either DL or DR to be zero. In order to avoid this, a method can be effectively employed whereby a value with a larger absolute value is selected. This is a definition that includes selecting the other if one is zero.

The means for achieving Object 2 is described in the following.

FIG. 7 shows a summary of target signal levels of the PR(1,2,2,1)ML decoder corresponding to the RLL(1,7) code. In this case, since the number of bits expressing the PR class is 4, the target signal levels are defined correspondingly for $2^4(=16)$ combinations of bit sequences. Bit sequences that include 1T-length bits are removed by the run-length limit, so that the number of valid bit sequences is 10. Within a Viterbi decoder circuit, there is implemented a computing element that is exclusively adapted to valid bit sequences. For Viterbi decoding, the 4-bit bit sequences are divided into 3-bit states and 1-bit data for decoding. Although they are substantially identical, an attempt to describe the process would lead to a complicated discussion and so the following description is made with reference to 4-bit bit sequences. It is emphasized here, however, that the bit sequences that have been removed within the Viterbi decoding circuit are not dependent on the length of the physical mark, but they are removed for the sole purpose of satisfying the run-length limit.

The reason why data patterns consisting of combinations of minimum run-lengths in MLSE or S-SEAT cannot be evaluated is rooted in the configuration of the Viterbi decoder, namely, the lack of valid, corresponding bit sequences in the decoder, as mentioned above. To solve this, bit sequences that include 1T-length bits should be made valid only in cases of evaluation of signal quality, thereby allowing the generation of a target signal regardless of the run-length limit.

FIG. 8 shows a summary of signal levels corresponding to the individual bit sequences in the Viterbi decoder unit and a read signal quality evaluation unit, and showing whether or not these bit sequences are valid. Within the decoder, the number of valid bit sequences is 10 due to the run-length limit, as in the aforementioned example. When evaluating the read signal quality, the bit sequences that have been eliminated by the run-length limit are rendered valid so that there are the original 16-bit bit sequences that are now valid. As a result, in the RLL(1,7) code, for example, a target signal can be produced for an error bit sequence for the case where the leading edge of the bit sequence "0110" (2T mark) is shifted and erroneously detected to be a bit sequence "0010" (1T mark). Thus, by establishing bit sequences and target signal levels while removing the run-length limit when evaluating a read signal, it becomes possible to evaluate patterns of combinations of minimum run-lengths.

In the following, a new signal evaluation index referred to as V-SEAT (Virtual-state-based-Sequenced Error for Adaptive Target) will be described. The calculation formulae for V-SEAT are the same as those for S-SEAT, namely, it is basically calculated from Eq. D-1 to Eq. D6. V-SEAT, however, may be extended in accordance with Eq. D-7 to Eq. D-12. Although V-SEAT is adapted to Viterbi decoders with a variable target level, as in the case of S-SEAT, it goes without saying that it can also be used with Viterbi decoders with a fixed target level.

FIG. 9 shows a summary of error patterns for the calculation of V-SEAT with respect to PR(1,2,2,1). As shown, the calculation patterns are simplified by the introduction of a 1T mark, and there are only four of them. In the figure, "X" may be either "0" or "1." Thus, the pattern detection circuit configuration can be advantageously simplified.

There are other advantages in evaluating signal quality with the run-length limit removed, as in V-SEAT. As mentioned above, in the case of PR(1,2,2,2,1), the pattern with a minimum Euclidean distance does not correspond to an edge shift, such that signal quality cannot be evaluated by MLSE or S-SEAT. This problem is due to the assumption that correct patterns and error patterns both satisfy the run-length limit. Reference is now made to pattern No. 1 of a 2-bit error, for example, shown in FIG. 4. This is the case where the pattern "0000110000000" is rendered into an erroneous pattern "0000011000000," indicating that a 2T mark is shifted to the right by 1T. We now consider an actual mark recorded on an optical disc. It is assumed that a 2T mark has been erroneously recorded with only the leading edge thereof shifted to the right. In order to make corrections for optimum recording conditions, the pulse or power can be optimized such that the position of the leading edge of the 2T mark can be corrected. However, the pattern of the bit sequence that is decoded by the Viterbi decoder would inevitably be the 2T mark that is shifted to the right by 1T as mentioned above, due to the run-length limit. To be sure, this would be the result if signal quality is evaluated with reference to the error frequency of the Viterbi decoder. However, a resultant evaluation index would only provide the erroneous information that the 2T mark has been shifted to the right. If the recording conditions were to be corrected based on such evaluation index, the write pulse or power conditions would be corrected such that the trailing edge of the 2T mark that was at the normal position would also be affected. This might not pose any problems to the optical disc devices that carries out recording and reproduction. It is easily imaginable, however, that this would tend to produce error if reproduced on an optical disc devices in which PR(1,2,1) or the direct-slice method is implemented. Since the optical discs are medium-replaceable storage systems, considerations must be given to prevent such problems related to playback compatibility. In V-SEAT, signal quality is evaluated in such a manner that the run-length limit is transcended, and individual edges of a mark are focused. Therefore, the leading edge of the 2T mark can be accurately evaluated in the aforementioned case too, which is advantageous in terms of recording/playback compatibility and recording control. Similarly, even in PRML decoders in which the minimum Euclidean distance does not correspond to an edge shift pattern, as in PR(1,2,2,2,1), the evaluation index of a unified edge shift base can be used, providing an advantage that the configuration of the signal evaluation circuit unit can be used as is when the PRML method is modified.

In order for V-SEAT to be adapted to Viterbi decoders with a variable target signal level, it must be shown how a target signal level for a bit sequence that includes 1T marks is determined. Since a Viterbi decoder does not include a state that corresponds to the 1T-length bit sequence, a target level table in the Viterbi decoder cannot be directly referred to for a target value. The PR class (1,2,2,1), for example, approximates the impulse response of a 1T signal. The target signal level of PRML with a fixed target is defined by the convolution of a bit sequence together with an impulse response. Thus, assuming that the convolution by linear addition is also valid for PRML with a variable target level, a target signal level corresponding to a virtual bit sequence including 1T can be determined.

FIG. 10 shows a summary of bit sequences of PRML with a variable target level with a class bit number of 4, and target signal levels. Such a PRML with a variable target level will be hereafter indicated as PR(a, b, c, d), for example. As shown, the target signal level v2 of bit sequence "0010" can be determined from:

$$v2 = v3 - v1 + v0 \quad \text{(Eq. 1)}$$

using the target signal levels v0, v1, and v3 of bit sequences "0000," "0001," and "0011" and in view of the fact that "0010"="0011"−"0001" and that the target signal level for "0000" is not zero.

Similarly, the level of a bit sequence that includes other 1T can be determined from:

$$v4 = v6 - v2 + v0 \quad \text{(Eq. 2)}$$

$$v5 = v7 - v2 + v0 \quad \text{(Eq. 3)}$$

$$v10 = v8 - v13 + v15 \quad \text{(Eq. 4)}$$

$$v11 = v9 - v13 + v15 \quad \text{(Eq. 5)}$$

$$v13 = v12 - v14 + v15 \quad \text{(Eq. 6)}$$

These calculation formulae for target signal levels for bit sequences including 1T are merely examples. Thus, Eq. 1, for example, may be modified using the fact that "0010"="111"−"1101" thus:

$$v2 = v15 - v13 + v0 \quad \text{(Eq. 7)}$$

Although when a linear addition is valid between target levels, the values of Eq. 1 and Eq. 7 would be identical, such a linear addition would not hold because generally there are non-linear effects during the recording step, such as thermal interference. Basically, target signal levels are calculated for bit sequences including 1T using Eq. 1 to Eq. 6. Preferably, the value obtained by a plurality of calculation formulae is weighted by the number of events that took place for averaging. The experiment results in an embodiment that will be described below are based on a method for calculation of a target level involving the latter.

When an arbitrary class with a larger class bit number must be handled, the following concept can be followed:

(Process 1) A target level for an isolated impulse of "1" is calculated. The isolated impulse of "1" refers to a target level for a bit sequence that includes only one "1" in it and "0" for the remainder. The value of such a bit sequence can be represented as $2^n$, where $0 \leq n < N$, N being the class bit number. The target level for such bit sequences is determined by addition or subtraction of target levels in accordance with the run-length limit.

(Process 2) A target level for an isolated impulse of "0" is calculated. The isolated impulse of "0" refers to a target level of a bit sequence that includes only one "0," with the rest being "1." The value of such a bit sequence can be represented as $2^N - 2^n$, where $0 \leq n < N$, N being the class bit number. The target level for such bit sequences is determined by addition or subtraction of target levels in accordance with the run-length limit.

(Process 3) A target level for an arbitrary bit sequence is determined. An arbitrary bit sequence B is calculated in terms of a superposition of isolated impulses of "1" using the following equation:

$$V1[B] = V_{zero} + \left( \sum_{n=0}^{N-1} I1[n] \times NotZero(B \ \& \ \& \ 2^n) - V_{zero} \right) \quad \text{(Eq. 8)}$$

where V1[B] is the target signal level for bit sequence B, $V_{zero}$ is the target level corresponding to bit sequence "00 . . . 00", I1[n] is the level of an isolated impulse of "1" with a bit sequence represented by $2^n$, NotZero(x) is a function that returns 1 when the value of x is not zero and 0 when it is zero, and "&&" is an operator that indicates the logical product of integers.

Similarly, an arbitrary bit sequence is calculated in terms of a superposition of isolated impulses of "0", from the following equation:

$$V0[B] = V_{one} + \left( \sum_{n=0}^{N-1} I1[n] \times IsZero(B \ \& \ \& \ 2^n) - V_{one} \right) \quad \text{(Eq. 9)}$$

where V0[B] is the target signal level for bit sequence B, $V_{one}$ is the target level corresponding to bit sequence "11 . . . 11", I0[n] is the level of an isolated impulse of "0" with a bit sequence represented by $2^N - 2^n$, IsZero(x) is a function that returns 1 when the value of x is zero and 0 when it is not zero.

The target levels determined from Eq. 8 and Eq. 9 in terms of superposition of impulses of "1" and "0" are averaged to find a target level, according to the following equation:

$$V[B] = \frac{(V1[B] + V0[B])}{2} \quad \text{(Eq. 10)}$$

The aforementioned expansion can also be applied to V-SEAT, as in S-SEAT. The details are the same as described with reference to Eq. D-7 to Eq. D-12.

FIG. 11 shows a summary of the definitions of MLSE, S-SEAT, and V-SEAT and their features.

The above has been the description of the means of achieving Objects 1 and 2 of the invention. In the following description of embodiments, concrete methods to deal with different PR classes and experiment results will be described in detail.

In accordance with the invention, the calculated values of S-SEAT value and V-SEAT value are hereafter assumed to be the RMS values of all of the values of edge shift D calculated in the same manner as for the MLSE value unless otherwise indicated, and the expansion definition will be described in a summarized manner. It is also assumed that the PRML channel is of a squared system unless otherwise indicated.

By using the method of evaluating a read signal provided by the invention and an optical disc device using the method, it becomes possible to: (1) evaluate a read signal adapted to the PRML channel with a target signal level that is adaptively varied depending on read signal; and (2) evaluate a read signal adapted to a data pattern consisting of combinations of minimum run-lengths.

BRIEF DESCRIPTION OF THE DRAWINGS

FIG. 2 shows a summary of some of bit error patterns when decoding the RLL(1,7) code using the PR(1,2,2,1) class.

FIG. 3 shows a summary of the error patterns and Euclidean distance for the PR(1,2,1) class in the RLL(1,7) code.

FIG. 4 shows a summary of the error patterns and Euclidean distance for the PR(1,2,2,2,1) class in the RLL(1,7) code.

FIG. 5 shows a summary of the error patterns and Euclidean distance for the PR(1,1,1,1) class in the RLL(1,7) code.

FIG. 6 shows a summary of the edge shift directions for a minimum Euclidean distance pattern for the PR(1,2,2,1) class in the RLL(1,7) code.

FIG. 7 shows a summary of target signal levels for the PR(1,2,2,1) class in the RLL(1,7) code.

FIG. 8 shows a summary of the signal level for each bit sequence in the PR(1,2,2,1) Viterbi decoder unit adapted to the RLL(1,7) code and in a read signal quality evaluation unit, as well as whether or not they are valid.

FIG. 9 shows a summary of error patterns when calculating V-SEAT for the PR(1,2,2,1) class.

FIG. 10 shows a summary of bit sequences and target signal levels for PRML with a variable target level with a class bit number of 4.

FIG. 11 shows a summary of the definitions and features of MLSE, S-SEAT, and V-SEAT.

FIG. 12 shows a summary of the Euclidean distance and edge shift directions for a 1-bit error pattern for the PR(1,2,1) and PR(a,b,c) classes adapted to the RLL(1,7) code.

FIG. 13 shows a summary of the target signal levels for the PR(a,b,c)ML decoder with a variable target levels adapted to the RLL(1,7) code.

FIG. 14 shows a summary of the detection patterns and edge shift directions for the PR(1,2,1) and PR(a,b,c) classes adapted to the RLL(1,7) code.

FIG. 15 shows a summary of the target signals for the PR(1,2,1)ML decoder with a fixed target level adapted to the RLL(1,7) code.

FIG. 16 shows a summary of the target signals for the PR(a,b,c)ML decoder with a variable target level adapted to the RLL(1,7) code.

FIG. 17 shows a summary of the Euclidean distance and edge shift directions for a 1-bit error pattern for the PR(1,2,2,1) and PR(a,b,c,d,e) classes adapted to the RLL(1,7) code.

FIG. 18 shows a summary of the target signal levels for the PR(a,b,c,d,e)ML decoder with a variable target level adapted to the RLL(1,7) code.

FIG. 19 shows a summary of the detection patterns and edge shift directions for the PR(1,2,2,1) and PR(a,b,c,d,e) classes adapted to the RLL(1,7) code.

FIG. 20 shows a summary of the target signal levels for the PR(1,2,2,1)ML decoder with a fixed target level adapted to the RLL(1,7) code.

FIG. 21 shows a summary of the target signal levels for the PR(a,b,c,d,e)ML decoder with a variable target level adapted to the RLL(1,7) code.

FIG. 22 shows a summary of the Euclidean distance and edge shift directions for a 1-bit error pattern for the PR(1,2,3,3,2,1) and PR(a,b,c,d,e,f) classes adapted to the RLL(1,7) code.

FIG. 23 shows a summary of the target signal levels for the PR(a,b,c,d,e,f)ML decoder with a variable target level adapted to the RLL(1,7) code.

FIG. 24 shows a summary of the detection patterns and edge shift directions for V-SEAT for the PR(1,2,3,3,2,1) and PR(a,b,c,d,e,f) classes adapted to the RLL(1,7) code.

FIG. 25-1 shows a summary of the target signal levels for the PR(1,2,3,3,2,1)ML decoder with a fixed target level adapted to the RLL(1,7) code.

FIG. 25-2 shows a summary of the target signal levels for the PR(1,2,3,3,2,1)ML decoder with a fixed target level adapted to the RLL(1,7) code.

FIG. 26-1 shows a summary of the target signal levels for the PR(a,b,c,d,e,f)ML decoder with a variable target level adapted to the RLL(1,7) code.

FIG. 26-2 shows a summary of the target signal levels for the PR(a,b,c,d,e,f)ML decoder with a variable target level adapted to the RLL(1,7) code.

FIG. 27 shows a summary of the Euclidean distance and edge shift directions for a 1-bit error pattern for the PR(1,2,2,1) and PR(a,b,c,d) classes adapted to the RLL(1,7) code.

FIG. 28 shows a summary of the target signal levels for the PR(a,b,c,d)ML decoder with a variable target level adapted to the RLL(1,7) code.

FIG. 29 shows a summary of the detection patterns and edge shift directions for V-SEAT for the PR(1,2,2,1) and PR(a,b,c,d) classes adapted to the RLL(1,7) code.

FIG. 30 shows a summary of the target signal levels for the PR(1,2,2,1)ML decoder with a fixed target level adapted to the RLL(1,7) code.

FIG. 31 shows a summary of the target signal levels for the PR(a,b,c,d)ML decoder with a variable target level adapted to the RLL(1,7) code.

FIG. 32 shows a summary of the Euclidean distance and edge shift directions for a 1-bit error pattern for the PR(3,4,4,3) and PR(a,b,c,d) classes adapted to the RLL(2,10) code.

FIG. 33 shows a summary of the target signal levels for the PR(a,b,c,d)ML decoder with a variable target level adapted to the RLL(2,10) code.

FIG. 34 shows a summary of the detection patterns and edge shift directions for V-SEAT for the PR(3,4,4,3) and PR(a,b,c,d) classes adapted to the RLL(2,10) code.

FIG. 35 shows a summary of the target signal levels for the PR(3,4,4,3)ML decoder with a fixed target level adapted to the RLL(2,10) code.

FIG. 36 shows a summary of the target signal levels for the PR(a,b,c,d)ML decoder with a variable target level adapted to the RLL(2,10) code.

FIG. 37 shows an embodiment for the case where the target signal levels for the PR(a,b,c)ML decoder with a variable target level adapted to the RLL(1,7) code are determined on the assumption that an asymmetry amount is zero.

FIG. 38 shows an embodiment for the case where the target signal levels for the PR(a,b,c,d)ML decoder with a variable target level adapted to the RLL(1,7) code are determined on the assumption that an asymmetry amount is zero.

FIG. 39 shows an embodiment for the case where the target signal levels for the PR(a,b,c,d)ML decoder with a variable target level adapted to the RLL(2,10) code are determined on the assumption that an asymmetry amount is zero.

FIG. 48 shows an embodiment indicating the basic concept of an information reading method of the compensated PRML type.

FIG. 51 shows the results of a measurement of MLSE, S-SEAT, and V-SEAT when a DVD-RAM disc was read using the PR(3,4,4,3) class.

FIG. 52 shows the results of evaluation of the edge shift amounts of patterns classified by the relationship between front and rear spaces and marks when a DVD-RAM disc was read using the PR(3,4,4,3) and PR(a,b,c,d) classes, using MLSE, S-SEAT, and V-SEAT.

FIG. 57 shows the results of evaluation of the edge shift amounts of patterns classified by the relationship between front and rear spaces and marks when reading a prototype disc using the PR(1,2,2,1) and PR(a,b,c,d) classes, in terms of MLSE, S-SEAT, and V-SEAT.

FIG. 59 schematically shows how a pattern detector determines with respect to time t, and the operation for calculating an evaluation value.

FIG. 60 shows the results of a measurement of MLSE, S-SEAT, and V-SEAT when reading a DVD-RAM disc using the PR(3,4,4,3) class.

FIG. 61 shows the results of a measurement of MLSE, S-SEAT, and V-SEAT when reading a DVD-RAM disc using the PR(a,b,c,d) class.

FIG. 62 shows the results of a measurement of MLSE, S-SEAT, and V-SEAT when reading a DVD-RAM disc using the PR(a,b,c,d) class of the absolute system.

FIG. 63 shows the results of a measurement of V-SEAT with varying ways of handling an edge portion when reading a DVD-RAM disc using the PR(a,b,c,d) class.

FIG. 64 shows the results of a measurement of V-SEAT with varying ways of handling an edge portion when reading a DVD-RAM disc using the PR(a,b,c,d) class of the absolute system.

DESCRIPTION OF THE PREFERRED EMBODIMENTS

Figure 1:
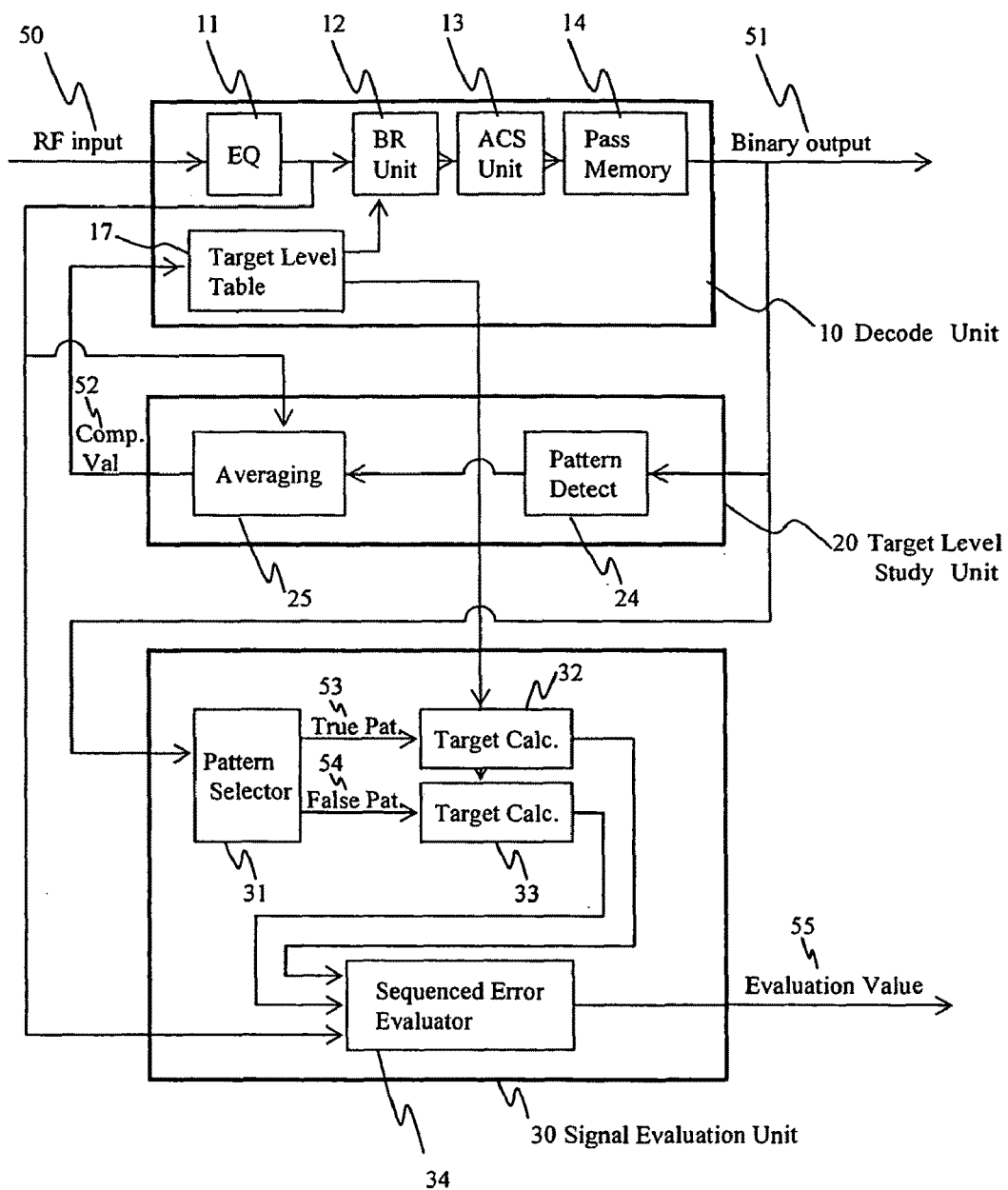
FIG. 1 shows an example of the S-SEAT calculation circuit implemented in the optical disc apparatus of the invention.

The invention will now be described in detail by way of embodiments.

Embodiment 1

Handling of a Variety of PR Classes

In the foregoing descriptions, methods of calculating S-SEAT and V-SEAT with respect to a PR(1,2,2,1) decoder adapted to the RLL(1,7) code. In the following, an embodiment is described that relates to the PR(1,2,1), PR(12221), and PR(123321) classes adapted to the RLL(1,7) code, and the PR(3,4,4,3) class adapted to the RLL(2,10) code.

Initially, the PR class adapted to the RLL(1,7) code, such as for Blu-ray Disc, will be discussed.

FIG. 12 shows a summary of the Euclidean distance and the edge shift direction for 1-bit error patterns for the PR(1,2,1) and PR(a,b,c) classes adapted to the RLL(1,7) code. As shown in the drawing, there are two combinations of patterns for the 1-bit error, and the Euclidean distance for a fixed target level is 6. The definition of the edge shift direction for each pattern is as shown.

First, the calculation of S-SEAT will be described.

FIG. 13 shows a summary of the target signal levels for a PR(a,b,c)ML decoder with a variable target level adapted to the RLL(1,7) code. When calculating S-SEAT, a bit pattern shown in FIG. 12 is extracted, and an evaluation value is calculated in accordance with the aforementioned definition.

Next, the calculation of V-SEAT will be described.

FIG. 14 shows a summary of the detection patterns for V-SEAT for the PR(1,2,1) and PR(a,b,c) classes adapted to the RLL(1,7) code, and the edge shift directions. As shown, there are four combinations of the patterns for a 1-bit error. In the case of a fixed target level, the Euclidean distance is 6. The definition of the edge shift direction for each pattern is as shown.

FIG. 15 shows a summary of the target signal levels for the PR(1,2,1)ML decoder with a fixed target level adapted to the RLL(1,7) code. In this table, the target signal levels are normalized to ±1. When calculating V-SEAT, a bit pattern in FIG. 14 is extracted and an evaluation value is calculated in accordance with the aforementioned definition.

FIG. 16 shows a summary of the target signal levels for a PR(a,b,c)ML decoder with a variable target level adapted to the RLL(1,7) code. When calculating V-SEAT, a target signal level for a bit sequence including a 1T length is calculated in accordance with the definition shown in the figure, a bit pattern in FIG. 14 is extracted, and an evaluation value can be calculated in accordance with the aforementioned definition.

FIG. 17 shows a summary of the Euclidean distance and edge shift direction for 1-bit error patterns for the PR(1,2,2,2,1) and PR(a,b,c,d,e) classes adapted to the RLL(1,7) code. As shown, there are 18 combinations of the 1-bit error patterns, and the Euclidean distance in the case of a fixed target level is 14. The definition of the edge shift direction for each pattern is as shown.

Initially, the calculation of S-SEAT will be described.

FIG. 18 shows a summary of the target signal levels for a PR(a,b,c,d,e)ML decoder with a variable target level adapted to the RLL(1,7) code. When calculating S-SEAT, a bit pattern in FIG. 17 is extracted and an evaluation value is calculated in accordance with the aforementioned definition.

Next, the calculation of V-SEAT will be described.

FIG. 19 shows a summary of the detection patterns and edge shift directions for V-SEAT for the PR(1,2,2,2,1) and PR(a,b,c,d,e) classes adapted to the RLL(1,7) code. As shown, there are four combinations of the patterns for a 1-bit error, and the Euclidean distance for the case of a fixed target level is 14. The definition of the edge shift direction for each pattern is a shown.

FIG. 20 shows a summary of the target signal levels for a PR(1,2,2,2,1)ML decoder with a fixed target level adapted to the RLL(1,7) code. In this example, the target signal levels are normalized to ±1. When calculating V-SEAT, a bit pattern in FIG. 19 is extracted and an evaluation value is calculated in accordance with the definition.

FIG. 21 shows a summary of the target signal levels for a PR(a,b,c,d,e)ML decoder with a variable target level. When calculating V-SEAT, a target signal level corresponding to a bit sequence including a 1T length adapted to the RLL(1,7) code is calculated in accordance with the definition shown, a bit pattern in FIG. 19 is extracted, and an evaluation value is calculated in accordance with the aforementioned definition.

FIG. 22 shows a summary of the Euclidean distance and edge shift directions for 1-bit error patterns for the PR(1,2,3, 3,2,1) and PR(a,b,c,d,e,f) classes adapted to the RLL(1,7) code. As shown, there are 18 combinations of the patterns for a 1-bit error, and, in the case of a fixed target level, the Euclidean distance is 28. The definition of the edge shift direction for each pattern is as shown.

Initially, the calculation of S-SEAT will be described.

FIG. 23 shows a summary of the target signal levels for a PR(a,b,c,d,e,f)ML decoder with a variable target level adapted to the RLL(1,7) code. when calculating S-SEAT, a bit pattern shown in FIG. 22 is extracted and an evaluation value is calculated in accordance with the aforementioned definition.

Next, the calculation of V-SEAT will be described.

FIG. 24 shows a summary of the detection patterns for V-SEAT for the PR(1,2,3,3,2,1) and PR(a,b,c,d,e,f) classes for the RLL(1,7) code, and the edge shift directions. As shown, there are four combinations of the patterns for a 1-bit error, and, in the case of a fixed target level, the Euclidean distance is 28. The definition of the edge shift direction for each pattern is as shown.

FIG. 25 shows a summary of the target signal levels for a PR(1,2,3,3,2,1)ML decoder with a fixed target level adapted to the RLL(1,7) code. In the figure, the target signal levels are normalized to ±1. When calculating V-SEAT, a bit pattern in FIG. 24 is extracted and an evaluation value may be calculated in accordance with the definition.

FIG. 26 shows a summary of the target signal levels for a PR(a,b,c,d,e,f)ML decoder with a variable target level adapted to the RLL(1,7) code. When calculating V-SEAT, a target signal level for a bit sequence including 1T lengths is calculated in accordance with the definition shown, a bit pattern in FIG. 24 is extracted, and an evaluation value can be calculated in accordance with the aforementioned definition. In the illustrated example, after target levels for a "1" impulse and a "0" impulse are calculated in accordance with the aforementioned Eq. 8 and Eq. 9, other target levels are calculated with Eq. 10. The target levels for the "1" impulse are v2, v4, v8, and v16, while the target levels for the "0" impulse are v61, v59, v55, and v47.

Finally, as the PR class adapted to the RLL(1,7) code, PR(1,2,2,1) is described in a summarized manner with a view to facilitating a better understanding of the invention, although some parts of the description may be redundant with the foregoing.

FIG. 27 shows a summary of the Euclidean distance and edge shift directions for 1-bit error patterns for the PR(1,2,2, 1) and PR(a,b,c,d) classes adapted to the RLL(1,7) code. As shown, there are 8 combinations of the patterns for a 1-bit error, and, in the case of a fixed target level, the Euclidean distance is 10. The definition of the edge shift direction for each pattern is as shown.

Initially, the calculation of S-SEAT will be described.

FIG. 28 shows a summary of the target signal levels for a PR(a,b,c,d)ML decoder with a variable target level adapted to the RLL(1,7) code. When calculating S-SEAT, a bit pattern in FIG. 27 is extracted, and an evaluation value can be calculated in accordance with the aforementioned definition.

Next, the calculation of V-SEAT will be described.

FIG. 29 shows a summary of the detection patterns and edge shift directions for V-SEAT for the PR(1,2,2,1) and PR(a,b,c,d) classes adapted to the RLL(1,7) code. As shown, there are four combinations of the patterns for a 1-bit error, and, in the case of a fixed target level, the Euclidean distance is 10. The definition of the edge shift direction for each pattern is as shown.

FIG. 30 shows a summary of the target signal levels for a PR(1,2,2,1)ML decoder with a fixed target level adapted to the RLL(1,7) code. The target signal levels are normalized to ±1. When calculating V-SEAT, a bit pattern in FIG. 29 is extracted and an evaluation value can be calculated in accordance with the aforementioned definition.

FIG. 31 shows a summary of the target signal levels for a PR(a,b,c,d)ML decoder with a variable target level adapted to the RLL(1,7) code. When calculating V-SEAT, a target signal level adapted to bit sequences including 1T lengths is calculated in accordance with the definition shown in the figure, a bit pattern in FIG. 29 is extracted, and an evaluation value can be calculated in accordance with the aforementioned definition.

Next, PR classes adapted to the RLL(2,10) code in CDs/DVDs will be described.

FIG. 32 shows a summary of the Euclidean distance and edge shift directions for 1-bit error patterns for the PR(3,4,4, 3) and PR(a,b,c,d) classes adapted to the RLL(2,10) code. As shown, there are two combinations of the patterns for a 1-bit error and, in the case of a fixed target level, the Euclidean distance is 50. The definition of the edge shift direction for each pattern is as shown.

Initially, the calculation of S-SEAT will be described.

FIG. 33 shows a summary of the target signal levels for a PR(a,b,c,d)ML decoder with a variable target level adapted to the RLL(2,10) code. When calculating S-SEAT, a bit pattern shown in FIG. 32 is extracted, and an evaluation value can be calculated in accordance with the aforementioned definition.

Next, the calculation of V-SEAT will be described.

FIG. 34 shows a summary of the detection patterns and edge shift directions for V-SEAT for the PR(3,4,4,3) and PR(a,b,c,d) classes adapted to the RLL(2,10) code. As shown, there are four combinations of the patterns for a 1-bit error, and, in the case of a fixed target level, the Euclidean distance is 50. The definition of edge shift direction for each pattern is as shown.

FIG. 35 shows a summary of the target signal levels for a PR(3,4,4,3)ML decoder with a fixed target level adapted to the RLL(2,10) code. The target signal levels are normalized to ±1. When calculating V-SEAT, a bit pattern shown in FIG. 34 is extracted, and an evaluation value can be calculated in accordance with the aforementioned definition.

FIG. 36 shows a summary of the target signal levels for a PR(a,b,c,d)ML decoder with a variable target level adapted to the RLL(2,10) code. when calculating V-SEAT, a target signal level adapted to bit sequences including 1T and 2T lengths is calculated in accordance with the definition shown in the figure, a bit pattern in FIG. 35 is extracted, and an evaluation value can be calculated in accordance with the aforementioned definition.

The above-described embodiment relating to V-SEAT involves the general cases where the asymmetry of the read signal is not zero and the magnitude of the "1" impulses and that of the "0" impulses are not equal. In the following embodiment, more simplified ways of determining a variable target level will be described for cases where the asymmetry of the read signal is small and the magnitude of the "1" impulses and that of the "0" impulses can be considered equal.

In the invention, the PR class of the variable target level is indicated as PR(a,b,c,d), for example, for convenience sake. In cases where the asymmetry can be considered to be zero, the temporal change in the "1" impulse response is (a,b,c,d). If the signal amplitude is normalized to ±1, the "0" impulse response is (−a, −b, −c, −d). Thus, by determining the value of each of a, b, c, and d from the target level table, the target signal level for an arbitrary bit sequence can be calculated by a convolution computation of the bit sequence and an impulse response in a simplified process. The PR class with values of a, b, c, and d determined from the target level table is herein referred to as an integrated PR class.

In the following, an embodiment for the classes PR(a,b,c) and PR(a,b,c,d) adapted to the RLL(1,7) code and the class PR(a,b,c,d) adapted to the RLL(2,10) code will be described.

FIG. 37 shows a case where target signal levels for a PR(a,b,c) ML decoder with a variable target level adapted to the RLL(1,7) code are determined on the assumption that the asymmetry amount is zero. The target signal levels are normalized to ±1. As shown in the figure, the integrated PR class is determined from:

$$a=\{(v1-v0)-(v6-v7)\}/2 \quad \text{(Eq. 11)}$$

$$b=\{(v3-v1)-(v4-v6)\}/2 \quad \text{(Eq. 12)}$$

$$c=\{(v4-v0)-(v3-v7)\}/2 \quad \text{(Eq. 13)}$$

Each indicates an average of the magnitude of the impulses of "1" and "0," and can be easily calculated with reference to FIG. 16. When asymmetry is zero and amplitude is normalized to ±1, v0=+1 and V7=−1. Using these, an arbitrary target level can be calculated, such as v1=v0+a, for example. Ways of determining all of the target levels are as shown.

FIG. 38 shows a case where target signal levels for a PR(a,b,c,d)ML decoder with a variable target level adapted to the RLL(1,7) code are determined on the assumption that the asymmetry amount is zero. The target signal levels are herein normalized to ±1. As shown, the integrated PR class can be determined from:

$$a=\{(v1-v0)-(v14-v15)\}/2 \quad \text{(Eq. 14)}$$

$$b=\{(v3-v1)-(v12-v14)\}/2 \quad \text{(Eq. 15)}$$

$$c=\{(v6-v2)-(v9-v13)\}/2 \quad \text{(Eq. 16)}$$

$$d=\{(v8-v0)-(v7-v15)\}/2 \quad \text{(Eq. 17)}$$

Each is an average of the magnitude of the impulses "1" and "0" and can be determined easily with reference to FIG. 31. When asymmetry is zero and amplitude is normalized to ±1, v0=+1 and V15=−1. Using these, an arbitrary target level can be calculated, such as v1=v0+a, for example. Ways of determining all of the target levels are as shown.

FIG. 39 shows a case where target signal levels for a PR(a,b,c,d)ML decoder with a variable target level adapted to the RLL(2,10) code are determined on the assumption that asymmetry amount is zero. The target signal levels are herein normalized to ±1. As shown, the integrated PR class can be determined from:

$$a=\{(v1-v0)-(v14-v15)\}/2 \quad \text{(Eq. 18)}$$

$$b=\{(v3-v1)-(v12-v14)\}/2 \quad \text{(Eq. 19)}$$

$$c=\{(v6-v2)-(v9-v13)\}/2 \quad \text{(Eq. 20)}$$

$$d=\{(v8-v0)-(v7-v15)\}/2 \quad \text{(Eq. 21)}$$

These are identical to Eq. 14 to Eq. 17. Each is an average of the magnitude of the impulses "1" and "0" and can be determined easily with reference to FIG. 26. When asymmetry is zero and amplitude is normalized to ±1, v0=+1 and V15=−1. Using these, an arbitrary target level can be calculated, such as v1=v0+a, for example. Ways of determining all of the target levels are as shown.

In other cases, a target level for an arbitrary bit sequence can be similarly defined for PR(a,b,c,d,e), PR(a,b,c,d,e,f), and the like by averaging the magnitude of the impulses of "1" and "0" and calculating the integrated PR class from the target signal level table. The results are identical to the averaged magnitude of the levels of a bit sequence in which the "1s" and "0s" have been exchanged for a target signal level in the case where asymmetry is not zero. This operation corresponds to the fact that asymmetry is zero.

Embodiment 2

Circuit Configuration

Hereafter, the configuration of an example of a circuit suitable for the calculation of S-SEAT and V-SEAT is described with reference to the drawings.

FIG. 1 shows the configuration of an S-SEAT calculation circuit mounted on an optical disc apparatus of the invention. The circuit consists of a decoding unit 10, a target level studying unit 20, and a signal evaluation unit 30.

Initially, the decoding unit 10 is described. The decoding unit 10 includes a waveform equalizer 11, a branch metric calculation unit 12, an ACS (Add Select Compare) unit 13, a path memory 14, and a target level table 17. A read signal 50, which is converted into a digital value in advance by an AD converter, is equalized by an FIR filter in the waveform equalizer 11. The read signal 50 is then fed to the branch metric calculation unit 12, where the square of the error from a target value ("branch metric value") is calculated for each bit sequence. For the target value for each bit sequence, a target level table 17 is referred to. In the ACS unit 13, the branch metric value corresponding to each bit sequence is added to a metric value (which is obtained by sequentially adding up branch metric values along with the transition of states and that has been processed such that it does not diverge) in a state preceding by one time and in each state. At this time, a process is performed whereby, among the transition processes leading to the state of the current time (of which there are normally two; or in some case one, due to the run-length limit), one with a smaller metric value is selected. The "state" refers to a bit sequence that is stored with respect to the transition at one time. For example, in the case where the PR class bit is 4, the bit sequence is represented by 4 bits and the state is represented by 3 bits. In the path memory 14, there is stored the binarization result decoded for each bit sequence for a sufficiently long period of time. The memory content is subjected to a shift process simultaneously with a renewal of time, such that there is stored the latest result at all times. The ACS unit 13 rearranges the information stored in the path memory depending on the selection result during the selection of the transition process. By repeating these processes, the information within the path memory is integrated little by little. As a result, after a sufficiently long time, the values become identical regardless of the bit sequence, whereupon a so-called path-merge is completed. A binarization result 51 refers to the binarized information obtained from the path memory at the time of renewal of the time.

The following is a description of the target level-studying unit 20, which consists of a pattern detector 24 and an averaging unit 25. The pattern detection unit 24 stores the binarization result 51 for as many class bit numbers as there are, and sends the address information corresponding to a particular bit sequence to the averaging unit 25. The averaging unit 25 averages the levels of the read signal outputted from the waveform equalizer 11 for the address information at a particular time, namely, for each corresponding bit sequence, and then stores the result in a corresponding memory table within the target level table 17.

Finally, the signal evaluation unit 30 is described. The signal evaluation unit 30 consists of a pattern selection unit 31, target level calculation units 32, and 33, and a sequence error evaluation unit 34. The pattern selection unit 31 stores the binarization result 51 corresponding to a 1-bit error, for as many "class bit number x2−1" as there are, as described above, in order to determine whether or not the binarization result 51 corresponds to the calculation pattern for S-SEAT. If it is determined to be the calculation pattern, it is designated as a "True" pattern 53 and sent to the target level calculation unit 32. At the same time, the aforementioned 1-bit error pattern is generated and is designated as a "False" pattern 54, which is then sent to the target level calculation unit 33. The target level calculation units 32 and 33 output target signal levels corresponding to the "True" pattern 53 and "False" pattern 54 by referring to the target level table 17. In the sequence error evaluation unit 34, using the outputs from the target level calculation units 32 and 33 and the outputs from the waveform equalizer 11, an S-SEAT value 55 is calculated in accordance with the definitions of Eq. D-1 to Eq. D-6. As mentioned above, the S-SEAT value 55 can be expanded in accordance with Eq. D-7 to Eq. D-12.

Figure 40:
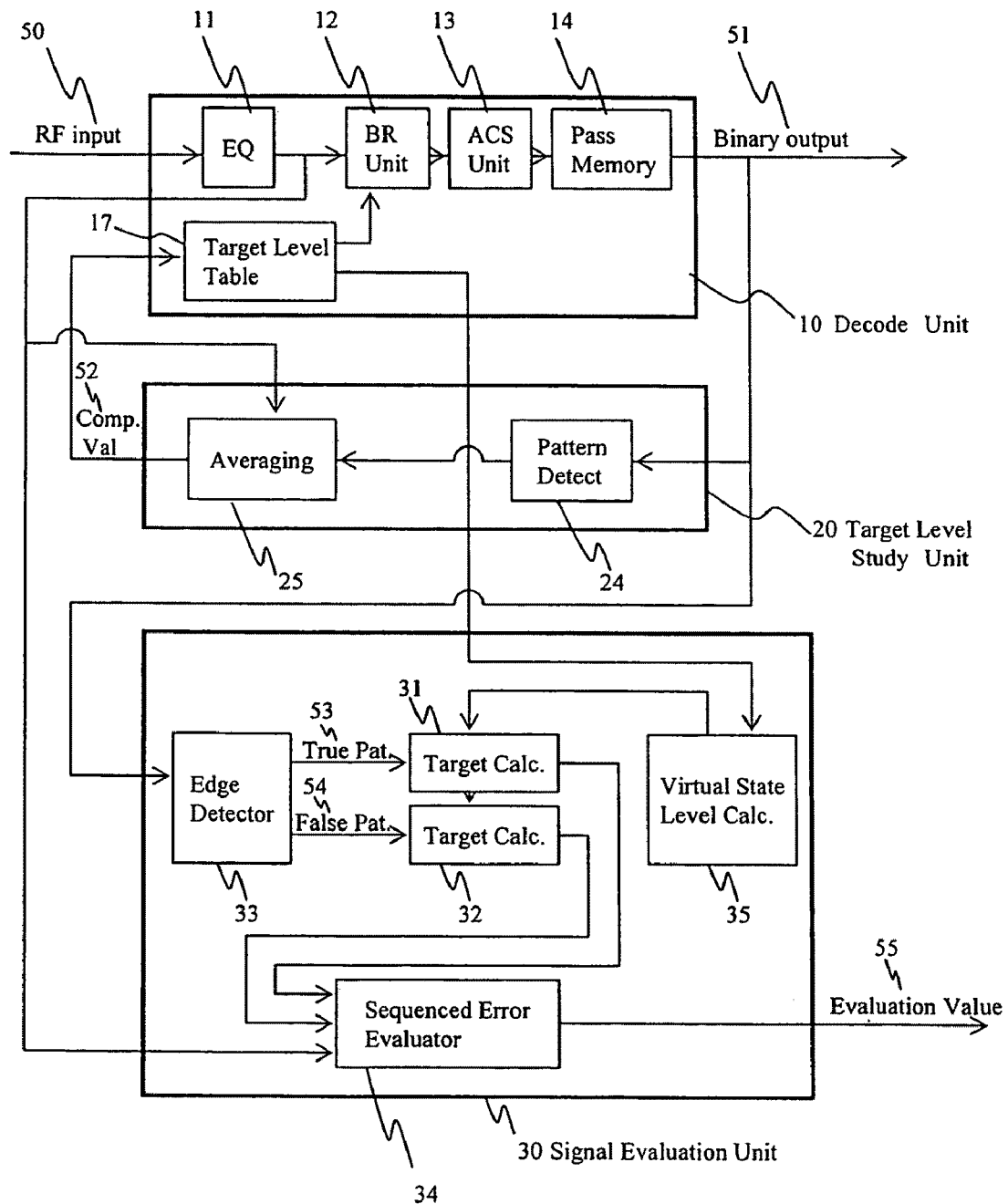
FIG. 40 shows an example of the configuration of the V-SEAT calculation circuit implemented on the optical disc apparatus of the invention.

FIG. 40 shows the configuration of a V-SEAT calculating circuit mounted on the optical disc apparatus of the invention. The configuration includes a decoding unit 10, a target level studying unit 20, and a signal evaluation unit 30. The basic operation of the apparatus is the same as that of the foregoing embodiment. As a unique constituent element for calculating V-SEAT, a virtual target level calculation unit 35 is added. The virtual target level calculation unit 35 carries out a process whereby, regardless of the run-length limit, a target signal level for all of the bit sequences is calculated by the above-described method using the table values in the target level table 17 and is then stored. The pattern selection unit 31 performs a process of selecting a bit pattern adapted to V-SEAT. The sequence error evaluation unit 34, using the outputs from the target level calculation units 32 and 33, and the output from the waveform equalizer 11, calculates a V-SEAT value 55 in accordance with the definitions of Eq. D-1 to Eq. D-6. As mentioned above, the V-SEAT value 55 can be expanded in accordance with Eq. D-7 to Eq. D-12.

Finally, the signal evaluation unit 30 is described. The signal evaluation unit 30 consists of a pattern selection unit 31, target level calculation units 32 and 33, and a sequence error evaluation unit 34. The pattern selection unit 31 stores the binarization result 51 corresponding to a 1-bit error, for as many "class bit number x2−1" as there are, as described above, and then determines whether or not it is a calculation pattern for S-SEAT. If it is determined to be the calculation pattern, it is designated as a "True" pattern 53 and sent to the target level calculation table 32. At the same time, the aforementioned 1-bit error pattern is generated and designated as a "False" pattern 54, which is then sent to the target level calculation unit 33. The target level calculation units 32 and 33 output target signal levels corresponding to the "True" pattern 53 and "False" pattern 54 by referring to the target level table 17. The sequence error evaluation unit 34, using the outputs from the target level calculation units 32 and 33 and the waveform equalizer 11, calculates a S-SEAT value 55 in accordance with the definitions of Eq. D-1 to Eq. D-6. As mentioned above, the S-SEAT value 55 can be expanded in accordance with Eq. D-7 to Eq. D-12.

The above-described two embodiments involve cases where the target level studying unit 20 is operated at all times during the signal reproduction process. Preferably, however, the target level is fixed when evaluating the read signal quality, from the viewpoint of evaluation stability. Thus, when evaluating signal quality, the operation of the target level-studying unit 20 is preferably terminated such that the values in the target level table 17 are not updated.

Figure 41:
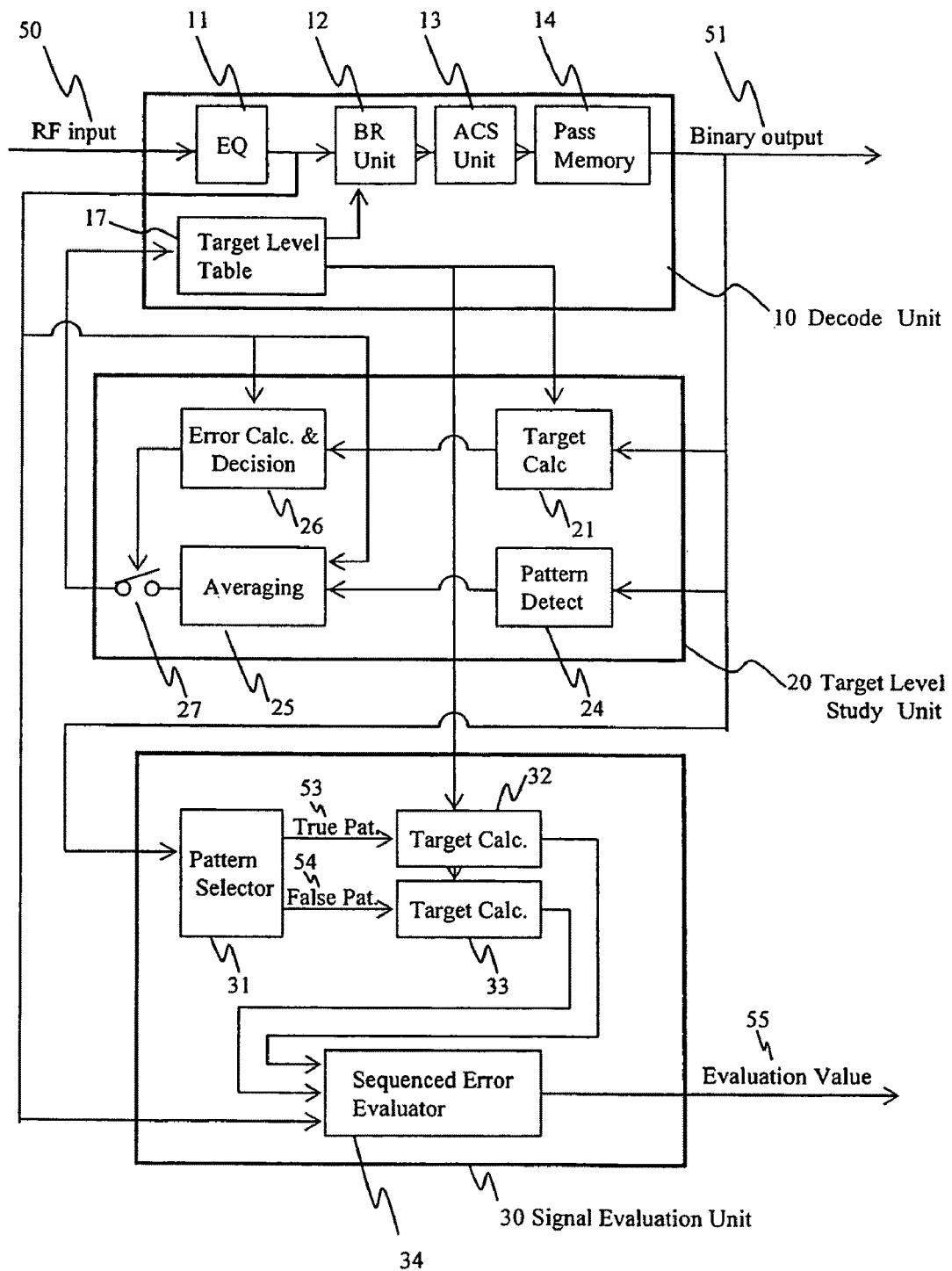
FIG. 41 shows another example of the configuration of the S-SEAT calculation circuit implemented on the optical disc apparatus of the invention.

FIG. 41 shows another configuration of the S-SEAT calculation circuit mounted on the optical disc apparatus of the invention. This configuration differs from the foregoing embodiments in the target level-studying unit 20. Specifically, in the present embodiment, the target level studying unit 20 additionally includes a target level calculation unit 21, an error calculation/operation control unit 26, and a switch 27. In a PRML decoder with a variable target level, the values in the target level table 17 are updated depending on read signal. In order to ensure operational stability of the optical disc apparatus, it is necessary to limit the cases where an updating process is carried out. For example, the decoder could go out of control and its normal operation could be hindered if the target signal level updating process is carried out when: (1) a seek is being carried out; (2) the operation of the PLL (Phase Locked Loop) circuit (not shown) for extracting clock from the read signal is not stable; or (3) the disc medium is contaminated with dust or fingerprint or has a defect or the like, resulting in a significant distortion of the read signal. In order to avoid these potential problems, a detection circuit needs to be provided that can detect any of the aforementioned cases, so that the updating process can be terminated as needed. In accordance with the method of the present embodiment, the error between the target signal level and the read signal is constantly calculated, and the target signal level updating process is carried out only when the absolute value of the error drops below a predetermined value, thereby allowing the aforementioned function to be readily realized. The operation of the function is as follows. The target level calculation unit 21 receives the binarization result 51 as an input and outputs a target signal level at all times. The error calculation/operation control unit 26 evaluates the error between the output of the waveform equalizer 11 and the target level calculation unit 21, and closes the switch 27 only when the absolute value of the error is below a predetermined value, thereby controlling the target signal level updating process. Although in the present embodiment the switch 27 is introduced, this is merely for facilitating the understanding of the concept of the invention. Preferably, however, it is better and simpler for an actual circuit to implement a method whereby the operation control is based on an ON/OFF control of the clock supplied to the averaging unit 25, or a method whereby a logical product circuit is added in the output stage of the averaging unit 25 for operation control purposes.

The following describes the operation principle of a compensated PRML method that is capable of achieving higher recording densities, and a target level restricted PRML method for improving reproduction compatibility, of the PRMLs with a variable target level. It also describes examples of the S-SEAT and V-SEAT calculation circuits according to the invention.

One issue that must be addressed when trying to achieve significantly higher storage capacities in optical discs via improvement in the PRML method is the suppression of the non-linear edge shift due to thermal interference or the like during recording. As previously mentioned, in the PRML method, the target signal is determined by the selection of the PR class. Thus, the inventors' analyzed the difference in the effect of achieving higher densities depending on different PR classes, by recording a single optical disc with signals with different recording densities.

The optical disc that was prepared comprised a substrate with a land-groove structure having a track pitch of 0.34 μm, on which a phase-change layer was stacked. In the experiment, the DDU-1000 optical disc evaluation apparatus manufactured by Pulse Tech Industrial Co., Ltd. was used. The wavelength of the light source was 405 nm, and the NA of the objective lens was 0.85. As a modulation code, RLL(1,7) was used, with the detection window width Tw being varied from 53 nm to 80 nm. The recording capacity on one side of a CD-sized disc was assumed to be 35 GB in the case of Tw=53 nm.

The following three sequences were selected for the analysis of the difference in PR class:
(1) $(1+D)^n$ Sequence
This is the most basic class sequence and it includes PR(1, 1), PR(1,2,1), PR(1,3,3,1), . . . and so on.
(2) (1, 2, . . . , 2, 1) Sequence
This is a sequence that includes PR(1,2,2,1) which is often used in optical discs. As compared with the preceding sequence, there is less high-end emphasis, so that an improvement in the S/N ratio can be expected.
(3) Impulse-Response Approximated Sequence
The PR class is basically an approximation of the impulse-response of a reproduction head.
In the present example, the impulse of an optical head was calculated using an optical simulator, and the result was employed in the PR class.
Using each of the selected PR classes, and using an ideal read signal calculated by the optical simulator, the equalization conditions were determined for each PR class such that the RMS error between a target and read signal became minimum, and then the signal from the optical disc was reproduced. The number of taps in the equalizer was 11.

Figure 44:
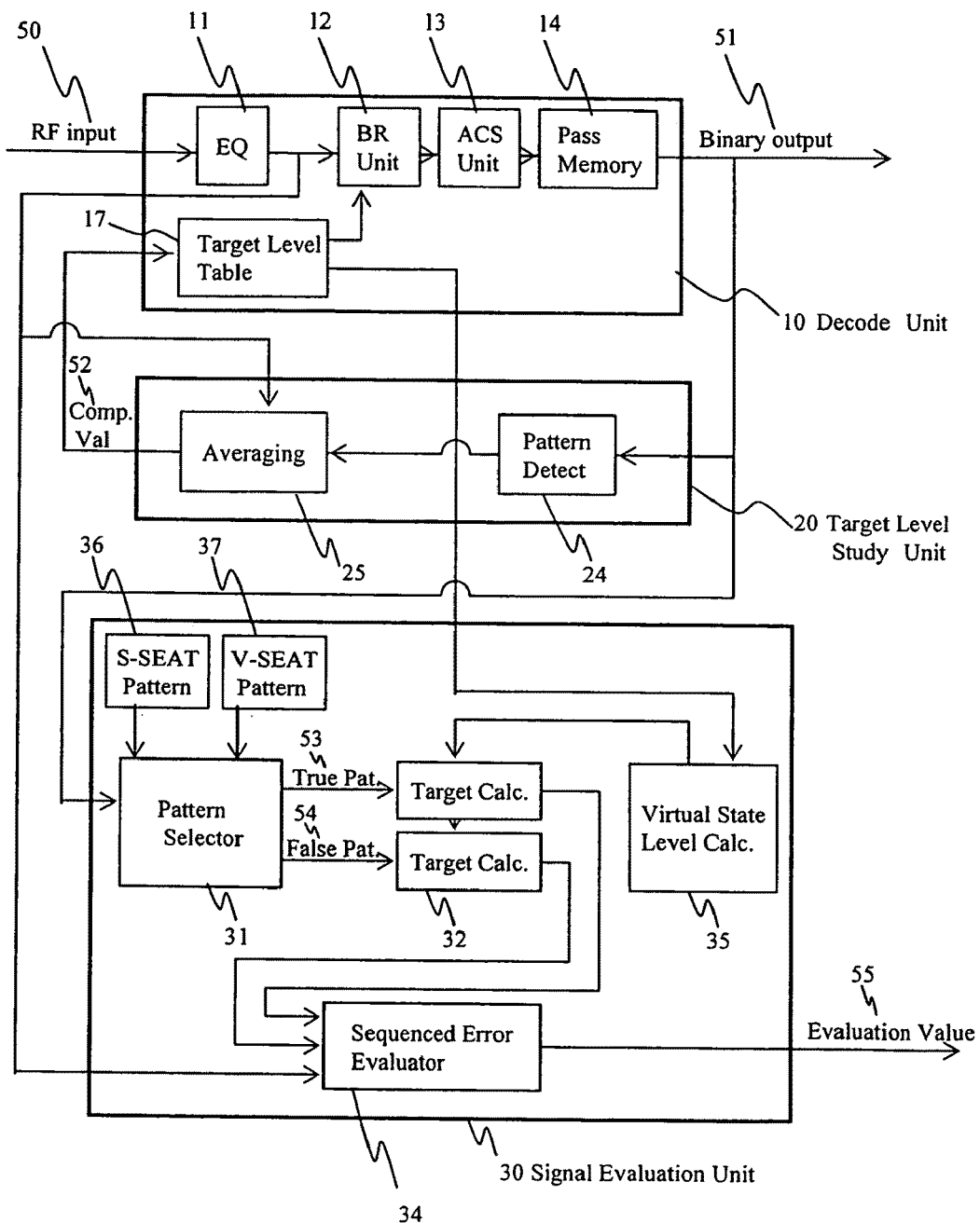
FIG. 44 shows an example of the configuration of the S-SEAT and V-SEAT calculation circuit implemented on the optical disc apparatus of the invention.

FIGS. 44 to 46 show the result of measuring the reproduction performance of the optical disc with respect to each PR class sequence.

Figures 45A, 45B:
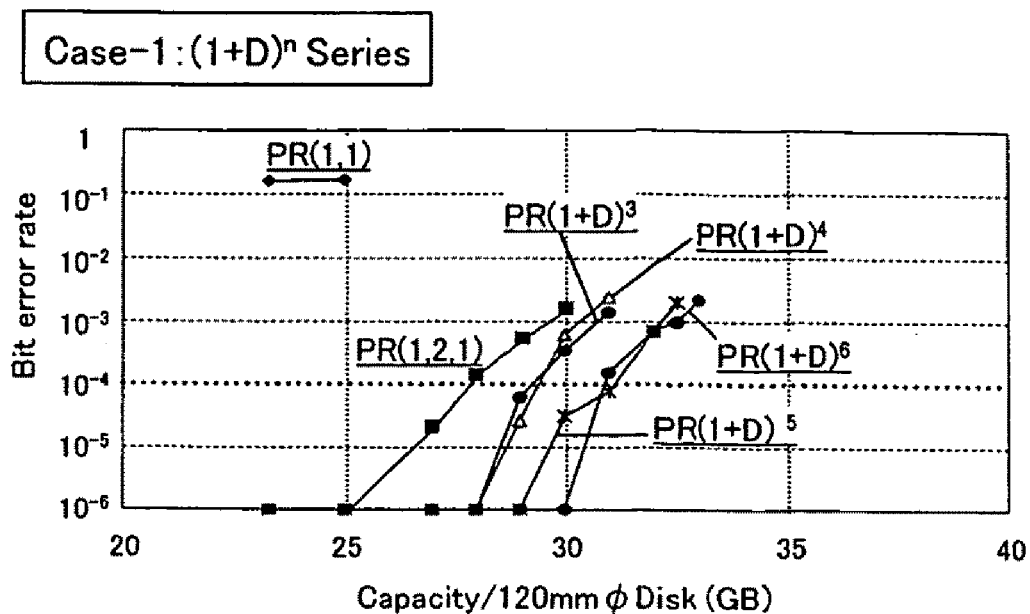
FIG. 45 shows the results of an experiment indicating the relationship between the recording capacity and the bit error rate for a $(1+D)^n$ sequence.

FIG. 45(a) shows the relationship between recoding capacity and bit error rate with respect to the $(1+D)^n$ series. FIG. 45(b) shows a summary of the bit representation of each PR class, the number of valid bit sequences, the number of valid states, the number of independent target levels, and an upper limit of recording capacity. The upper limit of recording capacity corresponds to the bit error rate of $10^{-4}$. When the class bit number (the number of elements included in the PR class representation) is N, the number of the entire bit sequences is $2^N$. The number of valid bit sequences, however, is that for the group of bit sequences from which sequences with the minimum run-lengths of 1T have been removed due to the run-length limit. The number of valid states is similarly determined. In order to realize these, a system with as small a class bit number as possible is desirable because the circuit size is proportional to the number of valid bit sequences. Although higher densities can be achieved in this series as the class bit number increases, performance improvement saturates with the class bit number of 6 or more. The maximum recording capacity was 31 GB with the class bit number 7.

Figures 46A, 46B:
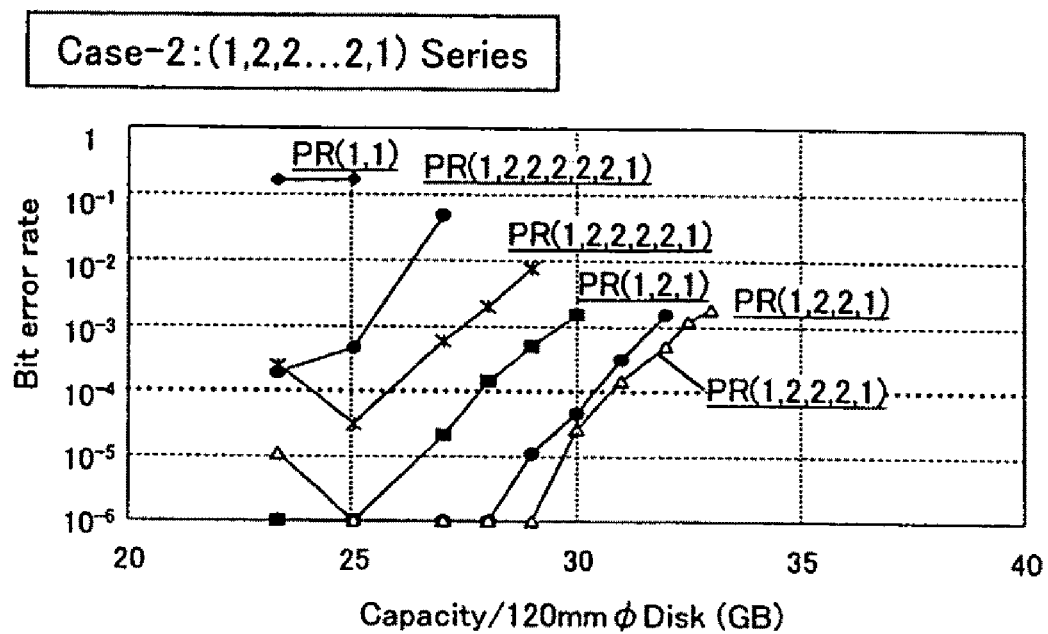
FIG. 46 shows the results of an experiment indicating the relationship between the recording capacity and the bit error rate for a (1,2, ... , 2,1) sequence.

FIG. 46(a) shows the relationship between recording capacity and bit error rate with respect to a (1,2, . . . , 2,1) series. FIG. 46(b) shows the details. In this series, if the class bit number is too large, recording capacity drops. This is believed due to the fact that, although it becomes possible to represent the temporal changes in read signal more precisely with a large class bit number, the number of independent target levels also increases, which reduces the difference between target levels for two different paths, resulting in an increase in error during the selection of a path. In this series, the maximum recording capacity was 31 GB with the class bit number 5.

Figures 47A, 47B:
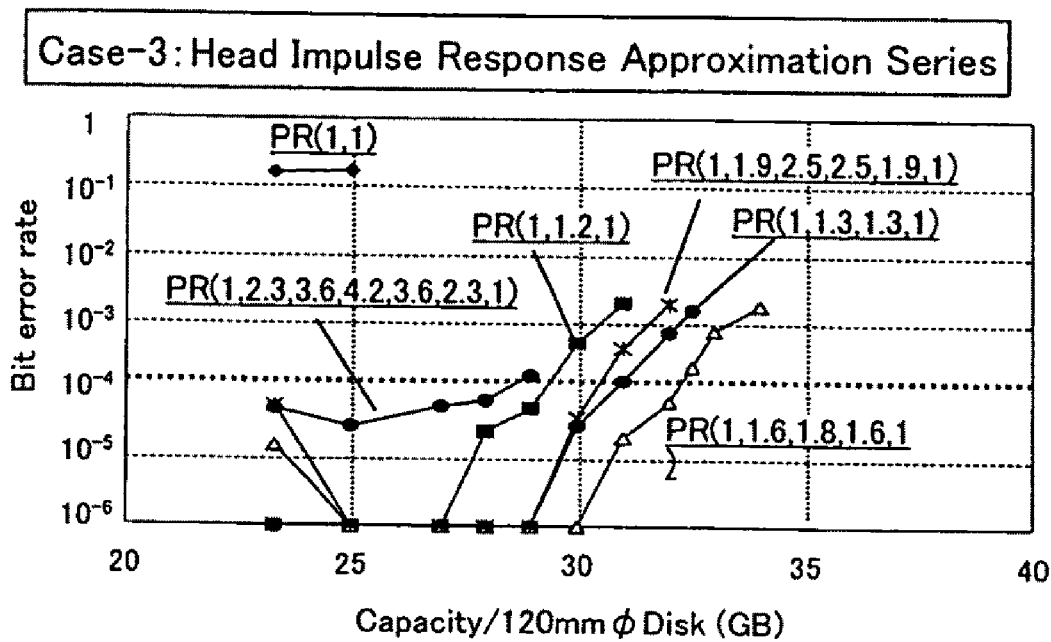
FIG. 47 shows the results of an experiment indicating the relationship between the recording capacity and the bit error rate for an impulse-response approximation sequence.

FIG. 47(a) shows the relationship between recording capacity and bit error rate with respect to an impulse-response approximation series. FIG. 47(b) shows a summary of the details. In this series too, recording capacity drops if the class bit number is too large. The maximum recording capacity was 32 GB with the class bit number 5.

As a result of the analysis of the three kinds of possible PR classes, it was learned that there was a limit to performance improvement that can be achieved by simply increasing the PR class bit number and thereby adopting an increasingly more complicated construction. This is primarily due to the fact that there is non-linear edge shift in the read signal from the optical disc that is caused by the intersymbol interference arising from the optical spot shape and by the thermal interference during recording. In order to cope with these non-linear intersymbol interference and edge shift, the basic PRML method, whereby the target value is determined by a linear convolution computation, is not capable enough. Thus, such non-linear components must be compensated by some means. From the foregoing, it is seen that, in order to achieve ever-higher densities, the following two points are important:
(1) The class bit number should not be increased too much, so as to avoid increasing the number of target levels.
(2) A compensating amount corresponding to a particular bit sequence is added to a target value determined by the convolution computation in order to compensate the target value and to deal with the non-linear components contained in the read signal.

In order to satisfy these points and achieve higher capacities, a PRML method may be employed whereby a target value determined by an NN-bit convolution computation is compensated by an amount corresponding to an N-bit (N>NN) sequence, and, while comparing the thus compensated target value with the read signal, a most feasible bit sequence, i.e., such a bit sequence in the N-bit bit sequences that the error between the read signal and the target value becomes minimum, is binarized.

FIG. 48 shows an example illustrating the basic concept of the above-described information reproduction method. The most basic class PR(1,1) is taken as an example for simplicity's sake. Method 1 is a basic PRML method. As shown in the configuration example, a target value and the read signal corresponding to bit sequences at two sequential times are compared, and a bit sequence with a minimum error is selected. In the illustrated example, the number of target levels is three, and the method is incapable of dealing with the asymmetry and non-linear intersymbol interference in the read signal.

Method 2 is an adaptive PRML method disclosed in Technical Digest of ISOM 2002, 269-271 (2002). A compensation value V corresponding to a 2-bit bit sequence is added to a target value determined by a convolution computation to obtain a new target value, and binarization is performed while selecting such a bit sequence that the error from the read signal becomes minimum. The number of compensation value V is 4 ($=2^2$). While the target value can be adaptively varied depending on the asymmetry of the read signal, the method is not capable of sufficiently eliminating non-linear intersymbol interference.

Method 3 is such that one pattern compensation bit is added in front and behind the PR(1,1) bit sequence, and it will be hereafter referred to as a compensated PRML. Method 3 is characterized in that, in contrast to Method 2, a compensating value V corresponding to a 4-bit bit sequence including a pattern-compensating bit is added to the target value. Binarization is performed while selecting a bit sequence such that the error becomes minimum based on a comparison of a target value and the read signal corresponding to the 4-bit bit sequence. In this method, since the number of target levels that is determined by the convolution computation is not increased and remains 3, and the number of compensating value V is 16 ($=2^4$), the non-linear intersymbol interference can be compensated within the range of the 4-bit bit sequence. In order to distinguish this from the conventional PRML method, the PR class is represented as "compensated-PR(0, 1,1,0)" or "CPR(0,1,1,0)." This is a PRML method with the class bit number 4, where the target value is calculated by a convolution computation of the coefficient sequence (0,1,1,0) and the 4-bit bit sequence, as in the conventional description. However, since each bit at either end has a zero coefficient, the target value would be identical to a target value determined by a 2-bit coefficient sequence (1,1). Further, the coefficient "0" at the start and end represent a pattern compensation bit, and CPR means that a compensation value V determined from the 4-bit bit sequence is added to the target value. If the conventional Method 1 is represented by a similar technique, it would be PR(1,1), and Method 2 would be described as CPR(1,1).

The experiment results shown in the figure are those obtained by recording the aforementioned optical disc with the detection window width Tw=57 nm (storage capacity: 32.5 GB), and reproducing by each method. The basic PR class was PR(1,2,2,1) and the data transfer rate was 100 Mbps. The bit error rate was $50\times10^{-4}$ for Method 1 (PR(1,2, 2,1)), $15\times10^{-4}$ for Method 2 (CPR(1,2,2,1)), and $0.05\times10^{-4}$ for Method 3 (CPR(0,1,2,2,1,0)). It was confirmed that the bit error rate can be reduced to 1/100 or less by Method 3. The eye pattern of read signal indicates an effective signal (compensated read signal) for each method, and it is seen that the eyes are clearly open in the case of Method 3. The S/N ratio of the 2Tw signal contained in the compensated read signal was 3.6 dB for Method 1, 6.1 dB for method 2, and 9.5 dB for the present method.

Figures 49A, 49B:
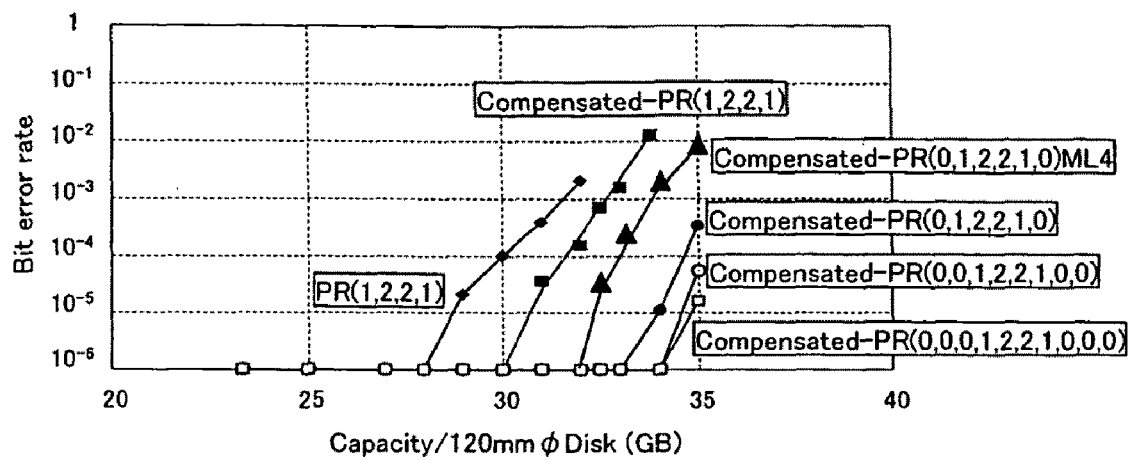
FIG. 49 shows the results of an experiment indicating the difference in the performance for achieving larger storage capacities between the compensated PRML method and another PRML method.

FIG. 49(a) shows the experimental results illustrating the difference in the degree of achievement of higher capacities between the compensated PRML method and other PRML methods. As the basic PR class, PR(12,2,1) was selected. When the tolerance value of bit error rate is $10^{-4}$, an upper limit of recording capacity can be determined. The upper limit of recording capacity in conventional methods is 30 GB for PR(1,2,2,1) and 32 GB for CPR(1,2,2,1). The upper limit of the recording capacity of the compensated PRML method is 32.5 GB for CPR(0,1,2,2,1,0)ML4, 34.5 GB for CPR(0,1, 2,2,1,0), and 35 GB or more for CPR(0,0,1,2,2,1,0,0) and CPR(0,0,0,1,2,2,1,0,0,0). CPR(0,1,2,2,1,0)ML4 indicates a method whereby only the compensating value is defined by 6 bits and the number of bits for carrying out a maximum likelihood decoding for the selection of a most feasible bit sequence ("ML bit number") remains 4. Although this is superior to the conventional techniques, since the maximum likelihood process is carried out without including a pattern compensation bit, the performance for suppressing non-linear shift decreases. In order to draw the maximum performance out of the compensated PRML method, it is important that the maximum likelihood process includes a pattern compensation bit. The results obtained indicate that the basic PR class is capable of increasing the recording capacity as compared with not only PR(1,2,2,1) but also the various PR classes described above.

FIG. 49(b) shows a summary of the number of bit sequences, the number of states, the number of levels, the number of the pattern compensating bits, and the number of ML bits, for each of the methods shown in FIG. 49(a). Since the size of the circuit for implementing the PRML method is roughly proportional to the number of bit sequences, it would require a more than ten times larger circuit size for realizing CPR(0,0,0,1,2,2,1,0,0,0), in which pattern compensating bits are added, three at the beginning and three at the end, than that for PR(1,2,2,1). Thus, it is important to strike an appropriate balance between performance and circuit size.

In the foregoing, the method has been described in which PR(1,2,2,1) was selected as the basic PR class and the same number of pattern compensating bits were added at the beginning and at the end. The invention, however, is not limited to this example. For example, any basic PR class may be selected as the basic PR class, such as PR(1,1), PR(1,2,1), PR(3,4,4,3), PR(1,1,1,1), and PR(1,2,2,2,1). Also, the number of pattern compensating bit is not limited to be symmetric between those at the beginning and those at the end, and an asymmetric bit number may be added, such as CPR(0,1,2,2, 1), CPR(0,0,1,2,2,1), CPR(1,2,2,1,0), and CPR(1,2,2,1,0,0), for example. In particular, in cases where a signal is to be reproduced when it is physically clear that the influence of thermal interference during recording is concentrated at the leading edge, for example, it might be best to add a pattern compensating bit only at the front.

Figure 42:
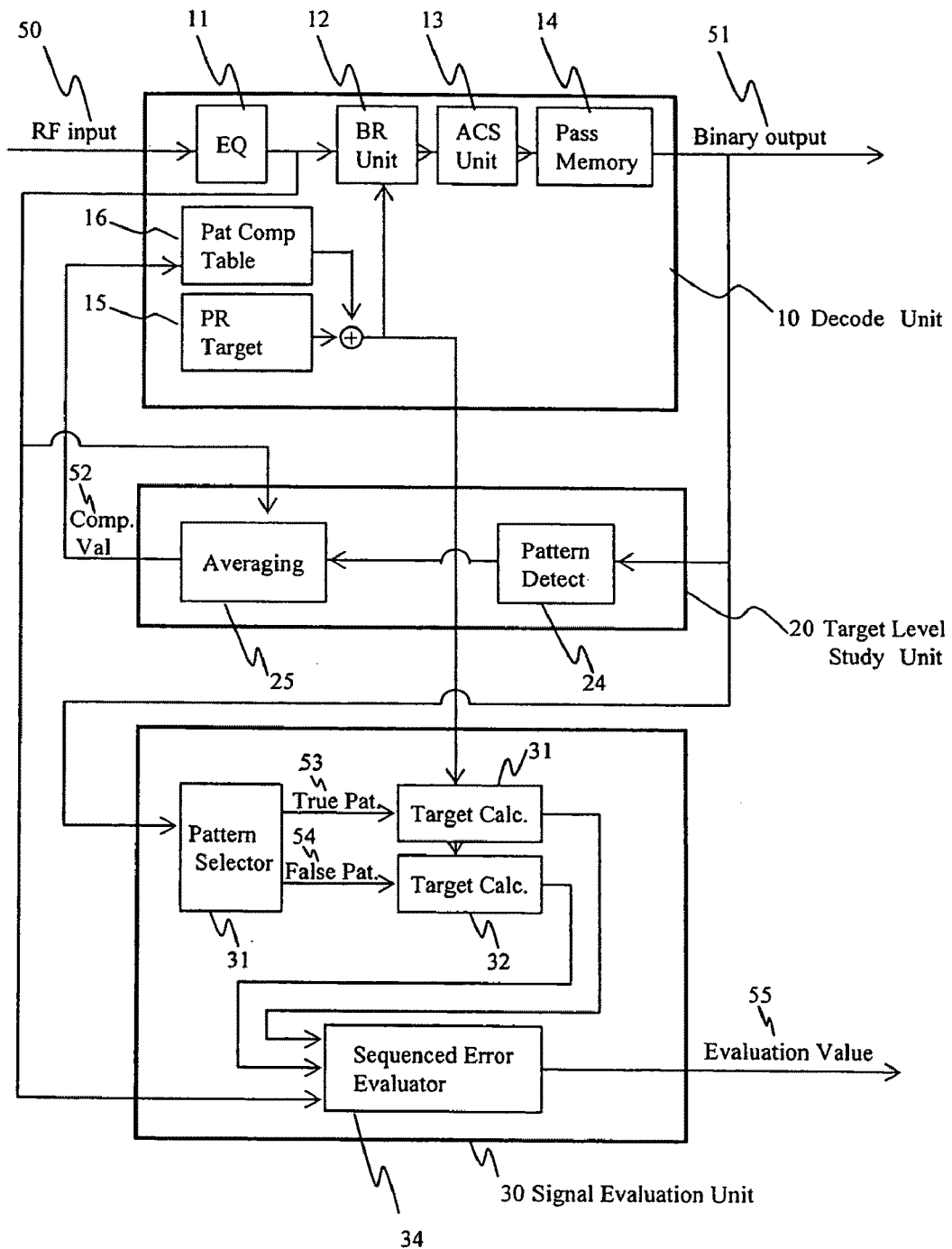
FIG. 42 shows another example of the configuration of the S-SEAT calculation circuit implemented on the optical disc apparatus of the invention.

FIG. 42 shows another configuration of the S-SEAT calculation circuit mounted on the optical disc apparatus of the invention. This configuration is adapted to compensated PRML.

A decoding unit 10 consists of a waveform equalizer 11, a branch metric calculation unit 12, an ACS unit 13, a path memory 14, a PR target table 15, and a pattern compensation table 16. After a read signal 50, which is converted into a digital value in advance by an AD converter, is equalized by an FIR filter in the waveform equalizer 11, the square of an error from a target value ("branch metric value") is calculated for each bit sequence in the branch metric calculation unit 12. For the target value, an initial target value for a particular bit sequence is obtained by referring to the PR target table 15 and is added to a compensation value corresponding to the bit sequence that is obtained by referring to the pattern compensation table 16. The operation of the ACS unit 13 and that of the path memory 14 are as described above. The essence of the present embodiment lies in adding a compensation value to a target value to create a new target value and the most feasible result is binarized with reference to the new target value.

The target level studying unit 20 consists of a target level calculation unit 21 and an error calculation/averaging unit 22. The target level calculation unit 21 receives the binarization result 51 as an input, refers to the PR target table 15 for an initial target value corresponding to a particular bit sequence, refers to the pattern compensation table 16 for a compensation value corresponding to the bit sequence, and adds the both values to obtain a target signal level that it then outputs. The error calculation/averaging unit 22 calculates the difference between the output of the waveform equalizer 11 and that of the target level calculation unit 21, averages the amount of error for each bit sequence, and updates the values in the pattern compensation table 16.

Regarding the calculation of S-SEAT, the PR target table 15 is referred for an initial target value corresponding to a particular bit sequence and the pattern compensation table 16 is referred for a compensation value corresponding to the bit sequence. The both values are then added to obtain a target signal level, with reference which the target level calculation units 31 and 32 can be operated. The S-SEAT value can be calculated as described above.

The PRM method with a variable target level, including the compensated PRML method, is capable of decoding in a manner adapted to the read signal, so that reproduction performance can be improved. However, if the optical spot is distorted due to a tangential tilt or if there is a distortion in the I-V amplifier for read signal, such as group delay, reproduction is affected by such distortion. This could possibly lead to a deterioration in read signal quality when playing back on an optical disc apparatus on which a different PRML method with a fixed target level is implemented. Thus, the PRM method with a variable target level cannot ensure reproduction compatibility. To overcome this problem, it is necessary not to allow the target level to track elements that would adversely affect reproduction compatibility, rather than causing the target level for each and every bit sequence to be varied in accordance with the read signal. One way to realize this is to measure the amount of asymmetry in the read signal and to refer to a target level table that is prepared in advance in accordance with the asymmetry amount. Another way is to make identical the values of the target levels for a set of bit sequences that are symmetric with respect to time reversal. Since both of the typical examples of distortion in read signal distort the read signal asymmetrically with respect to the time direction, the target signal level for a bit sequence "1000" and that for a bit sequence "0001", for example, would be different. Thus, by averaging these target signal levels corresponding to the bit sequences that are symmetrical with respect to time reversal to thereby obtain an identical value, reproduction compatibility can be improved without causing the target signal level to track the distortion in the read signal in the time direction. A PRML method to which these limitations are incorporated will be hereafter referred to as a target level restricted PRML method.

Figure 43:
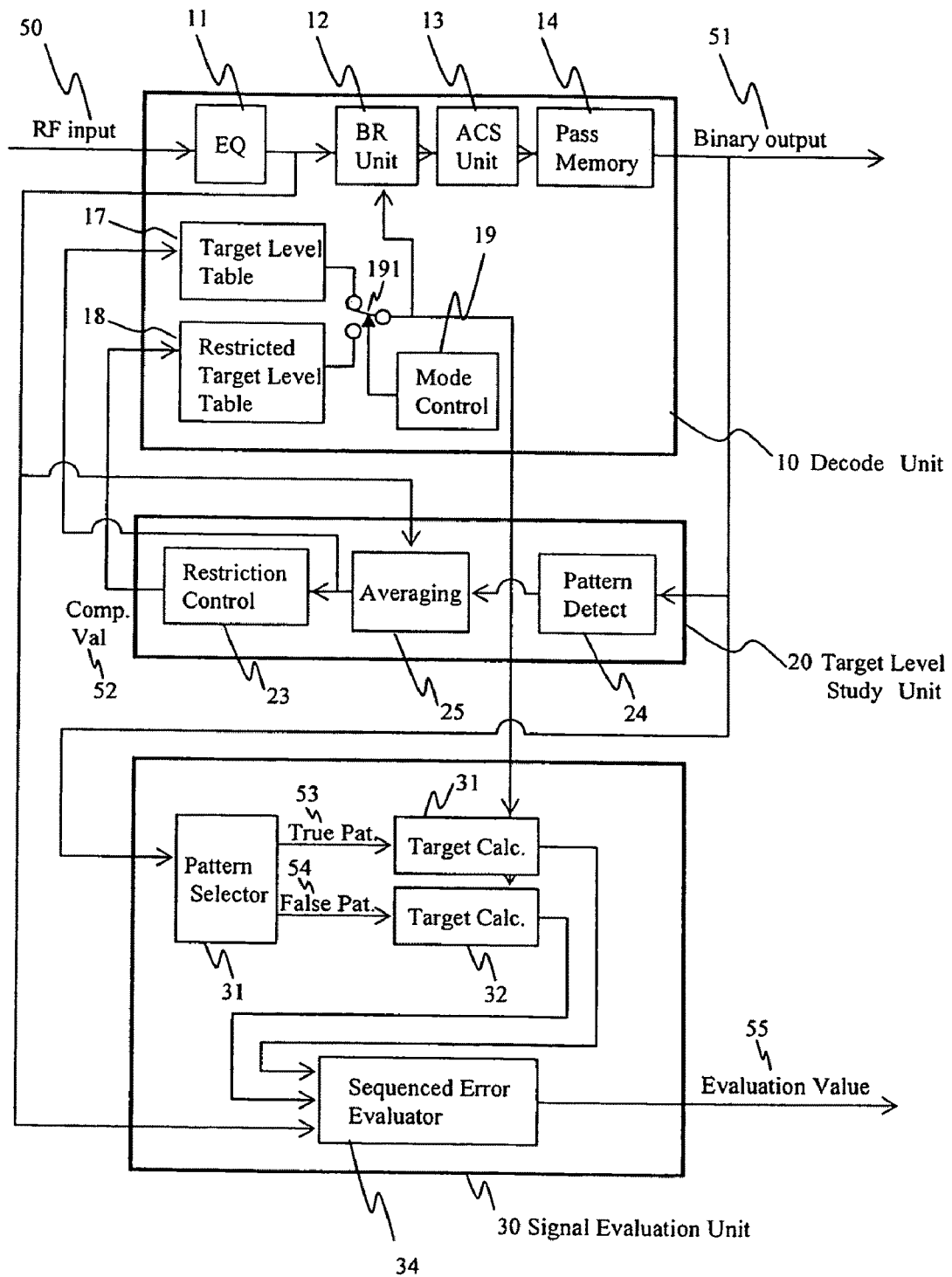
FIG. 43 shows another example of the configuration of the S-SEAT calculation circuit implemented on the optical disc apparatus of the invention.

FIG. 43 shows another configuration of the S-SEAT calculation circuit mounted on the optical disc apparatus of the invention, which corresponds to the target level restricted PRML.

A decoding unit 10 consists of a waveform equalizer 11, a branch metric calculation unit 12, an ACS unit 13, a path memory 14, a target level table 17, a restricted target level table 18, a mode control unit 19, and a switch 191. After a read signal 50, which is converted into a digital value by an AD converter in advance, is equalized by an FIR filter in the waveform equalizer 11, a branch metric value is calculated in the branch metric calculation unit 12 for each bit sequence. As the target value, a value in either the target level table 17 or the restricted target level table 18 is used. The target level table 17 changes in accordance with the read signal, as mentioned above, and the values in the restricted target level table 18 are the averages such that the target levels for a set of bit sequences that are symmetric with respect to time reversal have the same value. The mode control unit 19 controls the operation of the switch 191 to control which target level is to be used. For example, at the time of studying of a focus offset, a trial write for the studying of recording conditions, or verification for the confirmation of read signal quality, a value in the restricted target level table 18 is used. In case an error occurs during data reproduction, a value in the target level table 17 is used. During normal data reproduction, either target level may be used. This target signal level selecting operation performed by the mode control unit 19 allows for improvement in reproduction compatibility and in studying accuracy.

The target level studying unit 20 consists of a pattern detector 24, an averaging unit 25, and a restriction control unit 23. The operation of the pattern detection unit 24 and that of the averaging unit 25, as well as the updating procedure for the target level table 17 are as described above. The restriction control unit 23 receives the output of the averaging unit 25, performs an averaging process such that the target levels for a set of bit sequences that are symmetrical with respect to time reversal have the same value, and stores the result in the restricted target level table 18.

Regarding the calculation of S-SEAT, as the value of the target level corresponding to a particular bit sequence, a value in either the target level table 17 or the restricted target level table 18 is used in accordance with a decision in the mode control unit 19, and the target level calculation units 31 and 32 are operated in accordance with the target level value. The method of calculating the value is as described above.

In the present example, a particular table has been described to be selected by the mode control unit 19 and the switch 191 for facilitating the understanding of the invention. The target level table 17 and the restricted target level table 18 have the same hardware configuration and they differ only in the values of the target levels stored therein. Thus, in order to simplify the circuit configuration, only the target level table 17 may be implemented and the individual values may be backed up in an S-RAM or D-RAM, so that, under the control of a CPU not shown, either value can be loaded to the target level table 17 as needed. In this way, the mode control unit 19 and the switch 191 can be dispensed with, thereby decreasing the size of the circuit.

The circuit configuration of the invention has thus been described. While the examples shown in FIGS. 41 to 43 show the configuration of the S-SEAT calculation circuit, they can be adapted to V-SEAT by adding the virtual target level calculation unit 35 shown in FIG. 40 and modifying the selection pattern in the pattern selection unit 31 for V-SEAT.

Finally, the configuration of a circuit with a function for calculating both S-SEAT and V-SEAT with a single circuit will be described.

FIG. 44 shows the configuration of a S-SEAT and V-SEAT calculation circuit mounted on the optical disc apparatus of the invention. It differs from the circuit shown in FIG. 40 in a signal evaluation unit 30.

The signal evaluation unit 30 consists of a pattern selection unit 31, a target level calculation units 32 and 33, a sequence error evaluation unit 34, a virtual target level calculation unit 35, a S-SEAT pattern table 36, and a V-SEAT pattern table 37. The pattern selection unit 31, in accordance with an instruction from CPU not shown, switches the calculation function between S-SEAT and V-SEAT. Specifically, when calculating S-SEAT, the S-SEAT pattern table 36 in which S-SEAT bit patterns are stored is referred to in order to select a pattern and output a "True" pattern 53 and a "False" pattern 54. When calculating V-SEAT, the V-SEAT pattern table 37 is referred to in order to select a pattern and output a "True" pattern 53 and a "False" pattern 54. Once the "True" pattern 53 and "False" pattern 54 are outputted, the subsequence calculation processes are the same as described above where there is no difference between S-SEAT and V-SEAT. To briefly note the influence of the virtual target level calculation unit 35 during the calculation of S-SEAT, since the S-SEAT pattern satisfies the run-length limit, a target signal level for a bit sequence in the virtual target level calculation unit 35 from which the run-length limit has been removed is not referred to, so that there is no influence of such a target signal level. The target signal levels satisfying the run-length limit are identical in the case of both S-SEAT and V-SEAT. Therefore, in the present configuration, the virtual target level calculation unit 35 does not have any adverse effect during the calculation of S-SEAT, so that S-SEAT and V-SEAT to be correctly calculated.

In the present embodiment, the configuration of a circuit for calculating S-SEAT and V-SEAT adapted to the PRML decoder with a fixed target level has been described. The same configuration can be adapted to a PRML decode with a variable target level by modifying the signal evaluation unit 30 for that in the present embodiment by referring to the configuration shown in FIGS. 41 to 43.

Embodiment 3

Cases where Branch Metric Calculation is Carried Out Using Absolute Values

As mentioned above, in a Viterbi decoder, in order to obtain a most feasible binarization result, a branch metric value is used that is obtained by adding up the square of the difference between read signal and target signal. Such a Viterbi decoder will be hereafter referred to as the squared system. The squared value $\Delta^2$ of the difference between read signal and target level is as follows:

$$\Delta^2 = (V_{signal}[t] - V_{target}[n])^2 \quad \text{(Eq. A-1)}$$
$$= (V_{signal}[t])^2 - 2V_{signal}[t]V_{target}[n] + (V_{target}[n])^2$$

where $V_{signal}[t]$ is the level of read signal at time t, and $V_{target}[n]$ is a target signal level corresponding to a bit sequence n. In the Viterbi decoder, binarization is carried out such that the $\Delta^2$ accumulated value becomes minimum. The first term on the right hand side indicates the level of read signal, which is common to all bit sequences and therefore does not need to be calculated. In the case of a Viterbi decoder with a fixed target signal level, the following may be calculated:

$$\Delta^2 = A[n]V_{signal}[t] + B[n] \quad \text{(Eq. A-2)}$$

where $A[n] = -2V_{target}[n]$ and $B[n] = (V_{target}[n])^2$ are constants. In cases where the value of A[n] is 1, 2, or 4, for example, bit shift can be utilized instead of accumulation. Thus, in many cases, the amount of computation in Eq. A-2, namely, the circuit size, can be significantly reduced as compared with Eq. A-1.

On the other hand, in the case of a Viterbi decoder with a variable target level, since the target level is a variable, simplification is possible only as far as:

$$\Delta^2 = -2V_{signal}[t]V_{target}[n] + (V_{target}[n])^2 \quad \text{(Eq. A-3)}$$

Further, since $V_{target}[n]$ is a variable, circuit simplification is difficult to accomplish by replacing accumulation with a bit shift. Thus, in the case of variable target-level Viterbi decoders, the circuit size inevitably increases.

In order to achieve simplification in this case, however, it is effective to use the absolute value, rather than the square value, of the difference between read signal and target level as the branch metric value. In this case, $|\Delta|$ is used in Viterbi decoding, thus:

$$|\Delta| = |V_{signal}[t] - V_{target}[n]| \quad \text{(Eq. A-4)}$$

In this case, as compared with Eq. A-3, accumulation can be eliminated, so that the number of bits in the computing unit can be small, thereby achieving reductions in the circuit size and power consumption.

The following describes in a summarized manner the method of calculating S-SEAT and V-SEAT for the absolute-system Viterbi decoder.

As the detection pattern, an identical pattern can be used for both the absolute value system and the square value system.

For the calculation of S-SEAT, the Euclidean distance may be re-defined in the absolute value system, as follows.

When the Euclidean distance between two bit patterns "pat1" and "pat2" is $ED_B(pat1, pat2)$, it can be represented in accordance with the definition by the following equation:

$$ED_B(pat1, pat2) = \sum_{n=1}^{N} |V_{target}[pat1[n]] - V_{target}[pat2[n]]| \quad \text{(Eq. D-13)}$$

which is identical to the aforementioned Eq. D-7, where $V_{target}[B]$ is the target signal level for bit sequence B, pat[n] is the bit sequence of bit pattern "pat" at time n, and N is the class bit number.

The average minimum Euclidean distance is defined in terms of an average value of the Euclidean distance with respect to a 1-bit error pattern, as follows:

$$d_{min} = \text{Average}(ED_{min}) \quad \text{(Eq. D-14)}$$
$$= \frac{\sum_{m=1}^{M} ED_B(Pat_T[m], Pat_F[m])}{M}$$

which is identical to Eq. D-2, where M is the total number of combinations of 1-bit error patterns, and $Pat_T$ and $Pat_F$ indicate a correct bit pattern and an error bit pattern, respectively.

The Euclidean distance ED(pat) between read signal and a designated bit pattern "pat" is expressed by the following equation:

$$ED(pat) = \sum_{n=1}^{N} |V_{signal}[t+n] - V_{target}[pat[n]]| \quad \text{(Eq. D-15)}$$

where $V_{signal}[t]$ is the read signal level at time t, and the binarization result at time t is a bit pattern "pat."

The value σ of S-SEAT is determined as follows:

$$D = \text{Sign(Shift-Direction)} \times \qquad \text{(Eq. D-16)}$$
$$\{(ED(Pat_F[m]) - ED(Pat_T[m])) - d_{min}\}$$

$$\text{Sign(Shift-Direction)} = -1 \text{ (Right} - \text{Edge} - \text{Shift)} \qquad \text{(Eq. D-17)}$$
$$+ 1 \text{ (Left} - \text{Edge} - \text{Shift)}$$

$$\sigma = \frac{\sqrt{\frac{\sum_{p=1}^{P}(D[p])^2}{P}}}{2d_{min}} \qquad \text{(Eq. D-18)}$$

which are identical to Eq. D-4 to Eq. D6, where Sign(Shift-Direction) indicates the direction of edge shift in the case where the binarization result $Pat_T$ becomes $Pat_F$ due to a 1-bit error (edge shift), and P is the number of bit patterns in a designated calculation period.

Since the definitional equation for V-SEAT is identical to that for S-SEAT, V-SEAT can be calculated using Eq. D-13 to Eq. D-18. The detection pattern is the same as that shown in the square system.

As mentioned above, the S-SEAT value and V-SEAT value can be expanded in accordance with Eq. D-8 to Eq. D-12.

An actual example of the absolute-value system Viterbi decoder will be described with reference to the following Embodiment.

Embodiment 4

Experimental Results

Initially, the result of an experiment involving a DVD-RAM disc will be described as an example of application to the RLL(2,10) code.

FIG. 51 shows the results of actual measurement of MLSE, S-SEAT, and V-SEAT when playing back a DVD-RAM disc using the PR(3,4,4,3) class. The disc was a commercially available 2×-speed DVD-RAM medium. The evaluation equipment was LM330A manufactured by ShibaSoku Co., Ltd., with a laser wavelength of 658 nm and a numerical aperture of 0.60. Regarding the read circuitry, the equalizer employed the standard DVD-RAM equalization conditions (a 3-tap FIR filter and a sixth-order Bessel low-pass filter). The amount of boost was 5.5 dB. Overwrite was conducted on a groove track 10 times with a write power of 10.3 mW and an erasure power of 4.7 mW, and then read signal quality was evaluated in each method. The jitter value was 8.5%. Each evaluation value had a Gaussian distribution, as shown in the figure, where the horizontal axis has a detection window width of ±Tw/2. From the definitions of these evaluation values, an edge event that exceeds the ±Tw/2 range leads to a reproduction error, and such an event can be handled in the same manner as a jitter value. The evaluation values were: MLSE=11.0%; S-SEAT=11.0%; and V-SEAT=12.5%. The distribution of MLSE is offset from the center towards the left mainly because the magnitude of 3T signals in the read signal is smaller than the target signal level for the PR(3,4,4,3)ML class.

FIG. 60 shows the results obtained when an automatic equalizer consisting of a 5-tap FIR filter was operated during the foregoing measurement. The jitter value of the read signal deteriorated to 13.2% as a result of the automatic equalization to approach the target signal for the PR(3,4,4,3)ML class. As shown, the actual measurement results of MLSE, S-SEAT, and V-SEAT are smaller than those in the foregoing case where no automatic equalization was carried out, thus showing an improvement.

FIG. 61 shows the results of playing back using the PR(a,b,c,d)ML class in the same measurement. The automatic equalizer was not used. For the calculation of the MLSE value, the PR(3,4,4,3) with a fixed target level was used as the target signal. A further improvement was seen in the S-SEAT value, resulting in 7.3%, which is a small value. While the V-SEAT value is larger than that in the case of using the fixed-PR(3,4,4,3)ML class shown in FIG. 51, this is because, as mentioned above, V-SEAT is calculated twice for each edge.

FIG. 62 shows the results of playing back using a PR(a,b,c,d)ML class of the absolute-value system in the same measurement. The automatic equalizer was not operated. Since the MLSE value is not defined with respect to the PRML channel of the absolute-value system, an S-SEAT value with no sign is shown instead. The S-SEAT value without signs is identically shown by the definitional equation (Eq. D-5) as follows:

$$\text{Sign(Shift-Direction)}=1$$

The S-SEAT value without signs has the same definition as MLSE with respect to a fixed target class of the square system. The distribution of the S-SEAT value without signs is present to the left of the zero point, which is a characteristic of the absolute-value system, as mentioned above. Although such a distribution can be proved to explicitly arise from the definition for the calculation of a branch metric value, a detailed discussion is omitted herein as it would divert from the subject matter of the invention. While the S-SEAT value and the V-SEAT value are distributed to the left and right across the zero point, this is due to the fact that, because of the signs is the definitional equation (Eq. D-5), the case where an edge is shifted to the right is mapped to the right of the zero point. This is another proof that the S-SEAT and V-SEAT in accordance with the invention can also handle PRML channels of the absolute-value system.

FIG. 63 shows changes in the V-SEAT value in the same measurement depending on differences in handling of the edge portion. The PR(a,b,c,d)ML class was used for reproduction, without operating the automatic equalizer. As mentioned above, since the V-SEAT evaluation index implements a virtual state, an evaluation value is calculated for the left and right shifts for all of the edges. As mentioned above, there are four ways of handling the results of measurement of the edge-shift evaluation value, as shown in the figure. Regarding the magnitude of the value, the RMS value decreases in the order of "selection of a large value">"selection of all values">"selection of average value">"selection of a small value," thus indicating a natural result. If the evaluation value of edge shift in the invention is used as the result of phase comparison in a PLL (Phase Locked Loop) circuit, for example, preferably an average value is selected. If the normal evaluation value of edge shift is used, the instruction voltage to the VCO (Voltage Controlled Oscillator) tends to fluctuate (in frequency up/down directions) in cases of poor S/N or where the signal amplitude of a minimum run-length is small. On the other hand, by using the edge-shift evaluation value based on V-SEAT, the balance of shifts to the left and right is focused even in the above case, so that the instruction voltage to the VCO stabilizes and a desirable clock signal can be obtained. Such a PLL circuit may also be used in an optical disc apparatus that will be described later.

FIG. 64 shows changes in the V-SEAT value in the same measurement depending on the difference in handling of the edge portion. The PR(a,b,c,d)ML class of the absolute-value system was used for reproduction without operating the automatic equalizer. Although the tendency is the same as in the foregoing results, there is a difference in that the RMS value is minimum when an average value is selected as the edge shift evaluation value. This can be accounted for by the characteristic of the PRML channel of the absolute-value system, as mentioned above, that the branch metric value can only be less than the Euclidean distance and so the unsigned-SEAT value is distributed to the left of the zero point. Because of this characteristic, the distribution of the S-SEAT value becomes horizontally symmetrical with respect to the zero-point center, so that the average of the evaluation values of edge shifts in the left and right directions becomes smaller than the minimum value of each.

FIG. 52 shows the results of evaluating the edge shift amounts of patterns in the aforementioned measurement classified by the relationship between front and following spaces and marks, in terms of MLSE, S-SEAT, and V-SEAT. In the figure, SFP(s,m) indicates a front edge shift, s is the length of a preceding space, and m is the length of a particular mark. Similarly, ELP(s,m) indicates a rear edge shift, s is the length of a following space, and m is the length of a particular mark. In the following, these definitions are used with reference to edge shift. As pointed out earlier, regarding MLSE and S-SEAT under the constraint of the run-length limit, the front edge shift SFP(3,3) and the rear edge shift ELP(3,3) cannot be evaluated. On the other hand, it is shown that these edge shifts can be evaluated in V-SEAT, in which a virtual state is implemented. It is also noted that, in V-SEAT, the hatched portions in the figure that do not include the minimum run-length (=3Tw) assume the same values as those for S-SEAT because of absence of consideration of the virtual state. Thus, it has been shown that the shift amount of each edge pattern can be evaluated using S-SEAT or V-SEAT. When recording, a test write for setting pulse parameters consisting of the width of write pulse or edge positions can be carried out such that the aforementioned amounts become as close to zero as possible, a recording condition suitable for PRML can be obtained. Similarly, upon reproduction, a test read for setting reproduction equalization conditions or the focus offset amount can be implemented such that these amounts become as close to zero as possible, a read condition suitable for PRML can be obtained.

Figure 53:
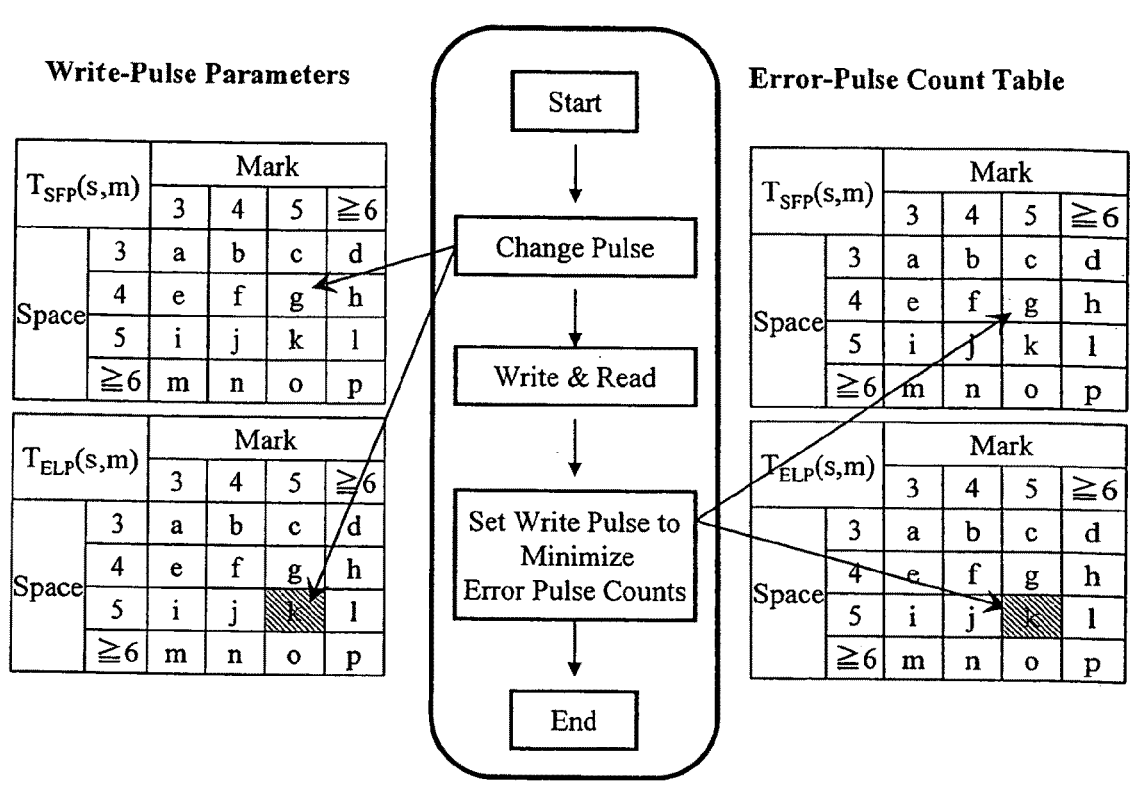
FIG. 53 shows the flow of a test write for optimizing the write pulse conditions.
Figure 54A:
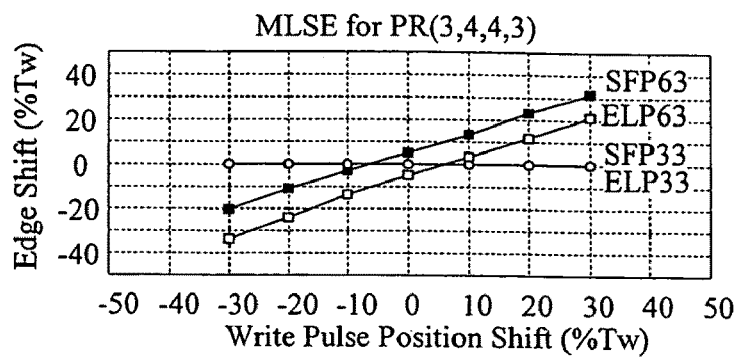
FIG. 54 shows the results of an experiment measuring the relationship between the write pulse position, the shift amount, and each evaluation value in an example of a test write using S-SEAT or V-SEAT of the invention.
Figure 54B:
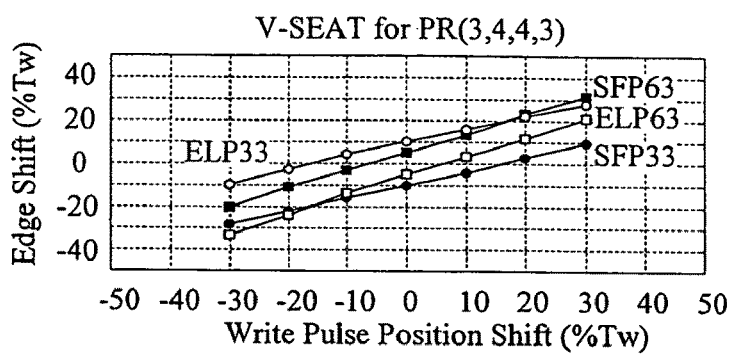
Figure 54C:
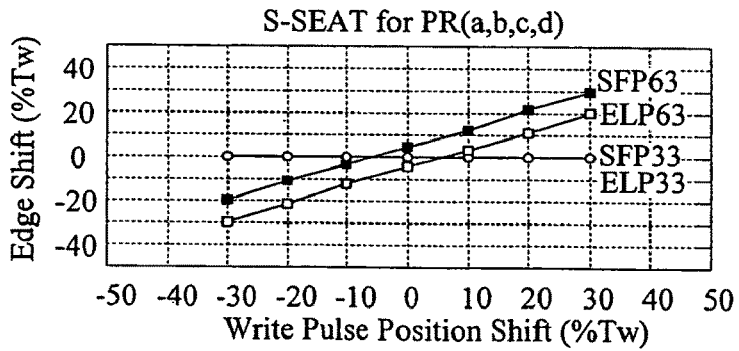
Figure 54D:
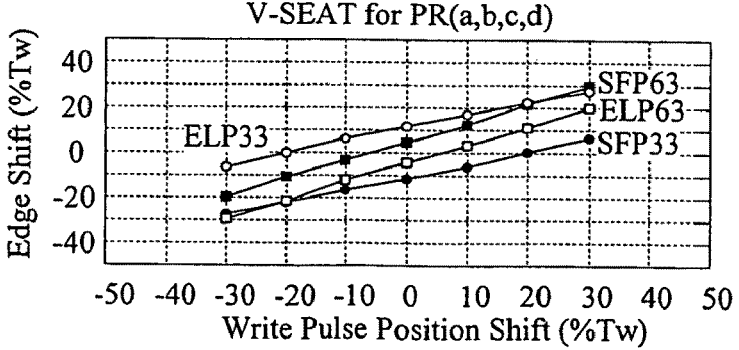

FIG. 53 schematically shows the flow of a test write for correcting the write pulse conditions. In DVD-RAMs, write-pulse parameters are defined in a 4×4 table for the front edge and the rear edge. The aforementioned SFP(s,m), and ELP(s,m) correspond to the write-pulse parameters. For the edge patterns in the 4×4 table, the shift amounts can be evaluated using the S-SEAT or V-SEAT according to the invention. In a simple sequence, an optical disc medium is recorded by changing the write pulse conditions, a relevant sector is read, the corresponding S-SEAT or V-SEAT value is evaluated, and the write pulse parameters are determined such that the S-SEAT or V-SEAT value approaches as close to zero as possible. As is apparent from this example, since the write pulse parameters and their evaluation value, namely, the S-SEAT or V-SEAT value, correspond with one another on a one-on-one basis, the test write time can be reduced by performing writing/reading while changing a plurality of write pulse parameters at once and thereby optimizing the multiple write pulse parameters simultaneously in a parallel manner. Specifically, while it takes approximately 30 seconds to 1 minute for a 2× speed drive unit if the write pulse parameters are determined sequentially from one end, it would take approximately 1 second to complete the test write if the parallel processing in accordance with the invention is performed. In the case of a test write using S-SEAT, since SFP(3,3) and ELP(3,3) cannot be measured, the write pulse parameter corresponding to these may be such that SFP(3,3)=SFP(3,4), for example. This technique, however, is only an approximation, and it is desirable to use V-SEAT whereby SFP(3,3) and ELP(3,3) can be directly measured.

FIG. 54 shows the results of an experiment measuring the relationship between the shift amount in a write pulse position and each evaluation value, in an example of a test write using S-SEAT or V-SEAT in accordance with the invention. In this experiment, the start position of a write pulse for a 3Tw mark in a DVD-RAM was shifted without changing the width of the pulse. FIGS. 54(a), 54(b), 54(c), and 54(d) show MLSE and V-SEAT using the PR(3,4,4,3) class, and S-SEAT and V-SEAT using the PR(a,b,c,d) class, respectively. The figure shows only SPF(3,3), SPF(6,3), ELP(3,3), and ELP(6,3). Although not shown in the above example, V-SEAT can also be applied to the PR(3,4,4,3) class with a fixed target level, as shown in FIG. 54(b). As shown, a linear relationship holds between the positional shift in the write pulse and each evaluation value, and the write pulse parameters can be easily optimized by making the linear relationship as close to zero as possible. However, with regard to MLSE and S-SEAT, SPF (3,3) and ELP(3,3) cannot be evaluated, as mentioned above.

Figure 55A:
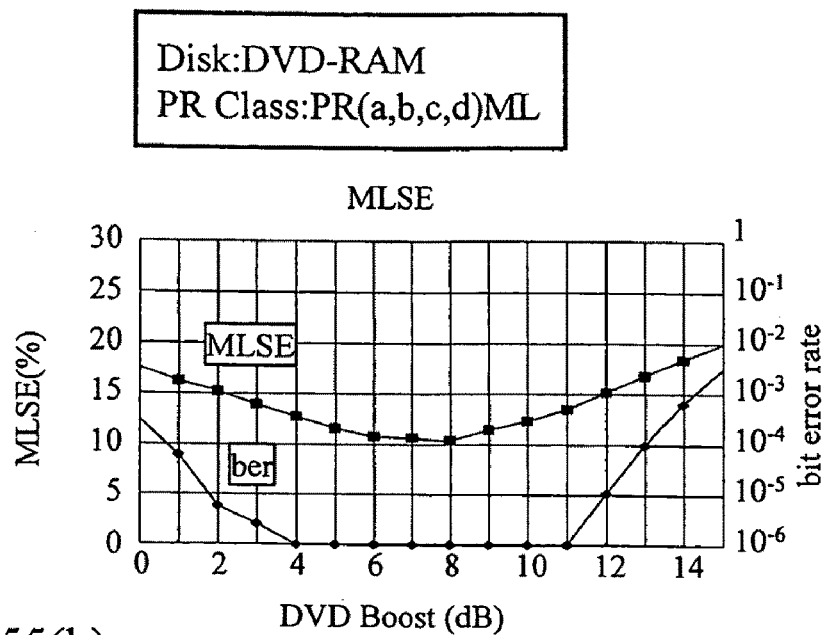
FIG. 55 shows the results of an experiment measuring the relationship between the equalization boost amount, the bit error rate, and each evaluation value in an example of a test write using S-SEAT or V-SEAT of the invention.
Figure 55B:
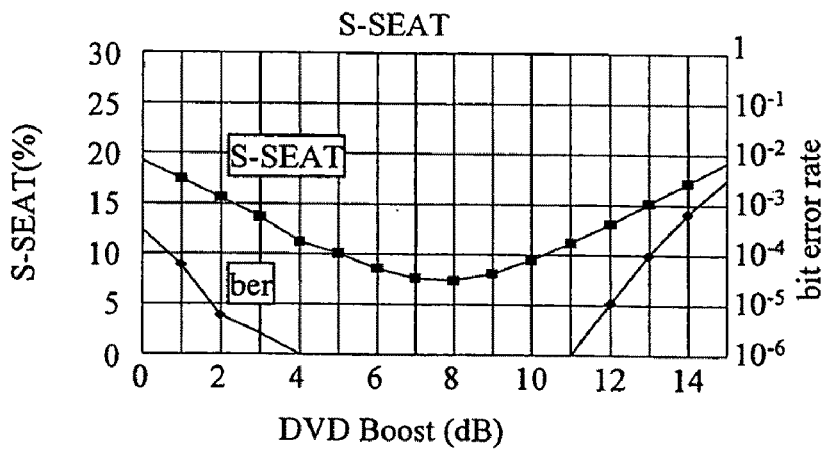
Figure 55C:
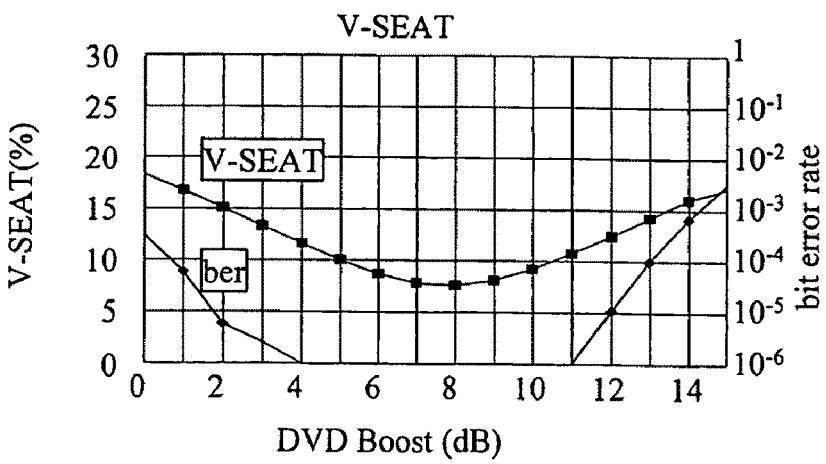

FIG. 55 shows the results of an experiment indicating the relationship among the equalization boost amount, the bit error rate, and each evaluation value, in an example of a test read using S-SEAT or V-SEAT in accordance with the invention. In this experiment, the PR(a,b,c,d) class was used and the boost amount was changed by varying the coefficients of a 3-tap FIR filter in the normal equalizer in the DVD-RAM. FIGS. 55(a), 55(b), and 55(c) show the results of measuring MLSE, S-SEAT, and V-SEAT, respectively. While the PR(a,b,c,d) class with a variable target level was used, MLSE was calculated by calculating a target level from the PR(3,4,4,3). As shown in the figures, by selecting a equalization boost amount such that each index becomes minimum, the margin center condition for the bit error rate can be substantially obtained. In a test read, S-SEAT or V-SEAT can be measured while varying the equalization boost amount, and an equalization boost amount may be determined such that S-SEAT or V-SEAT is minimized.

In the following, the results of an experiment involving a recording density corresponding to 25 GB in a Blu-ray disc will be described, as an example of application to the RLL(1,7) code.

The optical disc that was prepared was the same as the one described above, in which a write-once type phase-change film was laminated on a substrate of the land-groove structure with a track pitch of 0.34 μm. In the experiment, a DDU-1000 type evaluation apparatus manufactured by PulseTech Products Corporation was used. The wavelength of the light source was 405 nm and the NA of the objective lens was 0.85. The modulation code employed RLL(1,7), and the detection window width Tw was 74.5 nm.

Figure 56:
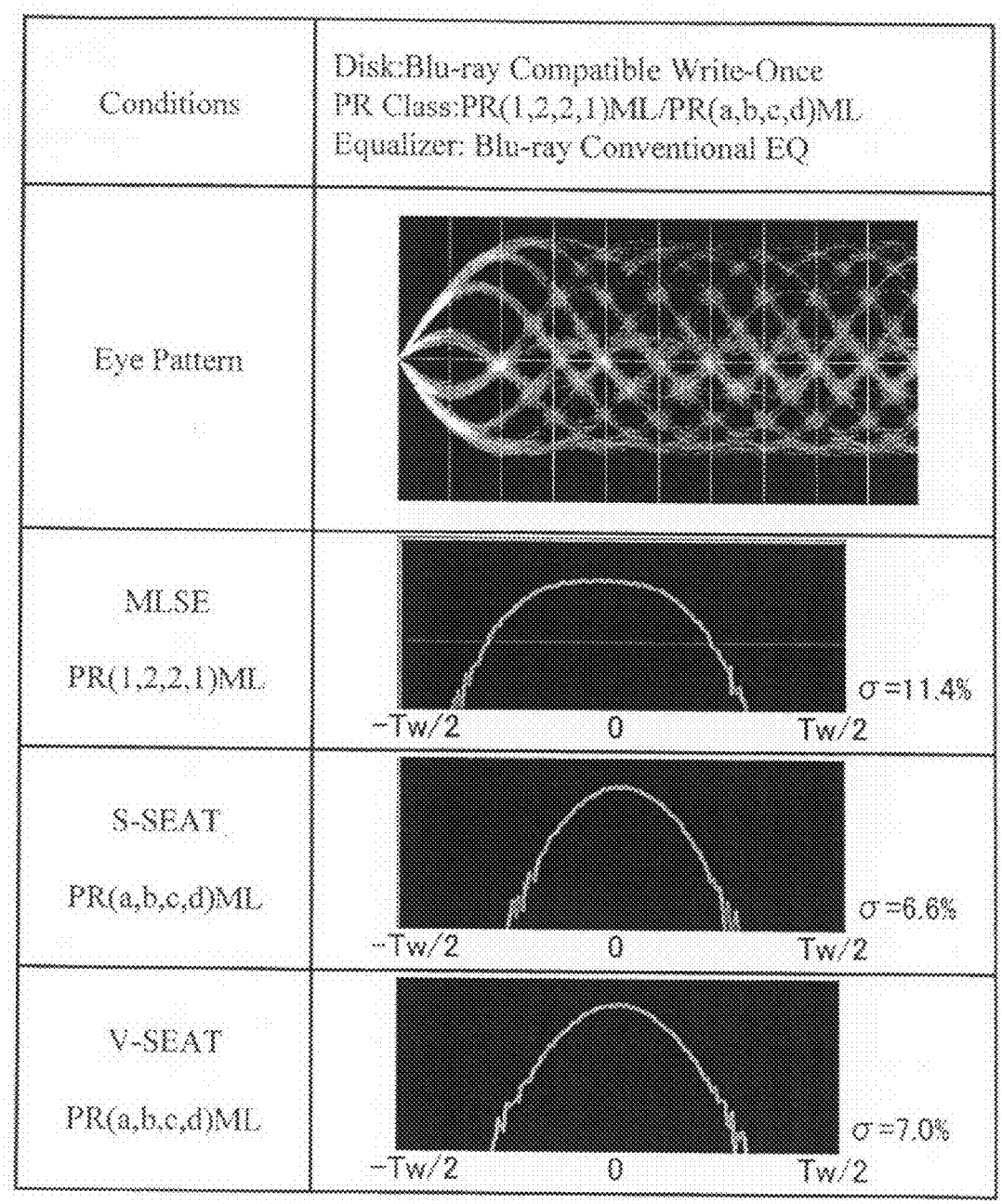
FIG. 56 shows the results of a measurement of MLSE, S-SEAT, and V-SEAT when reading a prototype disc using the PR(1,2,2,1) and PR(a,b,c,d) classes.

FIG. 56 shows the results of measuring MLSE, S-SEAT, and V-SEAT when the prototype disc was played back using the PR(1,2,2,1) class and the PR(a,b,c,d) class. As the equalizer, a conventional equalizer for Blu-ray discs was used, with a boost amount of 6.0 dB. A groove track was recorded once with a write power of 3.2 mW and an erasing power of 0.35 mW, and the read signal quality was then evaluated in each method. MLSE was measured by reading the disc with the PR(1,2,2,1) decoder with a fixed target level, and S-SEAT and V-SEAT were measured by reading the disc with the PR(a,b,c,d) decoder with a variable target level. Each evaluation value has a Gaussian distribution, as shown in the figures, where the horizontal axis has a detection window width of ±Tw/2. The evaluation values were such that: MLSE=11.4%; S-SEAT=6.6%; and V-SEAT=7.0%. The MLSE value is large and its distribution is displaced from the center mainly because the output signal could not be equalized to be sufficiently close to the target signal of the PR(1,2,2,1) class by the conventional equalizer of the Blu-ray disc. The distribution could be improved by implementing an automatic equalization using the LSE (Least Square Error) method using an FIR filter with 7 or more taps, for example. However, such a method would increase the 2Tw signal boost amount, resulting in negative effects such as an increase in noise in the high-frequency band, and therefore the method is not necessarily a best read condition. On the other hand, when the PR(a,b,c,d) class with a variable target level is used, the distribution of S-SEAT and V-SEAT is located at the center with a smaller dispersion because the target signal level of PRML varies in accordance with the read signal.

FIG. 57 shows the result of evaluation of the edge shift amount in patterns classified by the relationship between front and rear spaces and marks, using MLSE, S-SEAT, and V-SEAT. With regard to MLSE and S-SEAT which are restricted by the run-length limit, the front edge shift SFP(2, 2) and the rear edge shift ELP(2,2) cannot be evaluated. It is shown, however, that in V-SEAT in which a virtual state is introduced, these edge shifts can be evaluated. In V-SEAT, the value of a portion that does not include the minimum run length (=2Tw) has the same value as S-SEAT. Thus, it was shown that the shift amount in each edge pattern can be evaluated using S-SEAT or V-SEAT. When writing, by performing a test write for determining pulse parameters including the write pulse width and edge position such that these values amounts become as close to zero as possible, write conditions suitable for PRML can be obtained. Similarly, when reading, by performing a test read for determining the read equalization condition and the focus offset amount or the like such that the shift amounts can be as close to zero as possible, or such that the value of S-SEAT or V-SEAT can be minimized, a read condition suitable for PRML can be obtained.

Figure 58A:
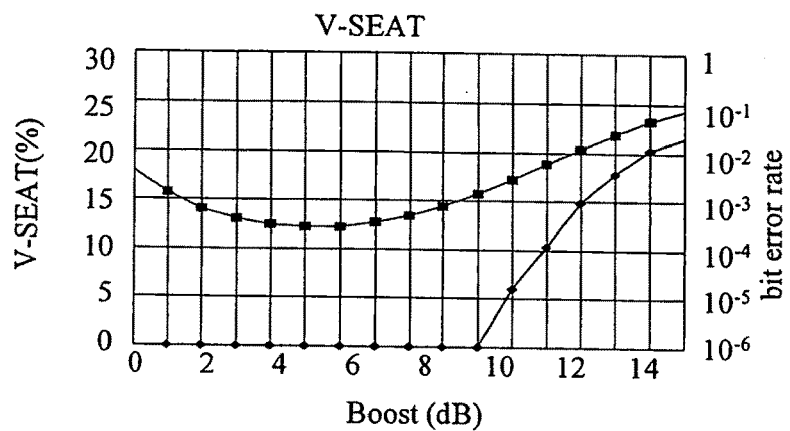
FIG. 58 shows the results of an experiment showing the relationship among the equalization boost amount, the bit error rate, and the V-SEAT value, in an example of a test read using V-SEAT of the invention.
Figure 58B:
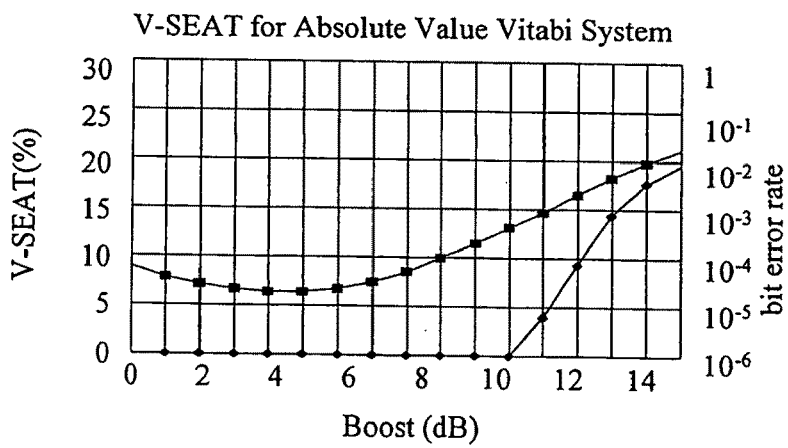

FIG. 58 shows the results of an experiment indicating the relationship among the equalization boost amount, the bit error rate, and the V-SEAT value, in an example of a test read using V-SEAT in accordance with the invention. In this example, the PR(a,b,c,d) class was used. In order to prove that V-SEAT can be adapted to Viterbi decoders of the absolute-value system, FIG. 58(b) shows the results concerning a Viterbi decoder of the absolute value system. As shown, by selecting an equalization boost amount such that V-SEAT can be minimized, the margin center condition of the bit error rate can be substantially obtained. In a test read, V-SEAT is measured while varying the equalization boost amount, and an equalization boost amount can be determined such that V-SEAT is minimized. Although the experimental results for V-SEAT are shown herein, the equalization condition can be similarly determined for S-SEAT such that the equalization boost amount can be minimized. It goes without saying that S-SAET can also be adapted to Viterbi decoders of the absolute-value system.

Embodiment 5

Optical Disc Apparatus

Figure 50:
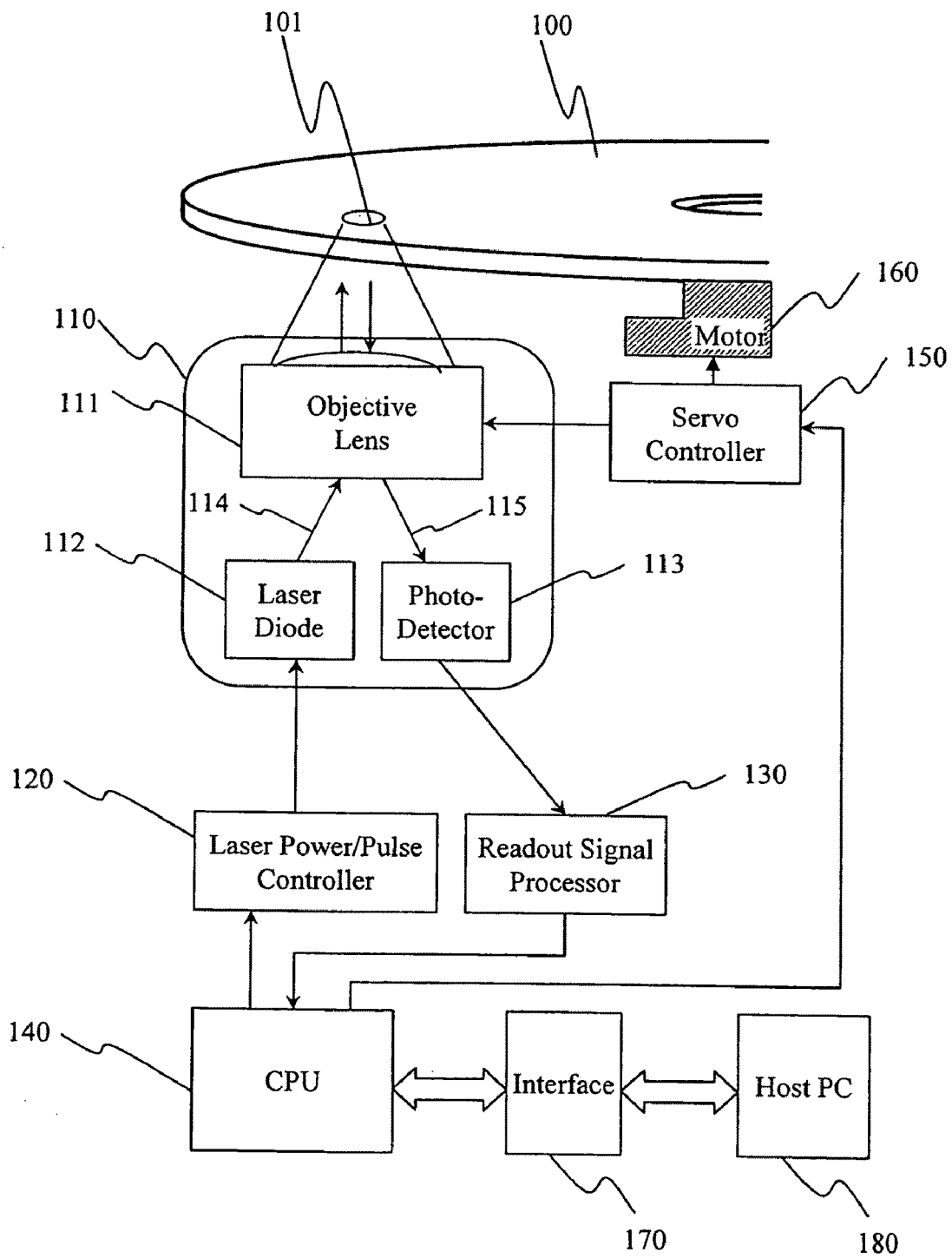
FIG. 50 shows an example of the configuration of the optical disc apparatus of the invention.

FIG. 50 shows an example showing the configuration of the optical disc apparatus in accordance with the invention. An optical disc medium 100 is rotated by a motor 160. Upon reading, a laser power/pulse controller 120 controls the current supplied to a semiconductor laser 112 inside an optical head 110 such that a laser light 114 is generated with an optical intensity as instructed by a CPU 140. The laser light 114 is focused by an objective lens 111 so that an optical spot 101 is formed on the optical disc medium 100. A reflected light 115 from the optical spot 101 passes through the objective lens 111 and detected by a photodetector 113, which consists of a plurality of separate photodetecting elements. A read signal processing circuit 130 reads the information recorded on the optical disc medium 100, using a signal detected by the optical head 110. Upon writing, the laser power/pulse controller 120 controls such that predetermined write data is converted into a predetermined write pulse current and pulsed light is emitted from the semiconductor laser 112. A decoder unit 10, a target level study unit 20, and a signal evaluation unit 30 that form a read signal evaluation circuit of the invention are implemented inside the read signal processing circuit 130.

When evaluating the quality of read signal, data can be read in accordance with an instruction from CPU 140 during a test write, and then S-SEAT or V-SEAT can be evaluated. By studying the conditions of (1) focus offset, (2) equalization, and (3) write power and pulse such that the S-SEAT or V-SEAT values become minimum, write and read conditions can be optimized and so the operation of the optical disc apparatus can be stabilized.

According to another aspects of this invention, the following IC chips are provided.

1. An IC chip in which a Viterbi decoding circuit with a waveform equalizer and a target level table and a signal evaluation circuit are formed, wherein:

said signal evaluation circuit comprises a pattern selection unit, a first and a second target level calculation unit, and a sequence error evaluation unit;

said pattern selection unit stores as many binarization results outputted from said Viterbi decoding circuit for a 1-bit error as a class bit number×2−1 in order to determine if the result is an evaluation value calculation pattern, wherein, if determined to be the evaluation value calculation pattern, said pattern selection unit sends it to said first target level calculation unit as a correct bit pattern, while generating an error pattern with a 1-bit edge shift and sending it to said second target level calculation unit as an error bit pattern;

said first target level calculation unit outputs a target signal level corresponding to said correct bit pattern by referring to said target level table, and said second target level calculation unit outputs a target signal level corresponding to said error bit pattern by referring to said target level table; and said sequence error evaluation unit, using the outputs of said first and said second target level calculation units and the output of said waveform equalizer, outputs at least one of an evaluation value D or σ in accordance with the following equations D-1 to D-6:

$$ED_B(pat1, pat2) = \sum_{n=1}^{N} (V_{target}[pat1[n]] - V_{target}[pat2[n]])^2 \quad \text{(Eq. D-1)}$$

where $V_{target}[B]$ is a target signal level for a bit sequence B, pat[n] is a bit sequence of a bit pattern "pat" at time n, and N is the class bit number;

$$d_{min} = \text{Average}(ED_{min}) \quad \text{(Eq. D-2)}$$

$$= \frac{\sum_{m=1}^{M} ED_B(Pat_T[m], Pat_F[m])}{M}$$

where M is the total number of combinations of a 1-bit error pattern, and $Pat_T$ and $Pat_F$ indicate a correct bit pattern and an error bit pattern, respectively;

$$ED(pat) = \sum_{n=1}^{N} (V_{signal}[t+n] - V_{target}[pat[n]])^2 \quad \text{(Eq. D-3)}$$

where $V_{signal}[t]$ is a read signal level at time t, and the result of binarization at time t is the bit pattern "pat";

$$D = \text{Sign(Shift–Direction)} \times \quad \text{(Eq. D-4)}$$
$$\{(ED(Pat_F[m]) - ED(Pat_T[m])) - d_{min}\}$$

$$\text{Sign(Shift–Direction)} = -1 \ (\text{Right–Edge–Shift}) \quad \text{(Eq. D-5)}$$
$$+1 \ (\text{Left–Edge–Shift})$$

$$\sigma = \frac{\sqrt{\frac{\sum_{p=1}^{P}(D[p])^2}{P}}}{2d_{min}} \quad \text{(Eq. D-6)}$$

where Sign(Shift–Direction) indicates the direction of edge shift in the case where the binarization result $Pat_T$ undergoes a 1-bit error (edge shift) to become $Pat_F$, and P is the number of bit patterns in a designated calculation period.

2. An IC chip in which a Viterbi decoding circuit with a waveform equalizer and a target level table and a signal evaluation circuit are formed, wherein:

said signal evaluation circuit comprises a pattern selection unit, a first and a second target level calculation unit, a sequence error evaluation unit, and a virtual target level calculation unit;

said virtual target level calculation unit calculates a target signal level for each and every bit sequence using table values in said target level table, regardless of a run-length limit, and stores the target signal level in a virtual target level table;

said pattern selection unit stores as many binarization results outputted from said Viterbi decoding circuit for a 1-bit error as a class bit number×2-1 in order to determine if the result is an evaluation value calculation pattern, wherein, if determined to be the evaluation value calculation pattern, said pattern selection unit sends it to said first target level calculation unit as a correct bit pattern, while generating an error pattern with a 1-bit edge shift and sending it to said second target level calculation unit as an error bit pattern;

said first target level calculation unit outputs a target signal level corresponding to said correct bit pattern by referring to said virtual target level table, and said second target level calculation unit outputs a target signal level corresponding to said error bit pattern by referring to said virtual target level table; and said sequence error evaluation unit, using the outputs of said first and said second target level calculation units and the output of said waveform equalizer, outputs at least one of an evaluation value D or σ in accordance with the following equations D-1 to D-6:

$$ED_B(pat1, pat2) = \sum_{n=1}^{N} (V_{target}[pat1[n]] - V_{target}[pat2[n]])^2 \quad \text{(Eq. D-1)}$$

where $V_{target}[B]$ is a target signal level for a bit sequence B, pat[n] is a bit sequence of a bit pattern "pat" at time n, and N is the class bit number;

$$d_{min} = \text{Average}(ED_{min}) \quad \text{(Eq. D-2)}$$

$$= \frac{\sum_{m=1}^{M} ED_B(Pat_T[m], Pat_F[m])}{M}$$

where M is the total number of combinations of a 1-bit error pattern, and $Pat_T$ and $Pat_F$ indicate a correct bit pattern and an error bit pattern, respectively;

$$ED(pat) = \sum_{n=1}^{N} (V_{signal}[t+n] - V_{target}[pat[n]])^2 \quad \text{(Eq. D-3)}$$

where $V_{signal}[t]$ is a read signal level at time t, and the result of binarization at time t is the bit pattern "pat";

$$D = \text{Sign(Shift–Direction)} \times \quad \text{(Eq. D-4)}$$
$$\{(ED(Pat_F[m]) - ED(Pat_T[m])) - d_{min}\}$$

$$\text{Sign(Shift–Direction)} = -1 \ (\text{Right–Edge–Shift}) \quad \text{(Eq. D-5)}$$
$$+1 \ (\text{Left–Edge–Shift})$$

$$\sigma = \frac{\sqrt{\frac{\sum_{p=1}^{P}(D[p])^2}{P}}}{2d_{min}} \quad \text{(Eq. D-6)}$$

where Sign(Shift–Direction) indicates the direction of edge shift in the case where the binarization result $Pat_T$ undergoes a 1-bit error (edge shift) to become $Pat_F$, and P is the number of bit patterns in a designated calculation period.

3. The IC chip according to claim 23 or 24, wherein, instead of equations D-1 and D-3, each Euclidean distance is calculated as the sum of absolute value of said difference at each time in accordance with the following equations D-7 and D-8:

$$ED_B(pat1, pat2) = \sum_{n=1}^{N} |V_{target}[pat1[n]] - V_{target}[pat2[n]]| \quad \text{(Eq. D-7)}$$

$$ED(pat) = \sum_{n=1}^{N} |V_{signal}[t+n] - V_{target}[pat[n]]| \quad \text{(Eq. D-8)}$$

4. The IC chip according to item 1 or 2, wherein, instead of equation D-2, said reference Euclidean distance $d_{min}$ is calculated as a value in a particular pattern in accordance with the following equation D-9:

$$d_{min} = ED_B(Pat_T[m], Pat_F[m]) \quad \text{(Eq. D-9)}$$

where $ED_B$ is calculated in accordance with equation D-1 or the following equation D-7:

$$ED_B(pat1, pat2) = \sum_{n=1}^{N} |V_{target}[pat1[n]] - V_{target}[pat2[n]]|  \quad \text{(Eq. D-7)}$$

5. The IC chip according to item 1 or 2, wherein, instead of Eq. D-4 as the shift amount D of an edge shift of concern, in cases where both DL and DR can be calculated, DL and DR each being an evaluation value of a left and a right edge shift, respectively, an average shift amount expressed by the following equation D-10 is used:

$$D = \frac{(DL + DR)}{2} \quad \text{(Eq. D-10)}$$

6. The IC chip according to item 1 or 2, wherein, instead of Eq. D-4 as the shift amount D of an edge shift of concern, in cases where both DL and DR can be calculated, DL and DR each being an evaluation value for a left and a right edge shift, respectively, a shift amount with a smaller absolute value as expressed by the following equation D-11 is used:

$D=DL$ if $|DL| \leq |DR|$ $D=DR$ if $|DL| > |DR|$ \quad (D-11)

7. The IC chip according to item 1 or 2, wherein, instead of Eq. D-4 as the shift amount D of an edge shift of concern, in case where both DL and DR can be calculated, DL and DR each being an evaluation value for a left and a right edge shift, respectively, a shift amount with a larger absolute value as expressed by the following equation D-12 is used:

$D=DR$ if $|DL| \leq |DR|$ $D=DL$ if $|DL| > |DR|$ \quad (D-12)

What is claimed is:

1. A computer-implemented method for evaluating a quality of a read signal obtained by using a head of an optical disc apparatus, and adapted to the Partial Response Maximum Likelihood (PRML) method by evaluating a binary code decoded from the read signal, comprising the steps of:
   obtaining a read signal, by using a head of an optical disc apparatus;
   decoding a binary code from the read signal obtained by the head of the optical disc apparatus;
   generating an error bit sequence having one bit edge shift from the binary code decoded from the read signal obtained by a head of an optical disc apparatus;
   calculating, using a Euclidian distance calculator, an Euclidian distance on the error bit sequence with respect to a predetermined target signal level, and calculating an Euclidian distance on the binary code under the assumption that the binary code has a correct bit sequence;
   calculating, using a Euclidian distance difference calculator, a Euclidian distance difference defined as a difference between the Euclidian distance on the binary code assumed to have a correct bit sequence and the Euclidian distance on the error bit sequence;
   calculating, using an average Euclidian distance calculator, an average Euclidian distance from the target signal level, the average Euclidian distance corresponding to a 1-bit shift pattern of the target signal level;
   calculating, using a normalized sequence error calculator, a normalized sequence error by subtracting the average Euclidian distance from the Euclidian distance difference and then dividing the result of subtraction by the average Euclidean distance; and
   evaluating, using a computer, a signal quality of the binary code assumed to have a correct bit sequence, by using the normalized sequence error.

2. A computer-implemented method for evaluating quality of a read signal according to claim 1, wherein the binary code is composed of a code of which the minimum run length is 2T.

3. The computer-implemented method of evaluating a read signal according to claim 1,
   wherein an Euclidean distance between a first designated bit pattern "pat1" and a second designated bit pattern "pat2" is determined using:

$$ED_B(pat1, pat2) = \sum_{n=1}^{N} (V_{target}[pat1[n]] - V_{target}[pat2[n]])^2,$$

wherein $V_{target}[B]$ is a target signal level for a bit sequence B, pat1[n] is a bit sequence of a bit pattern "pat1" at time n, pat2[n] is a bit sequence of a bit pattern "pat2" at time n, and N is a class bit number;

wherein a reference Euclidean distance used for normalizing an evaluation index is determined using:

$$d_{min} = \text{Average}(ED_{min})$$

$$= \frac{\sum_{m=1}^{M} ED_B(Pat_T[m], Pat_F[m])}{M},$$

wherein M is a total number of combinations of a 1-bit error patterns, and $Pat_T$ and $Pat_F$ indicate a correct bit pattern and an error bit pattern, respectively;

wherein an Euclidean distance between the read signal and a designated bit pattern "pat" is determined using:

$$ED(pat) = \sum_{n=1}^{N} (V_{signal}[t+n] - V_{target}[pat[n]])^2,$$

wherein $V_{signal}[t]$ is a read signal level at time t, and the bit pattern "pat" is a result of binarization at time t;

wherein an edge shift value of the read signal is determined using:

$$\text{Sign}(\text{Shift-Direction}) = -1 \ (\text{Right} - \text{Edge} - \text{Shift})$$
$$+1 \ (\text{Left} - \text{Edge} - \text{Shift})$$

and $$\sigma = \frac{\sqrt{\frac{\sum_{p=1}^{P} (D[p])^2}{P}}}{2d_{min}},$$

wherein Sign(Shift–Direction) indicates the direction of edge shift in the case where the binarization result $Pat_T$ undergoes a 1-bit error (edge shift) to become $Pat_F$ and
   wherein the read signal is evaluated using the edge shift value.

4. A computer-implemented method for evaluating quality of a read signal according to claim 2, wherein the binary code is composed of either of an RLL(1,7) code or an RLL(2,10) code.

5. The computer-implemented method of evaluating a read signal according to claim 3,
wherein the read signal is evaluated using an evaluation value σ, corresponding to a jitter value in the Partial Response Maximum Likelihood (PRML) method, determined using:

$$\sigma = \frac{\sqrt{\frac{\sum_{p=1}^{P}(D[p])^2}{P}}}{2d_{min}},$$

wherein P is the number of bit patterns in a designated calculation period.

6. The computer-implemented method of evaluating a read signal according to claim 1:
wherein an Euclidean distance, represented by $ED_B(pat1, pat2)$, between a first designated bit pattern "pat1" and a second designated bit pattern "pat2", is determined using:

$$ED_B(pat1, pat2) = \sum_{n=1}^{N}(V_{target}[pat1[n]] - V_{target}[pat2[n]])^2;$$

wherein $V_{target}[B]$ is a target signal level for a bit sequence B, pat1[n] is a bit sequence of a bit pattern "pat1" at time n, pat2[n] is a bit sequence of a bit pattern "pat2" at time n, and N is the class bit number;
wherein a reference Euclidean distance $d_{min}$ for normalizing an evaluation index determined using:

$$d_{min} = \text{Average}(ED_{min})$$

$$= \frac{\sum_{m=1}^{M} ED_B(Pat_T[m], Pat_F[m])}{M},$$

wherein M is the total number of combinations of a 1-bit error pattern, and $Pat_T$ and $Pat_F$ indicate a correct bit pattern and an error bit pattern, respectively;
wherein an Euclidean distance, represented by ED(pat), between the read signal and a designated bit pattern "pat", is determined using:

$$ED(pat) = \sum_{n=1}^{N}(V_{signal}[t+n] - V_{target}[pat[n]])^2,$$

wherein $V_{signal}[t]$ is a read signal level at time t, and the result of binarization at time t is the bit pattern "pat"; pat[n] is a bit sequence of a bit pattern "pat" at time n, and N is the class bit number;
wherein an edge shift value D of the read signal is determined using:

$$D = \text{Sign}(\text{Shift}-\text{Direction}) \times \{(ED(Pat_F[m]) - ED(Pat_T[m])) - d_{min}\}$$

and $$\text{Sign}(\text{Shift}-\text{Direction}) = \begin{array}{l} -1 \quad (\text{Right}-\text{Edge}-\text{Shift}) \\ +1 \quad (\text{Left}-\text{Edge}-\text{Shift}), \end{array}$$

wherein Sign(Shift-Direction) indicates the direction of edge shift in the case where the binarization result $Pat_T$ undergoes a 1-bit error (edge shift) to become $Pat_F$; and
wherein the read signal is evaluated using edge shift value D.

7. The computer-implemented method of evaluating a read signal according to claim 6:
wherein the read signal is evaluated using an evaluation value σ, corresponding to a jitter value in the Partial Response Maximum Likelihood (PRML) method, determined using:

$$\sigma = \frac{\sqrt{\frac{\sum_{p=1}^{P}(D[p])^2}{P}}}{2d_{min}},$$

wherein P is the number of bit patterns in a designated calculation period.

8. An optical disc apparatus comprising:
an optical head for recording binary coded information in an optical disc, and for detecting the recorded information as a read signal; and
a Partial Response Maximum Likelihood (PRML) read circuit that decodes the read signal into a binary code;
wherein the PRML read circuit includes:
a generator configured to generate an error bit sequence having one bit edge shift from the binary code;
a Euclidian distance calculator configured to calculate a Euclidian distance on both the binary code, which is assumed to have a correct bit sequence, and the error bit sequence with respect to a predetermined target signal level;
a Euclidian distance difference calculator configured to calculate a Euclidian distance difference defined as a difference between the Euclidian distance on the binary code assumed to have a correct bit sequence and the Euclidian distance on the error bit sequence;
an average Euclidian distance calculator configured to calculate an average Euclidian distance from the target signal level, the average Euclidian distance corresponding to a 1-bit shift pattern of the target signal level;
a normalized sequence error calculator configured to calculate a normalized sequence error by subtracting the average Euclidian distance difference and then dividing the result of subtraction by the average Euclidian distance; and
an evaluator configured to evaluate a signal quality of the binary code assumed to have a correct bit sequence, by using the normalized sequence error.

9. An optical disc apparatus according to claim 8,
wherein the evaluator is configured to evaluate a signal quality of the binary code assumed to have a correct bit sequence, by using an evaluation value corresponding to a jitter value in the Partial Response Maximum Likelihood (PRML) method.

10. A computer-implemented method for evaluating a signal quality of a binary code decoded from a read signal obtained by a head of an optical disc apparatus and adapted to the Partial Response Maximum Likelihood (PRML) method, comprising the steps of:

obtaining a read signal by a head of an optical disc apparatus;

calculating, using a computer, an edge shift value D of the read signal as follows:

$$\text{Sign(Shift - Direction)} = \begin{matrix} -1 & \text{(Right - Edge - Shift)} \\ +1 & \text{(Left - Edge - Shift)} \end{matrix},$$

and $$D = \text{Sign(Shift - Direction)} \times \{(ED(Pat_F[m]) - ED(Pat_T[m])) - d_{min}\},$$

wherein an Euclidean distance (ED) between the read signal and a designated bit pattern (pat) determined using:

$$ED(pat) = \sum_{n=1}^{N} (V_{signal}[t+n] - V_{target}[pat[n]])^2,$$

wherein $V_{signal}[t]$ is a read signal level at time t,
wherein a reference Euclidean distance $d_{min}$ for normalizing an evaluation index determined using:

$$d_{min} = \text{Average}(ED_{min})$$

$$= \frac{\sum_{m=1}^{M} ED_B(Pat_T[m], Pat_F[m])}{M}, \text{ and}$$

wherein M is the total number of combinations of a 1-bit error pattern, and $Pat_T$ and $Pat_F$ indicate a correct bit pattern and an error bit pattern, respectively; and evaluating the read signal using the edge shift value D of the read signal.

11. A computer-implemented method of claim 10, wherein evaluating a signal quality of the read signal includes using an evaluation value σ determined using:

$$\sigma = \frac{\sqrt{\frac{\sum_{p=1}^{P} (D[p])^2}{P}}}{2d_{min}};$$

wherein P is the number of bit patterns in a designated calculation period; and wherein evaluation value σ corresponds to a jitter value in the Partial Response Maximum Likelihood (PRML) method.

12. An optical disc apparatus comprising:

an optical head configured to record binary coded information in an optical disc, and configured to detect the recorded information as a read signal;

a Partial Response Maximum Likelihood (PRML) read circuit configured to decode the read signal into a binary code, including calculating an edge shift value D of the read signal as follows:

$$\text{Sign(Shift - Direction)} = \begin{matrix} -1 & \text{(Right - Edge - Shift)} \\ +1 & \text{(Left - Edge - Shift)} \end{matrix},$$

and $$D = \text{Sign(Shift - Direction)} \times \{(ED(Pat_F[m]) - ED(Pat_T[m])) - d_{min}\},$$

wherein an Euclidean distance (ED) between the read signal and a designated bit pattern (pat) is determined using:

$$ED(pat) = \sum_{n=1}^{N} (V_{signal}[t+n] - V_{target}[pat[n]])^2,$$

wherein $V_{signal}[t]$ is a read signal level at time t, and a reference Euclidean distance $d_{min}$ for normalizing an evaluation index is determined using:

$$d_{min} = \text{Average}(ED_{min})$$

$$= \frac{\sum_{m=1}^{M} ED_B(Pat_T[m], Pat_F[m])}{M}, \text{ and}$$

wherein M is the total number of combinations of a 1-bit error pattern, and $Pat_T$ and $Pat_F$ indicate a correct bit pattern and an error bit pattern, respectively; and an evaluator configured to evaluate a signal quality of the read signal, using the edge shift value D.

13. The optical disc apparatus of claim 12, wherein the evaluator evaluates a signal quality of the read signal using an evaluation value σ corresponding to a jitter value in the Partial Response Maximum Likelihood (PRML) method, determined using:

$$\sigma = \frac{\sqrt{\frac{\sum_{p=1}^{P} (D[p])^2}{P}}}{2d_{min}};$$

wherein P is the number of bit patterns in a designated calculation period.

* * * * *